| United States Patent [19] | [11] 4,015,108 |
|---|---|
| Morton | [45] Mar. 29, 1977 |

[54] METHODS OF AND APPARATUS FOR DETERMINING THE PHYSICAL PARAMETERS OF SELECTED OBJECTS

[75] Inventor: Roger Roy Adams Morton, Penfield, N.Y.

[73] Assignee: Bausch & Lomb Incorporated, Rochester, N.Y.

[22] Filed: Nov. 28, 1975

[21] Appl. No.: 636,273

Related U.S. Application Data

[60] Continuation of Ser. No. 434,529, Jan. 18, 1974, abandoned, which is a division of Ser. No. 210,278, Dec. 20, 1971, Pat. No. 3,805,028, which is a continuation of Ser. No. 835,673, June 23, 1969, abandoned.

[52] U.S. Cl. .......................... 235/92 PC; 235/92 R
[51] Int. Cl.² ..................................... G06M 11/02
[58] Field of Search ........ 235/92 EA, 92 V, 92 PC; 340/324 A; 178/18, DIG. 36, 6.8

[56] References Cited

UNITED STATES PATENTS

| 3,189,889 | 6/1965 | Bridgett ........................ 340/324 A |
| 3,440,638 | 4/1969 | Van Valkenburg ........... 340/324 A |
| 3,475,612 | 10/1969 | Stupar et al. .................. 340/324 A |
| 3,509,350 | 4/1970 | Gundrum ........................ 250/549 |
| 3,543,240 | 11/1970 | Miller et al. ................... 340/324 A |
| 3,566,026 | 2/1971 | Bonebreak et al. ................ 178/6.8 |
| 3,584,142 | 6/1971 | Schoeffler ......................... 178/6.8 |
| 3,594,608 | 7/1971 | Mutton .......................... 340/324 A |
| 3,617,629 | 11/1971 | McCarthy .......................... 178/6.8 |
| 3,618,035 | 11/1971 | Simms ................................ 178/6.8 |

*Primary Examiner*—Joseph M. Thesz
*Attorney, Agent, or Firm*—Frank C. Parker; Bernard D. Bogdon

[57] ABSTRACT

Apparatus for determining parameters of any number of selected regularly or randomly oriented particles, or images or image patterns thereof, of various size and shape lying within a discrete region. A scanning device is swept over the discrete region causing the generation of electrical signals in response to the interception of the boundaries of one or more of the particles. Apparatus, including, for example, a light pen, for use in cooperation with a display of the feature images is operated to best identify, select or prepare for analysis features of interest within the discrete region. In cooperation with such apparatus appropriate logic and electronic circuitry which is adapted to receive the initially generated signals provide, in response thereto, other signals related to the feature or features of interest and any particular parameter related to those features.

22 Claims, 39 Drawing Figures

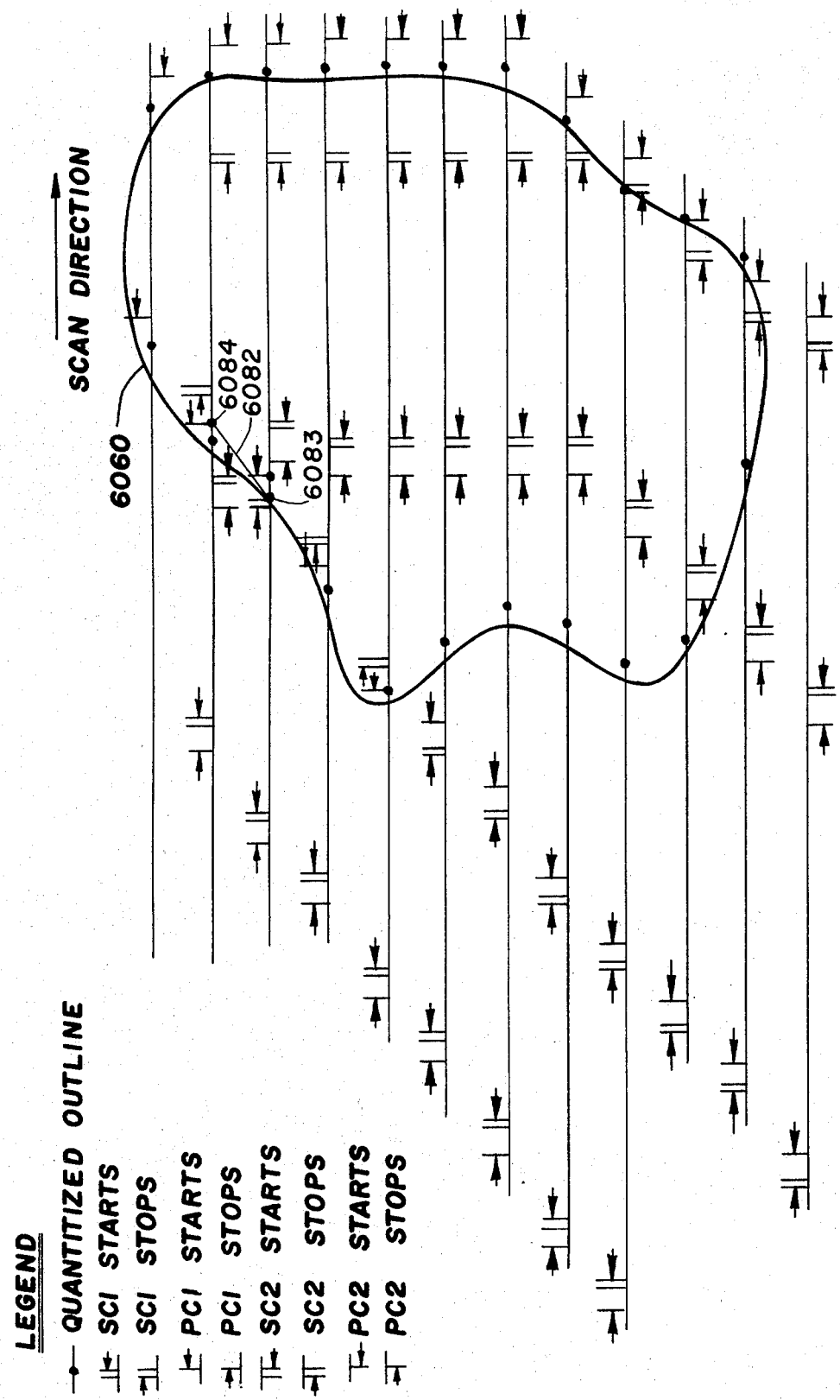

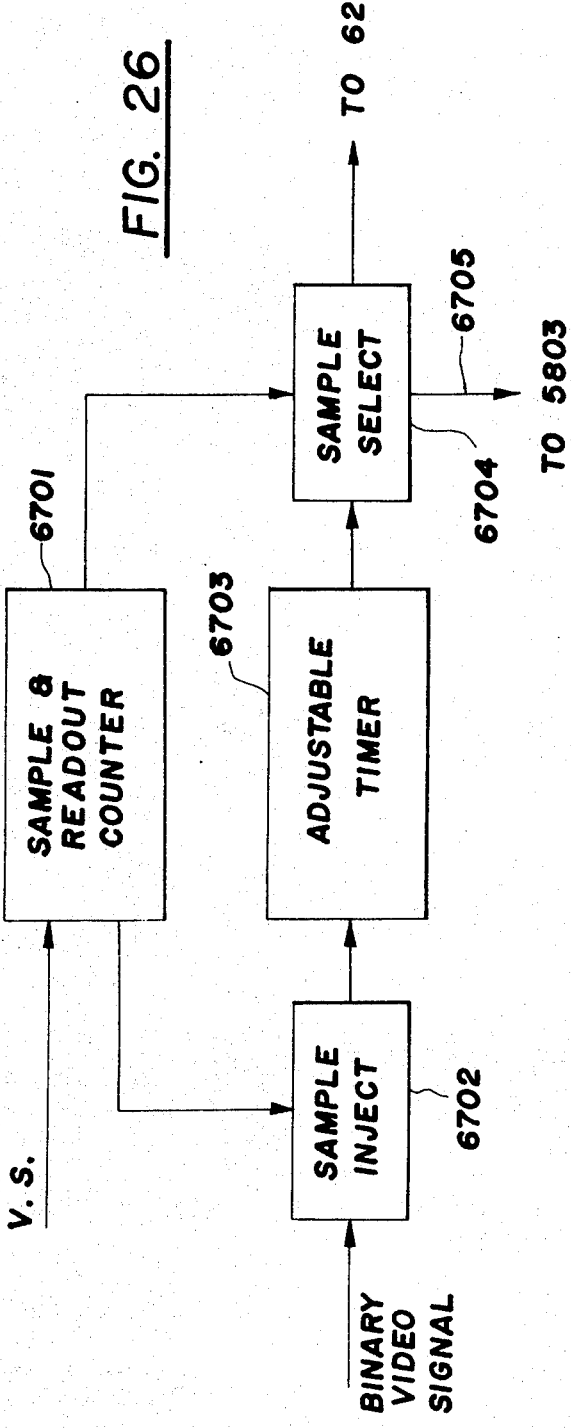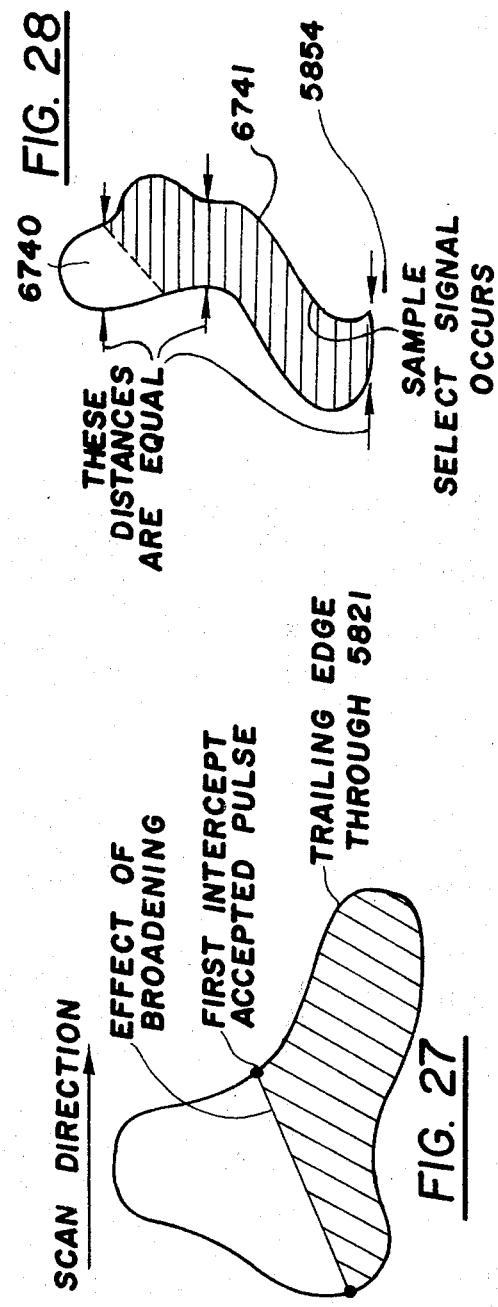

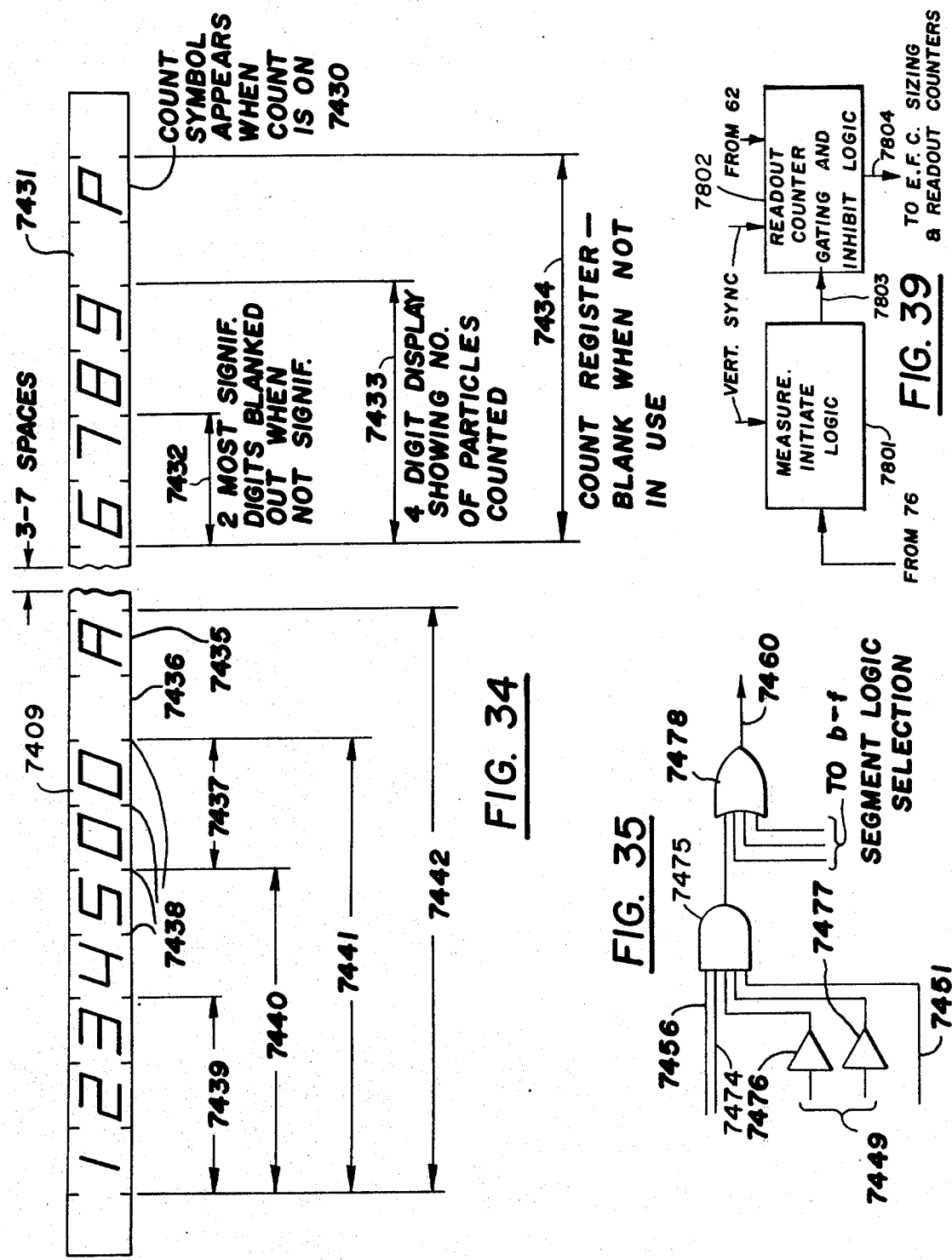

METHODS OF AND APPARATUS FOR DETERMINING THE PHYSICAL PARAMETERS OF SELECTED OBJECTS

This is a continuation of application Ser. No. 434,529, filed Jan. 18, 1974, now abandoned, which is a division of application Ser. No. 210,278, filed Dec. 20, 1971, U.S. Pat. No. 3,805,028 which is a continuation of Ser. No. 835,673, filed June 23, 1969, now abandoned.

BACKGROUND OF THE INVENTION

1. Field of the Invention:

This invention relates to apparatus for determining the quantity and/or other physical parameters of particles, images thereof, or image patterns lying within the range of a scanning device and, more particularly, to apparatus for making such determinations when the particles are of arbitrary size and shape or are randomly or regularly oriented, or any combination of these.

2. Description of the Prior Art:

Detection and analysis of particulate materials is a necessity spanning a broad spectrum of scientific, engineering and industrial disciplines. Various types of systems have been either proposed or actually used in measuring the quantity and/or physical parameters of a group of regularly or randomly oriented particles of various size and shape. There are two basic approaches to the analysis of any particle population; indirect measurements of secondary effects manifested by the particles or direct measurement of particle parameters via an optical or electron microscope.

The indirect techniques employed permit relatively quick measurement of the particle population under study. This approach is typified by methods such as sedimentation of particles. A suspension is allowed to settle by gravity or centrifugation whereupon the optical clarity of the mixture is measured as a function of time and/or position. By then assuming a number of factors, such as particle density, hydraulic flow resistance, multiparticle interactions and agglomeration characteristics, one can infer particle parameter information.

Light scattering is another analog technique used for measuring both discrete particles and aggregates. It assumes a known, invariant relationship between the diameter of a particle and the proportion of incident light scattered by that particle. Individual scintillations caused by a particle entering the scattering zone of the measuring apparatus are then detected. The detected information can be gated into various sizes categories to yield instantaneous results or transformed into a permanent record. In these instruments, certain factors such as the effects produced by particle shape, color, coincidence and refractive index must be ignored.

Because the various analog techniques only make indirect measurement of the particles under study, and because certain factors are assumed or ignored, or both, the results obtained are frequently questionable. Thus, only the grossest assessment of actual particle characteristics can be derived. Precision measurement is obviously not possible in most cases and, in addition, many particle parameters cannot be obtained using indirect analog techniques.

Microscopic measurement of a particle sample, on the other hand, permits the measurement determination of particle parameters to any degree of precision desired. Further, one can measure any number of different particle parameters using this technique. An extremely wide size range of particles can be accommodated through microscopic examination and, most importantly, this technique furnishes the investigator with a direct and unambiguous measure of the particle population under study. This ability to obtain precise, detailed information is a paramount advantage in particle analysis. However, manual microscopic methods do have significant disadvantages. Measurement with the microscope is a slow process and was, until the present time, considered particularly unsuitable for use in conjunction with automated processes. A comparatively long measurement interval is required to achieve statistically valid results. A relatively high degree of operator skill and technical knowledge are necessary for accurate results. In addition, operator fatigue is a limiting factor in repetitive sampling. Finally, the data obtained by using the microscope must be mathematically transformed into some meaningful set of measurements. All of these disadvantages combine to limit the number of samples which can be processed by this manual technique.

These problems have been eased somewhat by improvements designed to fascillitate particle measurement. Recently, particle measuring systems have come into use wherein a television camera is employed to pick up the microscopic image for eventual projection on a monitor where particle measurements are made on the particle image directly or indirectly by associated equipment. Generally, these prior art systems used a television camera or scanning device which was played over a discrete region containing the particles of interest. Interception of a particle in the path of the scanning device produced an electrical signal which was operated on by the remainder of the system to yield the desired particle parameter.

In some systems, the number of signals or intercepts was totaled in a simple counter to yield a signal representative of the total intercept count within the region being scanned. In other systems, measurements were made of the interval between intercept signals or their frequency in order to derive dimensional information concerning a particle. Still other systems employed two beams or scanning devices moving along adjacent scan lines, comparing the electrical signals derived therefrom in order to separate the signal as belonging to one or another particle. In still other systems, only one scanning device was used, but no intelligence was gathered until the results from two successive scans were compared. Finally, there were hybrid prior art particle measuring systems which were variations of the above-noted systems with an occasional modification incorporated therein to allow an unusual measurement to be made or an unusually shaped particle to be measured.

The availability of such devices lessened the need to resort to the accurate but time consuming and laborious microscopic manual methods previously employed. Unfortunately, these prior art systems were usually intended or designed to be particularly suitable for measuring only one specific particle parameter. While these systems worked well enough, they tended to be, as "laboratory" type instruments frequently are, overly sophisticated and too expensive for their intended purpose. This disadvantage, when coupled with the single-purpose approach of the designer, rendered these early particle measuring systems unsuitable for commercial use. In addition, these prior art systems, because of burgeoning academic and industrial research efforts, were also proving unsatisfactory in the very places which originated them.

In time, systems which were capable of making more than one type of measurement became available. Typically, these systems could determine the quantity of particles scanned, compute a particle's maximum chord as measured in the direction of scan or measure the total area of all particles lying within a discrete region. Generally, these were the only measurements which could be made, unless the slower manual microscopic methods or a specialized instrument were employed. As previously mentioned, indirect techniques proved unsatisfactory for all but a few exceptions because of their inherent inaccuracies.

In determining the count or number of particles within the region, the scanning device produced a sweep thereover causing the generation of an electrical signal whenever a particle was encountered. Another signal of a differing level, or no signal at all, was generated when a particle was not intercepted along a line of scan. Such devices worked well enough from an accuracy standpoint where the particles were generally regular in shape. However, this condition was the exception rather than the rule. In the overwhelming majority of the cases, the particles to be measured were of irregular shape having reentrant profiles, contained holes or voids or were randomly oriented. As a result, the particle count or measurement obtained was all too often inaccurate, while the partial solution provided by the slower manual graphical methods was unsatisfactory from both a time and accuracy viewpoint.

The same poor results were obtained where the maximum chord of a particle or the total particle area, rather than a total count, was desired. Firstly, complex particle periphery caused difficulty in obtaining maximum chord or area measurements. Secondly, it was only possible to obtain the maximum chord of a particle in the direction of scan. Obviously, this limitation proved frustrating when the maximum chord lay in other than the direction of scan as is the case in the majority of instances. Thirdly, when present, voids or holes in the particles further compounded the problems of obtaining accurate area measurements. Fourthly, only a limited number of simple measurements could be made. Again, the time consuming and laborious manual microscopic methods provided only a partial solution or alternative. The overall result was that the need for accurate, rapid and versatile particle or image measuring systems was left largely unsatisfied.

SUMMARY OF THE INVENTION

A primary object of the present invention is to provide a particle or image measuring system which can quickly and accurately measure a given particle population or image pattern.

Another object of the present invention is to provide a particle or image measuring system which can quickly and accurately measure a given particle population or image pattern regardless of the orientation of the particles or images or the shape of their profiles.

Still another object of the present invention is to provide a system for measuring particles or images having irregular shapes, particularly those having holes or upwardly or downwardly projecting portions.

Yet another object of the present invention is to provide apparatus for accurately and rapidly measuring a given particle population or image pattern for which an operator is required to possess only minimal technical skills to operate.

Another object of the present invention is to provide a particle or image measuring system which is particularly suitable for automated operation.

Another object of the present invention is to provide a particle or image measuring system which can quickly and accurately measure a great variety of particle parameters with a minimum of subsequent mathematical manipulations.

A further object of the present invention is to provide apparatus for rapid and precise measurement of a given particle population or image pattern wherein the measured results are displayed instantaneously for one or more of the particles or images being measured.

Accordingly, a particle or image measuring system is provided in which a microscopic or other suitable image producing device, television camera and television monitor interdependently operate to produce on the monitor screen, at least a partial picture of the particles or images to be measured. The television signal is first processed by a control center or basic module of elements to generate a binary video signal before being passed onto the monitor for display. The binary video signal is operated on by a control center to yield the desired particle parameter or parameters.

The particle or image measuring system described herein comprises a basic unit and a family of specialized subsystems. These can be combined, as desired, with the microscope, television camera, television monitor, and control center comprising the basic system elements, to obtain the desired measurements. For example, a selective particle measurement circuit, one of the specialized subsystems, when combined with the basic system elements allows various size measurements of any individual particle or image displayed on the monitor. By actuating a particle measurement initiator, the signals corresponding to the selected particle or image are segregated from the remainder of the video intelligence and then operated upon to yield the desired particle measurement. The entire field measurement module, which is another of the specialized subsystems noted above, couples to the basic system elements to permit the measurement of the sum of a particular particle parameter for all particles or images recognized as such within the field of view. The entire field count module will automatically detect and count all particles or images recognized as such in the field of view regardless of their shape or orientation. Modifications and/or combinations of the entire field measurement and entire field count modules permits an increased number of parameters to be obtained.

A size distribution module processes information received from the selective particle measurement circuit and others of the specialized subsystems and presents it as a detailed distribution of particle or image population by size ranges in visual counters of one type or another. Both density and cumulative distribution data can be processed and presented. In the alternative, the intelligence received from the entire field module can be fed back through a servo system to control an automated process.

The measured parameters, when size distribution or concentration profiles are not required, can be instantaneously displayed on a portion of the monitor or an auxiliary visual display device, permanently recorded by a printing device for further study, stored in a computer or memory unit for later use, or any combination of these.

Finally, specially designed modules are provided for determining, in conjunction with the basic system elements and one or more of the other modules, special or sophisticated particle or image parameters.

The use of a microscopic-television camera combination coupled to sophisticated analysis and computation equipment which effectively overcomes the prior art limitations imposed particle or image shape and orientation, provides a powerfully and versatile tool for rapid and precise particle or image analysis.

BRIEF DESCRIPTION OF THE DRAWINGS

FIG. 14 is another enlarged view of a particle being measured for another one of the dimensions used in determining its longest dimension;

FIG. 15 is a graphical illustration of the effect of the clock pulses used to generate two of the measurements used in determining the longest dimension;

FIG. 16 is a block diagram of the particle parameter selector shown in FIG. 3;

FIG. 17 is a block diagram of the objective power compensation circuit shown in FIG. 3;

FIG. 26 is a block diagram of the oversize module shown in FIG. 3;

FIG. 27 schematically illustrates, with respect to a measured particle, how the oversize count logic follows the trailing edge of the particle;

FIG. 28 schematically illustrates how the oversize count logic continues to track a particle which has its widest point in its upper portion and narrows thereafter;

FIG. 34 is an enlarged illustration of the character display space and the interrelation of the individual character spaces to each other;

FIG. 35 is a logic diagram showing typical character segment encoder logic;

FIG. 39 is a block diagram of the measurement timing circuit shown in FIG. 3.

DESCRIPTION OF THE PREFERRED EMBODIMENTS

A. GENERAL SYSTEM DESCRIPTION

Figure 1:
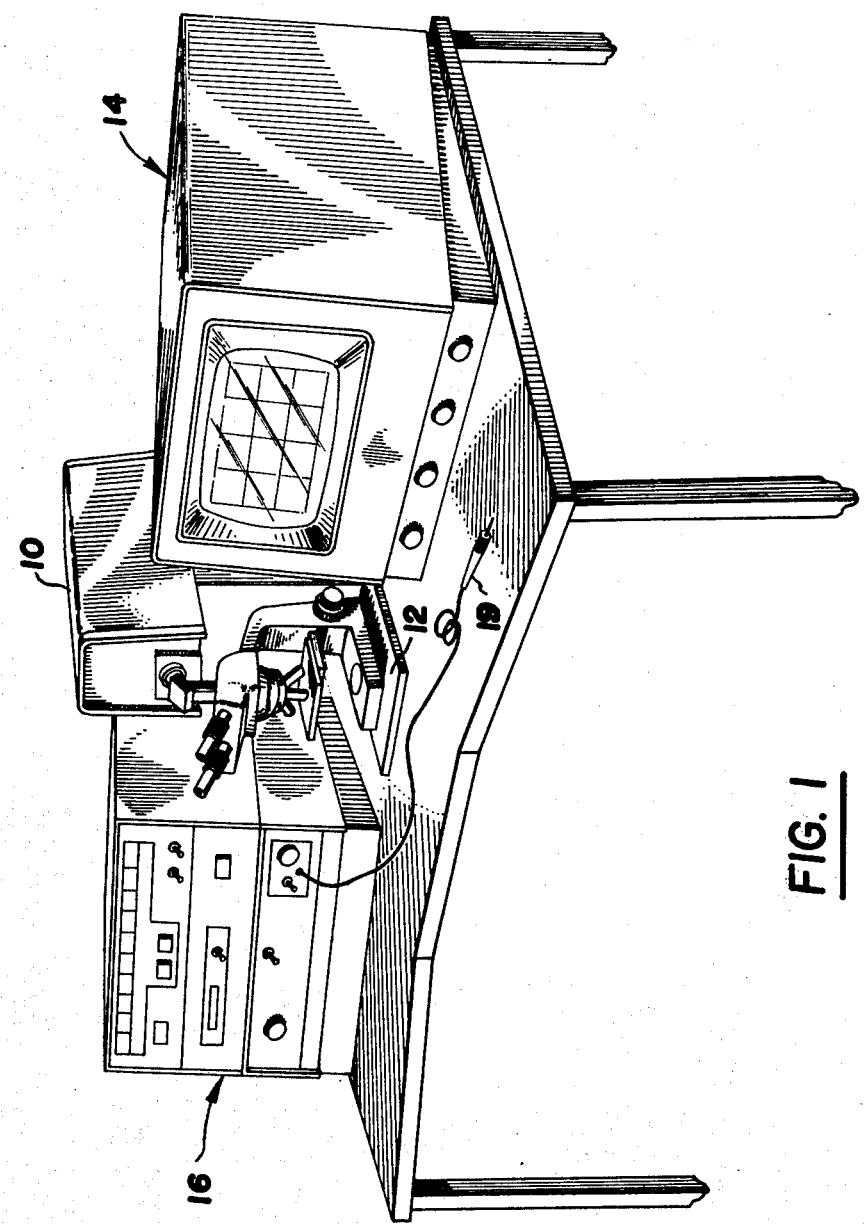
FIG. 1 is a perspective view of one arrangement of a system embodying the present invention.
Figure 3:
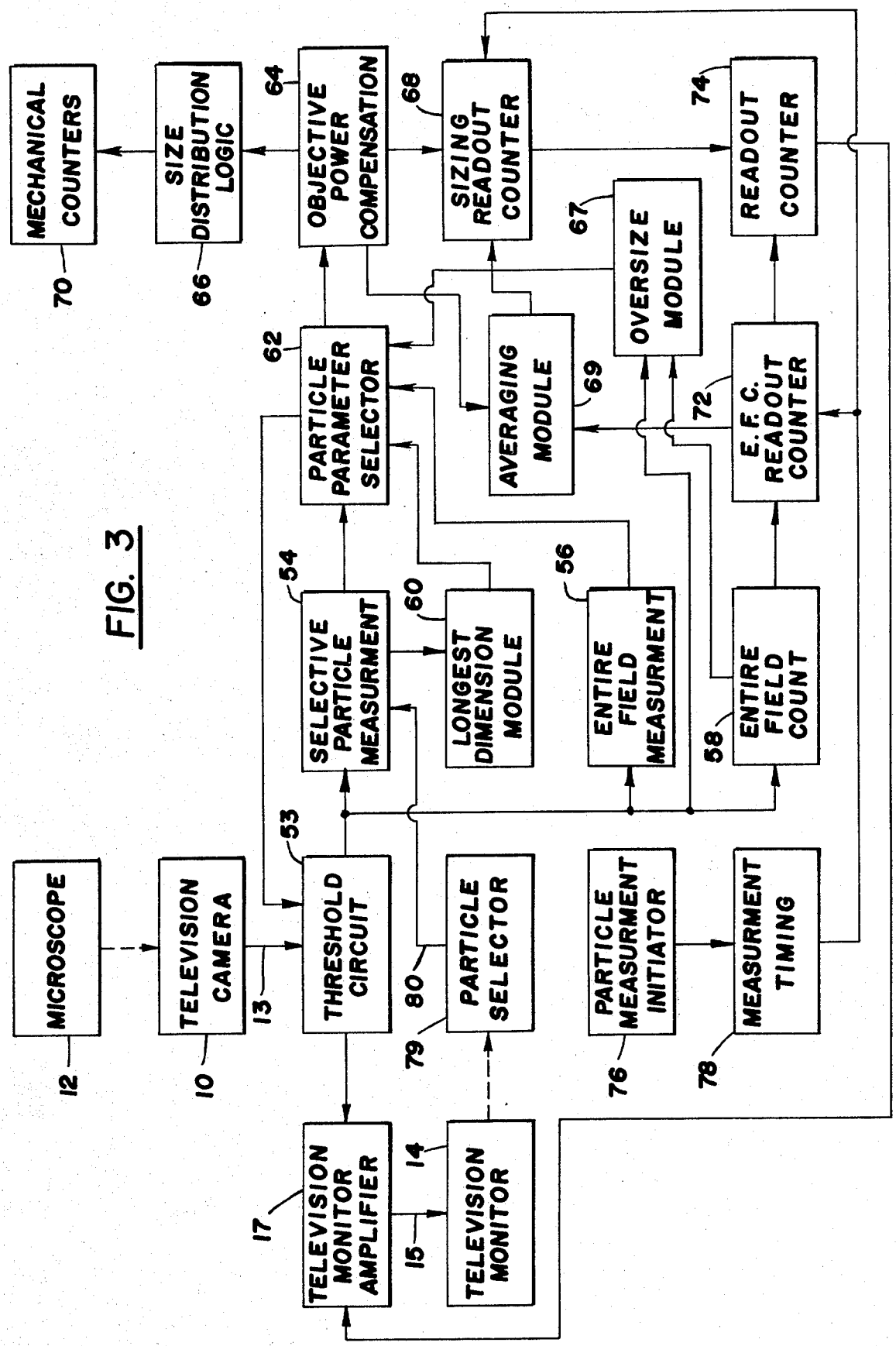
FIG. 3 is a functional block diagram of a system embodying the present invention.

Referring now to the drawings wherein like reference numerals have been employed in the several views for like elements, FIG. 1 illustrates a perspective view of a typical arrangement of a particle or image measuring system embodying the present invention. As is shown in FIG. 1, this system comprises a television camera 10 which is optically coupled to microscope 12 in a well-known manner. While a microscope is shown, it will be understood that any other suitable image forming device may be employed as dictated by the requirements of a particular situation. Such an alternative device might be, for example, a microprobe of an electron microscope. As best seen in FIG. 3, the camera 10 is connected, in turn, by suitable wiring 13 to a control center 16. A television monitor 14 is electrically connected via wiring 15 to the control center 16. Power for the system is supplied by a suitable source of electrical energy (not shown). When the system is turned on, an image of the discrete region being viewed in microscope 12 is simultaneously produced on the monitor 14 in a manner well known to those familiar with the television art.

The television camera 10, the microscope 12 and the television monitor 14 are all readily available commercial items and have no special or unique characters other than those found in similar off-the-shelf items. It will be appreciated that the microscope 12 must be suitable for use in conjunction with a scanning device such as television camera 10. The television camera 10 can be, for example, a Fairchild Camera and Instrument Co. camera, model number TC177. The microscope 12 can be, for example, a Bausch & Lomb Inc. microscope, any one of the Dynaoptic models of the laboratory series having photobinocular or photomonocular outlets being satisfactory. The television monitor 14 can be, for example, a Setchell - Carlson, Inc. monitor. All of the above units have given satisfactory performances when incorporated in the particle or image measuring system although, as previously noted, equivalent substitutions therefor can be incorporated into the system with no degradation in performance.

As will be more fully hereinafter explained, any discrete region can be scanned by television camera 10 to produce, in a known manner, a like representation thereof on the television monitor 14. It will be understood that the picture appearing on the monitor 14 is, in actuality, a collection of two-dimensional images which correspond to the particles lying in the discrete region being scanned and that direct physical measurement of the particles is not contemplated or carried out. Instead, attention is focused on and measurements made of the signals producing the two-dimensional images resulting from scanning the objects. The specific particle parameters which are to be measured can now be determined, automatically or semi-automatically as shall be later explained, based on the video signal which produces the particle image appearing on the monitor 14.

Figure 2:
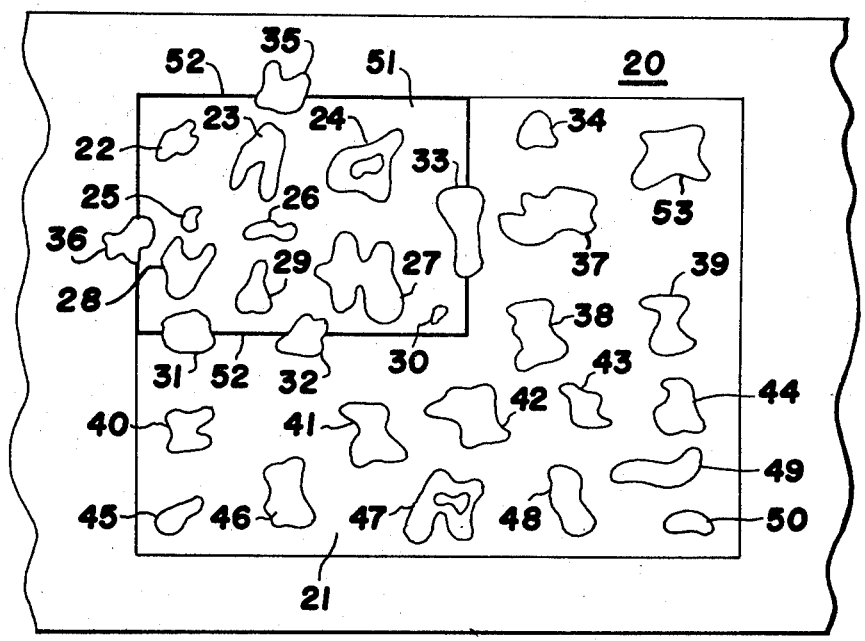
FIG. 2 is an enlarged view of a prepared microscopic slide having a number of objects to be measured thereupon.

An example of a selected region 51 lying within a discrete region 21 is illustrated in FIG. 2, where a microscopic slide 20, or any other suitable particle medium, is arranged to be scanned by the television camera 10. As presently envisioned, measurements will be made for particles 22–30, all of which lie wholly within the selected region 51, and particles 31–33, all of which lie partially within the selected region 51 on two adjacent borders thereof. Particles 35 and 36 which do not lie on the two selected adjacent borders are not measured at this time. By limiting the measurement of partially included particles to those lying on two adjacent borders of the discrete region, statistical bias of the measured results is avoided. Particles 34–50 which lie outside the selected region 51, but within discrete region 21, are not measured at this time. These particles are measured at a later time as the selected region 51 is shifted to different positions within the discrete region 21 and they then fall partially or wholly therewithin. The manner in and the means by which the control center 16 performs this and the other tasks noted below, will be fully hereinafter explained. Depending upon the size of discrete region 21, this procedure is repeated, that is, the selected region is shifted about or changed until all the particles lying within, for example the discrete region 21, have been measured.

Figure 38:
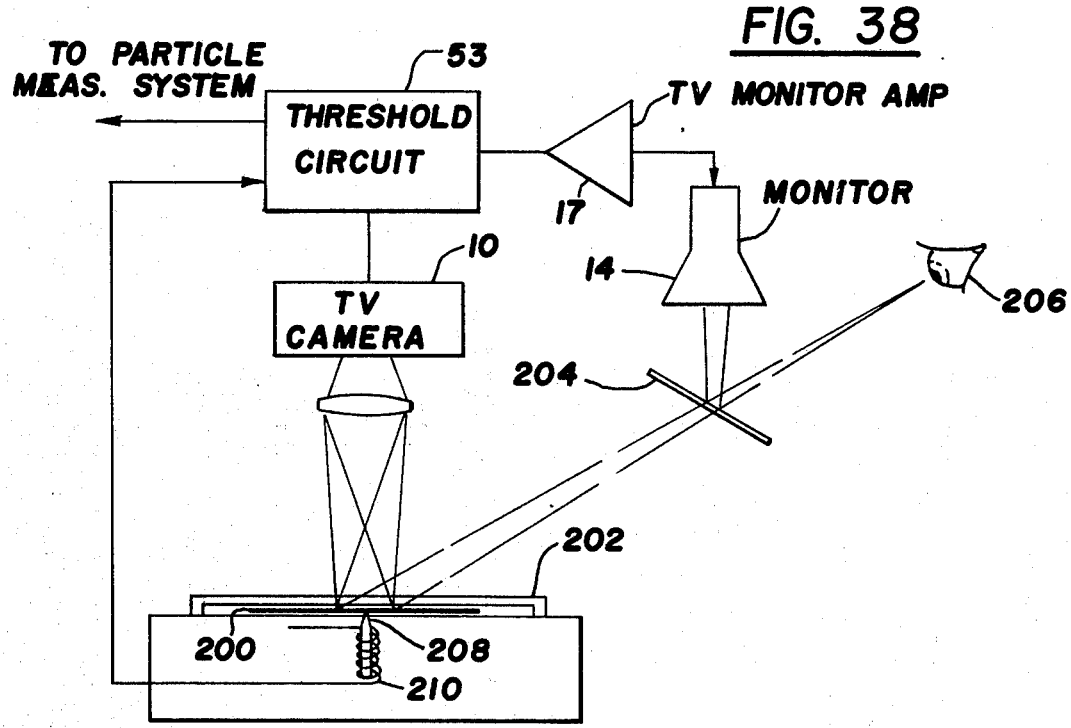
FIG. 38 is a diagramatic illustration of an alternate embodiment of the present invention.

In using a particle measuring system embodying the present invention, the particular discrete region to be scanned can be, obtained from an almost infinite variety of sources. In addition, it is not necessary to include a microscope or other enlarging device in the system. The presence of any discrete region containing images therein lying within range of the scanning device is sufficient. FIG. 38, for example, depicts an alternative arrangement of the particle measuring system shown in FIG. 1, which alternative arrangement is particularly suitable for working directly with photographs or like reproductions, rather than microscopic slides. The operation of this alternative arrangement and its constituent elements will be hereinafter explained. Its existence is noted here at this point only to demonstrate the versatility of the present invention. It can, therefore, be readily understood and appreciated that the particle or image measuring system shown and described herein is employable in almost every situation where the number of particles or images within a discrete region or certain of their physical parameters is to be ascertained.

While the subsequent discussion is generally limited to particles as the objects of interest to be measured, it will be understood that the present invention would function equally as well as long as the objects of interest are discernible by the image producing means employed.

The objects of interest themselves can have almost any shape and assume most any orientation. They are collected from a multitude of sources such as, for example, a sample of dust particles, a spray pattern of fluid droplets, the granular pattern of an enlarged photograph, a cross-section of nerve fibers, a holographic picture, a blood sample smear or the granular pattern of a polished alloy sample. It is to the measurement of the two-dimensional images of these typical objects which the preferred embodiment of the present invention is addressed. While it is their images rather than the objects themselves which are measured, the correlation between object and image is sufficiently certain to allow the results to be used as a direct and accurate measure of the particles themselves. It follows therefrom that the present invention is particularly suitable for the examination and evaluation of microscopic preparations, although its use is not solely limited thereto.

A block diagram of a particle measuring system embodying the present invention and illustrating the system's various components and their interrelation is shown in FIG. 3. The various elements of the system have been separated in FIG. 3 into block format for illustrative purposes only. In practice, the specialized subsystems of the particle measuring system described herein are physically separated into modules, not all of which are necessary to make any one particular particle measurement. In addition, some of these modules are designed to accommodate a number of "plug-in" sub-modules which permits a wide variety of measurements to be made. This "plug-in" versatility is particularly suitable for the system user who wishes to make only a relatively small number of different types of particle measurements or the system user who cannot afford the cost of the entire system at the time of purchase. Of course, the capability of an entire system is always available to the user who desires such immediate versatility. The basic modules and the "plug-in" sub-modules are all further internally sub-modularized to take advantage of the many benefits arising through the use of modularized packaging techniques, well-known to those having acquaintance with this art. It will be appreciated however, that while this preferred packaging arrangement offers such advantages as ease of repair, reduced assembly costs, higher reliability, etc., other modular arrangements or other packaging techniques could be successfully and conveniently employed without any loss of the novel advantages offered by the present invention.

As is shown in FIG. 3, the television camera 10 is optically coupled to microscope 12 in a well-known manner. With the exception of television camera 10, microscope 12 and television monitor 14, the control center 16 comprises the threshold circuit 53, particle selector 80, particle measurement initiator 76 and measurement timing circuit 78. As previously pointed out, the selected portion 51 of region 21 being scanned by television camera 10, is chosen for measurement of the particles lying therein. The video signal developed by television camera 10 is fed by suitable wiring 13 to the threshold circuit 53. The video signal is then passed, in turn, to the television monitor 14 via monitor amplifier 17 and wiring 15. This direct wire arrangement or closed circuit produces, in a manner well-known to those having familiarity with the television art, a like reproduction of the selected area 51 being scanned on the monitor 14. The television monitor amplifier 17 is shown in FIG. 3 as a distinct and separate element and, functionally, this is the case. However, in practice, it has proven very convenient to physically include the monitor amplifier 17, the purpose of which will be hereinafter explained, on one of the circuit boards (not shown) which comprise the threshold circuit 53.

The vidicon television camera 10 preferred for use in the present system is a relatively small and lightweight camera. The details of its operation can be found in any comprehensive textbook on television art, such as, for example, *Basic Television* by Bernard Grob, Third Edition, published by McGraw-Hill. It will also be appreciated that other scanning devices such as, for example, a flying spot scanner, could be substituted for the camera without affecting the system's performance. The television camera 10 scans at the standard rate of 525 horizontal lines per frame, each frame being comprised of two fields, each of which successively scan one-half line removed from the previous field, thereby interlacing odd and even horizontal scan lines in the frame. It is preferred that a fixed 2:1 interlace be used in order to reduce or completely eliminate eye strain and fatigue. It is also preferred to use 525 horizontal line scan per frame equipment in order to employ standard television components and hold down the system's costs. Of course, any convenient number of horizontal scan lines per frame can be used and, in fact, the greater the number of lines, the greater the resolution of the system. Experience has proven, however, that the advantages of the 525 horizontal scan lines per frame scheme far outweight its disadvantages. The fixed 2:1 interlace employed has also proven to be an optimum value, although other interlace arrangements will give satisfactory results.

The selected particle measurement module 54 constitutes one of the basic modules previously mentioned. Its inclusion in the system permits the measurement of a number of particle parameters such as, for example, area of a particle including holes, area of a particle excluding holes, longest dimension, Feret's diameter, projected length, or the height of any particle concavities. The type of measurement being made, controls and dictates the evaluation of the measuremennt. In understanding the meaning and relative importance of the measurements obtained from the particles being scanned, the purpose of the measurement is self-evident for some of the enumerated possible measurements from their names alone. Others of the identified measurements are, however, unfamiliar to the neophyte in the art of particle measurement and analysis. In order to better understand and appreciate the meaning and relative importance of the measurements being made it seems appropriate to offer a brief explanation thereof at this point. A greater in depth treatment is unnecessary for purposes of the specification, but is available in comprehensive textbooks on the subject if reference thereto is thought necessary. One suggested source might be *Small Particle Statistics*, Second Edition, by G. Herdan, published by Academic Press, Inc., New York, 1960.

Figure 6:
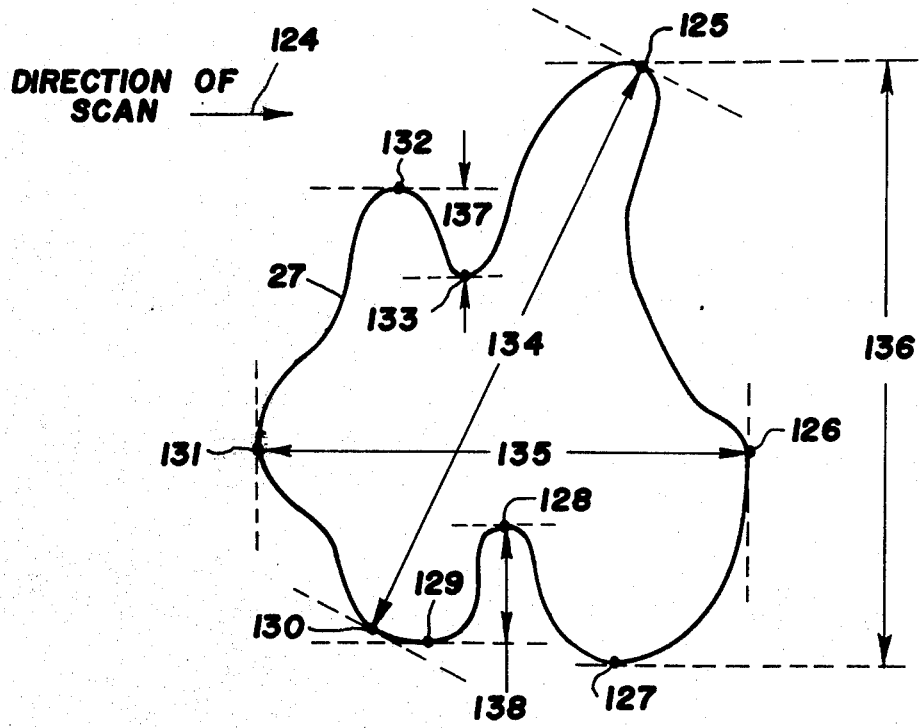
FIG. 6 is an enlarged view of a typical object to be measured, illustrating some of the measurements possible through employment of the present invention.

A particle 27 which appears in selected region 51 in FIG. 2, has been magnified and isolated for purposes of this discussion and is separately illustrated in FIG. 6. It will be appreciated that while the present discussion of particle measurement is set forth in the context of a selected or single particle, it is equally applicable to entire field measurements. The importance of particle area measurements, whether holes or voids contained therein are excluded or included in such measurements, are believed to be self-evident. They are most often employed to yeild concentration percentages or like information concerning the particles which lie within the discrete region being scanned. Since no further discussion of area measurement is felt warranted, particle 27 has not been illustrated as containing any holes in order to keep this explanation as simple as possible.

Feret's diameter is the length between two parallel tangents taken on the opposite sides of the particle outline in an arbitrarily fixed direction, irrespective of the orientation of each particle coming up for measurement. In FIG. 6, the arbitrarily fixed direction has been conveniently taken at right angles to the scanning direction, as indicated by sagittal line 124. Feret's diameter for particle 27 is represented by the distance 136 between points 125 and 127, the tangential points on the opposite sides of the particle in the chosen direction. It should be noted that this direction once chosen, remains constant for all particles measured in a given discrete region. Feret's diameter is useful in particle measurement since it bears a fixed or otherwise readily computable relation to certain other particle parameters such as, projected length or shape factor.

Projected length, a useful measurement in determining particle boundary length, is determined for any specific particle, regardless of its orientation, by adding to the Feret's diameter for the entire image, the Feret's diameter for any particle boundary indentation and holes, if any. Thus, the projected length for particle 27, in its FIG. 6 orientation, would be the Feret's diameter for the entire particle or distance 136, plus the Feret's diameter of all indentations or distance 137, which is the tangential distance between points 132 and 133, plus distance 138, which is the tangential distance between points 128 and 129. Note that the indentation is given effect only from a tangential intercept with its deepest point 128, or 133 to the tangential intercept with the furthest or end point 129, or 132 of the smaller of the two projections which define the indentation, these tangential intercepts being determined, as defined, in the direction of scan. To measure an indentation out to the longer of the indentation defining projections would introduce an error into the measurement since the longer of these projections has already been given effect in the Feret's diameter measurement for the entire particle. The projected length therefore for particle 27, as illustrated in FIG. 6, would be the sum of distances 136, 137 and 138.

Projected length as a readily determinable particle parameter is very handy to the user of the instrument since the particle boundary length has been found to be equal to $\pi$ times the average projected length for all particle orientations. It is easily understood and appreciated that projected length, even over a number of particle orientations, is simplier to determine using the present invention than the particle boundary length would be by direct measurement. Thus, quick and accurate boundary length measurements of great numbers of particles can be achieved individually or collectively by employment of the present invention.

The ratio of projected length to Feret's diameter is denominated as a shape ratio of a particle in a particular orientation. Thus, a circle, for example, would have a shape ratio of unity since there are no indentations or projections therein and its Feret's diameter, consequently, would equal its projected length. Since indentations are added to overall Feret's diameter to determine projected length, a particle shape ratio greater than unity is indicative of covex particle periphery, while shape ratios of less than unity indicate concave particle periphery. If particle shape is of importance to the user of the system disclosed herein, it can be easily characterized by resort to the relatively simple measurement of Feret's diameter and of projected length. Other shape factors can also be determined with the present invention.

The longest dimension of a particle is, as the name of this parameter measurement implies, the maximum value of Feret's diameter taken over all orientations of the particle's image. In determining this parameter, no dependance on scan direction is made. In FIG. 6, the longest dimension 134 is drawn between boundary points 125 and 130. It should be kept firmly in mind that the longest dimension measurement produced by the system is not obtained in such a direct manner, as graphically illustrated. As will later become evident, a more complex process is followed in obtaining the longest dimension of a particle.

Another parameter measured by the system is the maximum chord of a particle. This parameter equals the longest horizontal distance which can be drawn within the particles's boundaries. Unlike the other "meausured" parameters, the maximum chord result is not outputed directly by the system. Instead, the operator selects a predetermined arbitrary maximum chord and system readout then indicates the total number of particles having maximum chords equal to or exceeding the preselected maximum chord. Thus, the maximum chord measurement is of assistance in making "oversize" determinations, but is not itself outputed as an image measurement. Of course, various other particle measurements using the maximum chord can be made with the present invention, or the maximum chord itself can be outputed if desired. The maximum chord 135 for particle 27 is shown in FIG. 6 as the distance between points 126 and 131.

As previously mentioned in connection with prior art particle measuring systems, one of the chief disadvantages of these systems was their inability to measure the longest dimension of an image in other than the direction of scan. Obviously, the determination of longest dimension by manual methods was a time consuming task not compatible with today's high speed requirements. It is known, based on material disclosed by H. Steinhaus in 1930, that the longest dimension of a particle can be accurately determined, with a maximum error of plus or minus 3%, by calculating the maximum of the Feret's diameters as measured in only four different directions of scan or, alternatively, for four orientations of the particle. In the prior art systems, this meant shifting the particle's orientation four times and holding scan direction constant or holding the particle orientation constant and shifting the direction of scan four times. If manual methods were used, then four separate measurements of the image would be required to make the determination. In either case, a great deal of time was consumed in making a relatively accurate determination of the longest dimension wholly contained within a particle. The longest dimension module 60 of FIG. 3, employed in the present system can accurately determine the longest dimension of a particle with a maximum error of only plus or minus 3% due to the approximation used, without rotating and without reorienting the particle. Neither is the direction of scan changed as is the case with the prior art apparatus.

The entire field measurement module 56 is another of the basic modules previously described. The entire field measurement module 56 permits the measurement of the total of certain image parameters. Thus, for example, the total projected length which is the sum of the projected lengths of all the particles in the field of view or the total area of all the individual particles in the field of view, can be computed or measured by employing this particular plug-in sub-module. The entire field measurement module 56 can also be used to measure average projected length and average area. Each of these measurements is obviously determined by dividing the total resultant parameter by the count or number of particles within the field of view as determined by the entire field count module 58.

The particle parameter selector 62 performs a number of functions in the system described herein. One of these functions involves switching the various signals inputed into the particle parameter selector 62 to the objective power compensation module 64. Another of its functions is to switch other sets of signals to generate the outline or brightened pattern of the selected particle. The binary video signal corresponding to the selected particle is fed back to the threshold circuit module 53 where appropriate circuitry causes the outline of the selected image to be artifically brightened. The threshold circuit module 53 receives this binary video signal from the particle parameter selector 62. Still another function of the particle parameter selector 62 is to generate the signals for the Feret's diameter of the selected particle. Yet another function of the particle parameter selector 62 is to inhibit the measurement timing module 78 so that any frame within which a selected particle is not recognized as such by the threshold circuitry will not be included in the determination of the measurement being made. All of the functions and the logic circuitry which enables the performance of these functions by the particle parameter selector 62 will be more fully discussed hereinafter.

The entire field count module 58 receives the binary video signals for all of the particle detected or recognized as such within the selected area 51 being scanned. It is believed that this portion of the particle measuring system, that is, the entire field count module 58 and the modules associated therewith, comprise, within themselves a subsystem which is the first of a kind to accurately count particles of any arbitrary shape or orientation. This capability also includes those particles having holes within or internal to the particle. There is provided within the entire field count module 58, the appropriate logic circuitry and a delay line which delays the incoming video pulses by a predetermined time period. The delay line and the logic circuitry combine to insure that a specific particle will be counted once and once only, whether such particle has downward pointing branches, upward pointing branches or any other unusual profile configuration. When it is determined that a particle has been counted, that is, the video pulses which comprise a specific particle have ended, a count pulse will be produced, providing no intercept has occurred for the particle on the preceeding horizontal scan line. The output of the entire field count module 58, which comprises a train of pulses, one for each of the particles detected, is fed to the entire field count readout counter 72 where the count is sorted. The entire field count readout counter 72 is actuated by the particle measurement initiator 76 and the measurement timing module 78. These two modules together with the readout counter control 74 combine in insure that the entire field count readout counter 72 will be actuated for a total of only six or any other convenient number of frames of scan. These modules also insure that the six frames of scan are frames within which the particles have been recognized as such by the system. Consequently, excellent repeatability of results is provided.

When the system is operating to count all the particles lying within the selected area 51 at one time, the particle measurement initiator 76 includes a switch (not shown) which is located on the front of the control center 16. Once the entire field mode of operation has been chosen by the operator, the operator merely throws the switch to obtain the count or any other entire field measurement selected. The measurement timing module 78 determines the number of frames during which counting or measuring is performed. In addition, the measurement module 78 works in conjunction with an inhibit circuit physically located in the particle parameter selector module 62. This inhibit circuit, which is described in greater detail in conjunction with the discussion relating to the particle parameter selector module 62, inhibits measurement, if a particle is not recognized as such by the system. Of course, due to its nature and location in the system, the inhibit circuit operates only when the system has been put into the selective particle measurement mode.

In the selective particle or image measurement mode, a particular particle is selected for measurement by using the particle measurement initiator 76. The particle measurement initiator 76 comprises a light pen 19, as seen in FIG. 1 having a switch (not shown) mounted therewithin. Thus, when the operator of a system wishes to actually make measurements of the particle he has selected, he simply presses the light pen against the monitor screen.

When operating in the selected particle measurement mode, the measurement timing module 78 controls the sizing readout counter 68. The combination of the particle measurement initiator 76 and the measurement timing module 78 serves to gate on the sizing readout counter 68 for an appropriate period of time, during which time there is an assurance that only particles recognized as such by the modules are involved in the measurement determination.

As previously mentioned, an oversize module 67 is included in the preferred system to produce a count of all particles having a maximum chord which exceeds or equals an adjustable predetermined value. The oversize module 67 is provided with appropriate logic and electronic circuitry for effectively comparing the binary video signal outputed by the threshold circuit module 53 to the predetermined value and determining therefrom the maximum chord of the particles. The logic circuitry provided for discriminating between those particles having a maximum chord equal to or larger than the preselected chord is adjusted by the operator of the system as desired. The oversize module 67 works in conjunction with the entire field count module 58. In actual practice, the former module comprises one of the plug-in sub-modules previously mentioned. Where it is not desired or necessary to have an oversize capability, only the entire field count module 58 is used.

The output of the particle parameter selector 62 is proportional to the magnitude of the size measurement being made. This output is passed along to the objective power compensation circuitry 64. This circuitry permits the measured results to be presented directly in suitable units, independent of the objectives used in the microscrope 12. If, for example, the microscope 12 has been adjusted to enlarge region 51 by some multiple of its actual size, an appropriate and opposite correction would be required to reduce the parameter, as determined, to its actual value, The objective power compensation circuitry 64 is employed for this purpose. Thus, the input to this circuitry is appropriately corrected thereby to compensate for the magnification of particle image size due to the objectives within the microscope 12.

In measuring particles, it is often necessary to group the results into size ranges. For example, if the parameter selected for measurement was the particle's area, the output of the objective power compensation module 64 to the size distribution logic module 66 would be sequentially arranged according to the predetermined area size ranges as the particles' are individually picked out by the operator. The size distribution logic module 66, as its name implies, assigns particles to a predetermined sub-range within a predetermined expected total range of particle sizes. As the particle areas are inputed into the size distribution logic module 66, the logic therewithin determines by comparison to what sub-range of area measurement a particular particle should be assigned. The logic then makes the assignment outputing some indication of this assignment to a bank of mechanical counters 70. The entire bank of mechanical counters 70 is adapted to receive and display the entire expected range of the particle parameter being measured. Assuming the operator has selected particle area as the parameter he wishes to output to the bank of mechanical counters 70, when he has finished pointing the light pen 19 at each of the particle images displayed on television monitor 14, the bank of mechanical counters will show the complete area distribution for the entire field of view. Of course, a size distribution profile can be obtained automatically by switching the system into the oversize count mode, if the semi-automatic selective particle mode is not suitable for one reason or another. In addition, it will be readily understood that any particular size parameter measured in the selective particle measurement mode can be inputed via the size distribution logic module 66 to the bank of mechanical counters 70 for display.

If, however, it is not desired to display a size distribution profile for the particle parameter being measured, but rather to display the individual parameter for each particle one at a time, the output of the objective power compensation module 64 is fed instead to the sizing readout counter module 68. As previously mentioned, the sizing readout counter 68 module is gated on by the combination of the particle measurement initiator 76 and the measurement timing module 78. It is assumed, of course, that the selected particle has been detected by the system as a particle to be measured and that the inhibit signal circuitry has not been actuated.

It has been found that visual display of the particle measurement on the upper portion of the television monitor 14, or any other convenient portion thereof, is convenient for the operator and results in more efficient use of his time. In the alternative, of course, the measurement obtained can be displayed via some other appropriate equivalent readout device. In the preferred system, as previously noted, the readout counter module 74 accepts the information offered by the sizing readout counter 68 or the entire field count readout counter 72, depending on which particular mode of measurement the system happens to be in. The information inputed to the readout counter module 74 is then used to cause the generation, via appropriate logic circuitry, of signals related to numerical characters which correspond to the measurement which has been made. These numerical characters are then displayed on the monitor 14 where the operator can easily see the measurement results without having to turn away. In order not to severly limit the size of the scanned area, the height of the characters generated by the readout counter module 74 and fed back to the television monitor 14 is limited to approximately 1/16 of the picture height. It should be noted that the results generated by the two readout counters 68 and 72 fall into two catagories; that of size, which has a corresponding unit of measurement associated with it, and that of count, which is a dimensionless number. Accordingly, depending upon the measurement being made, a units character corresponding to that unit of measurement is also generated and displayed alongside the determined measurement.

The overall system operation, especially the interrelation and interaction of its individual component modules, will become more readily apparent after a reading of the following detailed discussion. It should be noted, however, at this point, that the functional capability represented the block diagram illustrated in FIG. 3, is in itself a significant advance over the prior art. Firstly, this block diagram diagramatically illustrates the constituent functional modules of a system wherein a given parameter of a group of particles lying within a discrete region can be measured, the total of any of these parameters can be measured, or the total number of particles can be measured, all either semi-automatically or automatically. In addition, the disclosed system will make the above enumerated measurements regardless of the shape or periphery complexity of the particles being measured. No known prior art system is as versatile, quick, and, above all, accurate. Secondly, the system depicted in FIG. 3 represents a significant advance over the prior art due to its ability to automatically measure the longest dimension contained in a particle without physically shifting the particle or measuring apparatus, an ability not heretofore known to be available in prior art apparatus. Thirdly, the system depicted in FIG. 3 represents a further significant advance over the prior art because of its ability to automatically or semi-automatically count the number of images lying within a discrete region regardless of the orientation or shape of the particles.

B. DETAILED SYSTEM DESCRIPTION

The following discussion of the particle measuring system further expands upon the many details mentioned in the above general description of the system. In this detailed discussion, it is assumed that the described system comprises all of the possible constituent subsystems and that appropriate switching capability is provided for selectively using them as desired. In actual practice, it is more likely that only certain of these subsystems will be incorporated into any one system. However, this does not affect the operational description which follows.

I - THE THRESHOLD CIRCUIT

Figure 4:
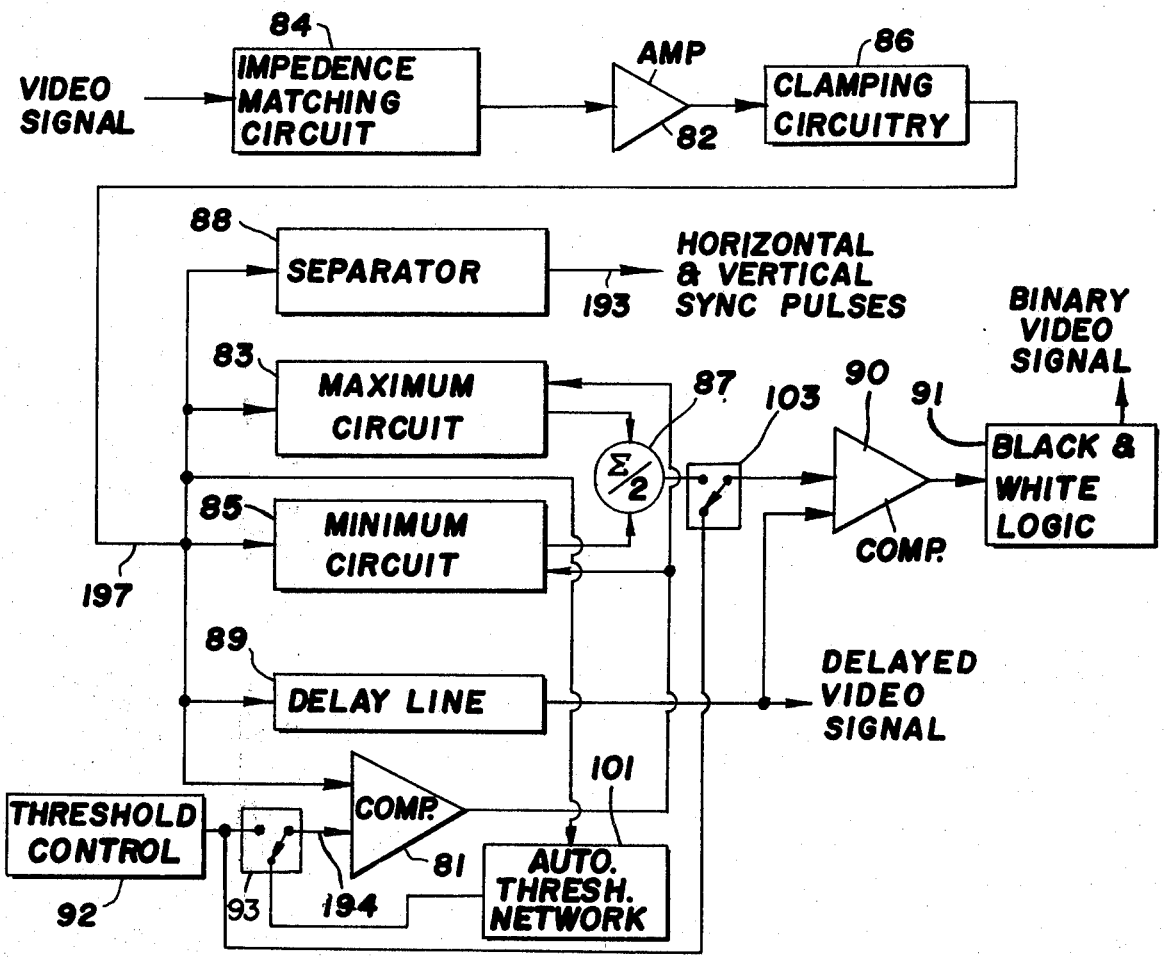
FIG. 4 is a block diagram of the threshold circuit shown in FIG. 3.

The threshold circuit 53 of the particle measuring system disclosed herein is depicted in block diagram form in FIG. 4. The primary function of this circuit is to develop a binary video signal which corresponds to the video signal developed by television camera 10. The binary video signal has transitions occurring at the boundaries of the particle images which camera 10 is viewing.

In performing this function, the threshold circuit 53 operates in one of three possible modes. In the first or manual mode, a predetermined image intensity level is manually set to determine the points at which the binary video signal transitions occur. This manual reference level is determined by the operator, who adjusts a threshold control 92, preferably a potentiometer, located on the front panel of the apparatus to set the image intensity reference level. The second mode of operation is termed semi-automatic and here also, the operator determines the threshold level at which the system will respond. However, a binary video signal transition does not occur merely when the video signal reaches the threshold level set by the operator. Instead, this threshold level is used to indicate to the system that when the video signal has crossed thereover, it is in the vicinity of a point at which a binary video transition is required. In the semi-automatic mode, the threshold level at which the binary video transitions occur is determined by averaging the maximum and minimum values achieved by the video signal in the immediate vicinity of the operator-set threshold level crossover. Once the operator has manually set the initial threshold level, the remainder of the determination of binary video transitions is automatic, hence the name semi-automatic. The final mode of operation of threshold circuit 53 is the automatic mode. Once the operator has switched the threshold circuit 53 into this mode of operation, he has no further control over this function. In the automatic mode, the binary video transitions occur at the average level of the maximum and minimum values of any video transition which exceeds a certain magnitude and slope.

As illustrated in FIG. 4, the video signal produced by television camera 10 is fed directly to an impedance matching circuit 84. This circuit serves to match the output impedance of the television camera 10 and the video cable 13 which brings the video signal into the threshold circuit 53. The magnitude of the video signal is amplified by amplifier 82 and the inverted output is fed to clamping circuitry 86 where the bottom of the horizontal sync pulses contained in the video signal are clamped to a fixed D.C. level. The clamping action of circuit 86 sets one of the limits to which the video signal may swing.

The amplified, clamped video signal is then fed, via suitable wiring 197, to comparator 81. It is this comparator which is used in the automatic mode to determine when a transition is to take place in response to video signals having a greater magnitude and slope than predetermined values. In the semi-automatic mode, comparator 81 determines when the video signal crosses the image intensity reference level preset by the threshold control (not shown) which reference signal appears on line 194 as an input to comparator 81. In the automatic mode, the input 194 to comparator 81 is switched from the threshold control 92 to the output of the automatic threshold network 101 by a switch 93. In the manual mode of operation, the comparator 81 plays no role at all.

The video signal is also fed to the maximum circuit 83 and the minimum circuit 85. These two circuits only function in the automatic and semi-automatic modes of operation and determine the maximum and minimum values reached by the video signal immediately after comparator 81 has switched. To be more specific, let us consider the operation of the maximum circuit 83. The video signal enters this circuit together with the output of comparator 81. If this output is positive or "up," the maximum circuit 83 clamps down onto the video signal and follows it up until the peak value of the video signal is reached. This peak signal value is stored until the next positive going transition by comparator 81. At a negative going transition by comparator 81, the maximum circuit outputs the most positive voltage reached since the last positive going transition. Minimum circuit 85 provides similar information or outputs as the maximum circuit 83, except that all polarities are reversed. The respective outputs of the maximum and minimum circuits 83 and 85 are passed to a summing network 87 which determines the instantaneous average of the outputs of the maximum and minimum circuits. It is this voltage output by summing network 87 which is used to determine the threshold level for comparator 90.

The other input to comparator 90 is a delayed version of the video signal which appears on line 197. As shown in FIG. 4, the video signal is delayed by delay line 89 for a period in the order of 1.0 microseconds. The purpose of the delay is to provide sufficient time for the maximum and minimum circuits 83 and 85 to determine the respective values of the video signal before the instant at which a transition is to occur.

Comparator 90, consequently switches whenever the delayed video signal crosses the midpoint of the maximum and minimum voltages of a transition selected by comparator 81, whether the instrument is in the automatic or semi-automatic mode. In the manual mode, on the other hand, comparator 90 switches at a D.C. level determined by the threshold control 92. Switch 103 is moved in accordance with the selected mode of operation to thereby provide comparator 90 with the proper input.

Figure 5:
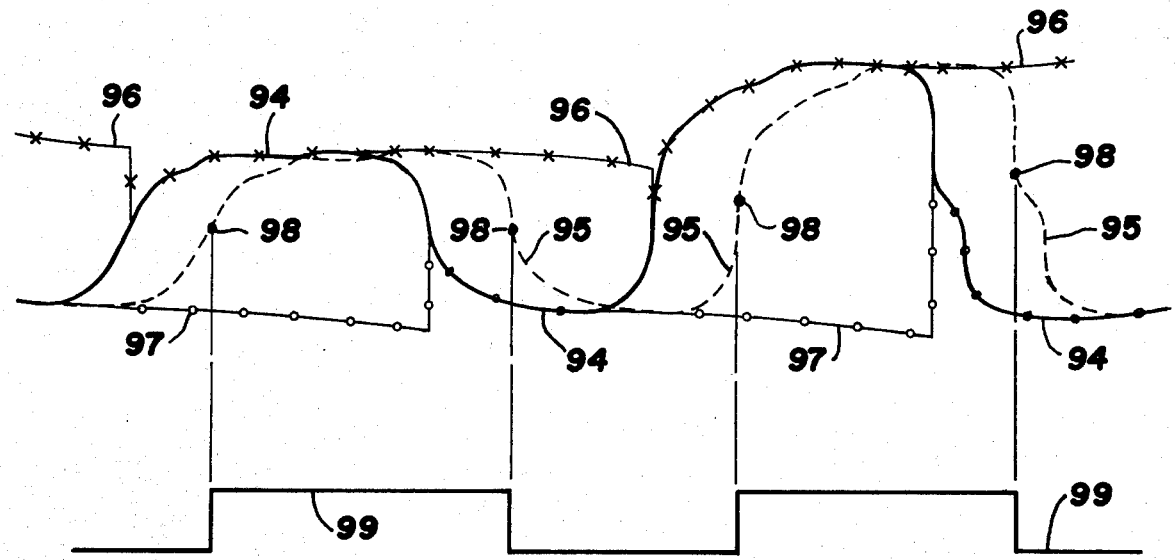
FIG. 5 is a time-based plot of the waveforms of signals in the threshold circuit illustrated in FIG. 4.

An understanding of the operation of threshold circuit 53 will be enhanced by reference to FIG. 5, wherein the relationship of the various signals and elements noted above is illustrated. The video signal developed by camera 10 is shown as a solid line 94. The delayed video signal, which is outputed from the delay line 89 and constitutes one of the inputs to comparator 90, is illustrated as a dashed line 95, which is shifted to the right of video signal 94 by the effect of the delay line 89. The maximum and minimum value of the signals indicated by reference numerals 96 and 97, respectively, represent the values reached by the video signal during a transitionary period. Maximum signal 96 is represented by a solid line having spaced crosses superimposed thereupon. Minimum signal 97 is represented by a solid line having spaced circles superimposed thereupon. Note that the maximum signal 96 is pulled down to the video signal 94 close to the beginning of the leading edge of a video signal transition. The minimum signal 97 conversely is pulled up to the video signal close to the start of the trailing edge of a video signal transition. This is done to insure that the maximum and minimum determinations accurately and quickly reflect the highest and lowest values reached by the video signal 94 are not erroneously influenced by signal drift. When the various midpoints 98 have been determined, comparator 90 switches "up" or "down" when the video signal crosses the average level thereby generating a corresponding binary video signal 99. The width or duration of each binary video pulse corresponds to the time interval between successive midpoints 98.

Separator 88 serves to "separate" out the horizontal and vertical sync pulses from the video signal for use as timing pulses elsewhere in the system. As will be realized by those familiar with the television art, the act of "sync separation" produces a train of horizontal and vertical sync pulses. Separator 88 does not functionally form a portion of threshold circuit 53. It is, however, physically located in the circuit boards which comprise the threshold circuit 53 since it is an obvious convenience to locate separator 88 in close proximity to a point where the video signal may be sensed.

The binary video signal produced by the switching action of comparator 90 is fed to a black and while logic circuit 91. In this circuit, the binary video signal is either inverted or maintained at its same polarity depending on the "color" of the particles and their background. While an alternative scheme could be easily implemented, it is preferred to pass the binary video signal unchanged through logic circuit 91 where a "black" particle on a "white" background is being measured. A "white" particle on a "black" background will result in an inversion of the binary video signal by logic circuit 91. A switch (not shown) located on the front panel of control center 16 allows the operator to set logic circuit 91 in accordance with the relative "color" of the objects and background being scanned. A further input to logic circuit 91 is hereinafter discussed with respect to FIG. 32. The final output of the threshold circuit 53 is, therefore, a binary video signal which is positive when the electron beam of camera 10 is scanning over a particle and zero when he beam is scanning over the background of the field of view regardless of the relative "color" of particle and background.

II - SELECTIVE PARTICLE MEASUREMENT

The selective particle measurement circuit 54 (hereinafter described as the SPM), as its name implies, serves to provide measurement data for selected particles within the field of view. The SPM circuit 54 is employed in conjunction with the particle selector 79 and is connected thereto by wiring 80. In the preferred embodiment described herein, the particle selector 79 comprises a light pen 19, as is shown in FIG. 1. The details of operation of light pen 19 are discussed in greater depth in another section of the specification.

Figure 7A:
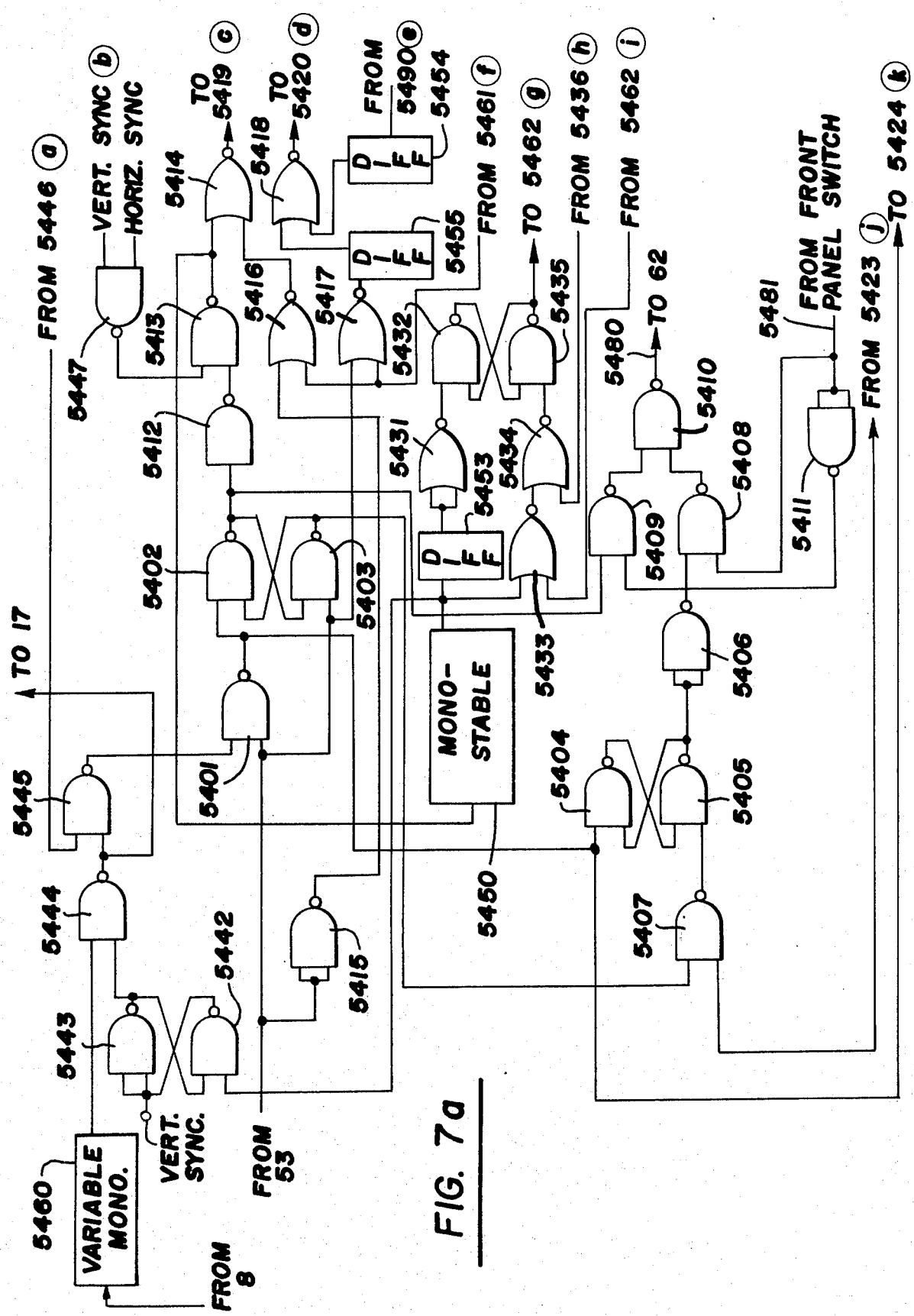
FIG. 7 is a combined block and logic diagram, broken into FIGS. 7a and 7b, of the selective particle measurement circuit shown in FIG. 3.
Figure 7B:
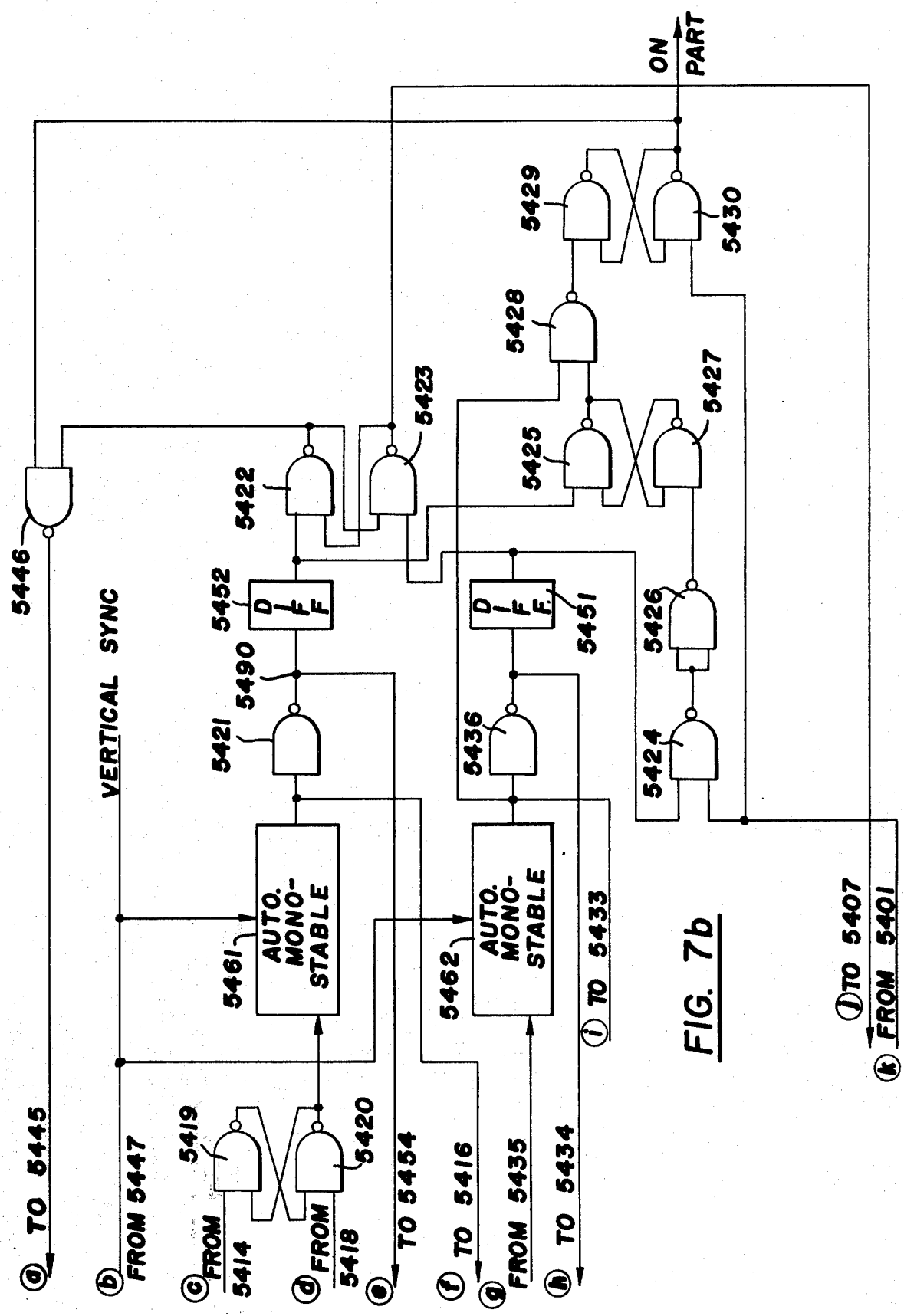

When the operator points the light pen 19 at the image of the selected particle appearing on the monitor 14, he brings the SPM circuit 54 into operation. As will be explained, the SPM circuit 54 separates the binary video signal corresponding to the selected particle from the complete binary video signal. To indicate that the particle measuring system is operating properly and to generally define the measured size and shape of the particle, a bright halo is artificially imposed around its image on the monitor 14 when light pen 19 is pointed thereat. As an aid to using light pen 19, a bright half-moon shaped spot is created on the monitor 14 at the point to which light pen 19 is pointed. Thus, the operator can isolate a selected particle merely by moving the pen 19 and the moonshaped spot so that it touches the top right extreme portion of the selected particle's image. The details concerning the halo and half-moon indicator spot are set forth hereinafter. FIG. 7 comprising FIGS. 7a and 7b depicts a logic block diagram of the SPM circuit 54. The two main inputs thereto are the signal from the image selector 80 or light pen 19 and the binary video signal from the threshold circuit 53. The main output, as noted, is the binary video signal corresponding to the selected particle which is passed on to the particle parameter selector 62.

The interconnections between the circuitry of FIGS. 7a and 7b is designated by small case letters a through k encompassed in circles. In addition, for ease of understanding of the specification, character references have been selected, when possible, to designate a relationship to a component illustrated in FIG. 3, by adopting the designated character reference of the respective component of FIG. 3 as two digits of the four digit character references in this disclosure. For example, variable monostable 5460 of FIG. 7a is a logic component of the SPM circuit 54 of FIG. 3.

Figure 8:
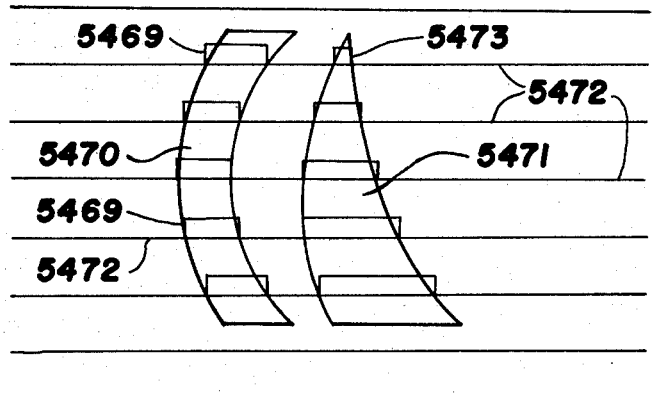
FIG. 8 is an enlarged view of the pattern detected by the particle selector shown in FIG. 3 and of the pattern generated to show the location at which it is pointed.

The signal received from the particle selector 79 comprises a burst of pulses if the selector is a light pen, or, possibly, a single pulse if the particle selector is a joy stick, potentiometer or similar means. When the light pen 19 is employed, as is preferred, a burst of pulses is produced once every field. These pulses correspond to the positions on a group of lines to which the light pen is pointing and are generated by a photosensitive device (not shown) located in the light pen 19. These pulses can conveniently be thought of as defining a region which falls under the pen 19. This region, which has a half-moon like shape 5470 is illustrated in FIG. 8. This shape is rather difficult to use because of the width of its top portion. In regions where the images are crowded together, the width of the upper portion might make it difficult to specify a particular image for measurement. Consequently, a more convenient shape 5471, also illustrated in FIG. 8, is generated by a variable monostable 5460 in, as best seen in FIG. 7a, response to the burst of pulses emanating from light pen 19. Monostable 5460 receives the first pulse emanating from light pen 19 after a vertical sync pulse, the first light pen 19 pulse in a field, and produces in response thereto, a pulse 5473 of relatively short duration. This first pulse 5473 generated by monostable 5460 initiates a timing circuit (not shown) contained therein, which circuit lengthens the monostable delay as time passes following the initial pulse 5473. Thus, such light pen pulse 5469 following the initial light pen pulse after the vertical sync pulse in a particular field of view, causes the generation by monostable 5460 of corresponding pulses of increasing width as illustrated in FIG. 8. The variable delay or timing circuit of monostable 5460 is reset by the next occurring vertical sync pulse.

Figure 9:
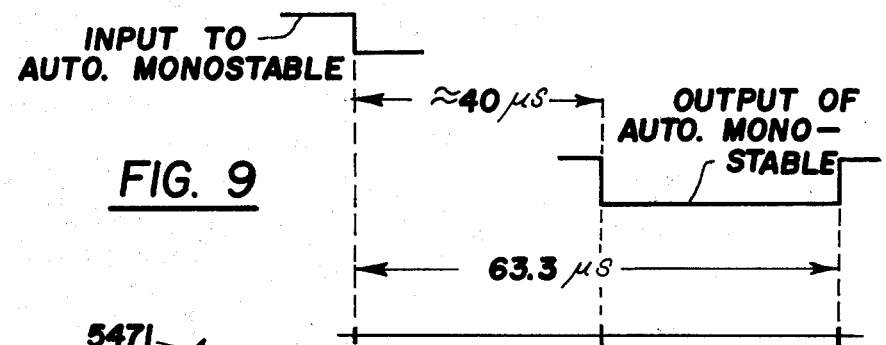
FIG. 9 is a time-based plot graphically illustrating the relationship of the input, output and delay of an automatic monostable used in the present system.

Referring to FIG. 7a, the output of variable monostable 5460 is fed to gate 5444, the other input of which is connected to the output of gate 5443. If the output of gate 5443 is positive, then pulses from the variable monostable 5460 pass through the gate 5444 onto gate 5445 to one input of gate 5401. The binary video signal from threshold circuit 53 is fed to the other input of gate 5401. Thus, whenever a pulse from variable monostable 5460 coincides with a binary video pulse, the output of gate 5401 switches negatively causing the latch made up of gates 5402 and 5403 to switch and produce a positive output from gate 5402. This pulse is then passed through gates 5412, 5413 and 5414 to the latch comprised of gates 5419 and 5420, which latch is thereby switched to produce a negative-going output which is fed to the automatic monostable of FIG. 7b. The automatic monostable 5461 delays for a period of approximately 40 microseconds before producing at its output, a negative-going pulse. The output of the automatic monostable 5461 then remains negative until exactly 63.3 microseconds after its input went negative. After this 63.3 microsecond interval, the output of monostable 5461 goes positive. FIG. 9 shows the output response of the automatic monostable 5461 as described. The 63.3 microsecond delay is a very significant figure which works out to be just 0.2 microseconds less than the period for one horizontal line scan of the television components. Of course, a different delay time would be employed were a different scanning scheme chosen. The 63.3 microsecond period is automatically monitored and calibrated by the monostable 5461 during the vertical sync period. Thus, the monostable 5461 is calibrated 60 times a second to insure that the 63.3 microsecond interval is maintained exactly.

When the positive transition at the output of monostable 5461 occurs, it is passed through gate 5421 and the negative-going differentiator 5452. The resulting negative-going pulse is passed to a latch comprised of gates 5422 and 5423 and causes the output of gate 5422 to go positive. The resultant positive pulse from gate 5422 passes through gate 5446 and back through gate 5445 to gate 5401. Thus, just a short distance before the position of the image intercept on the first horizontal scan line 5472, as best seen in FIG. 8, the input to gate 5401 is set to permit the second intercept of the particle's image to pass into the latch comprising gates 5402 and 5403. It will be recalled that the first opening of gate 5401 was due to a pulse from the variable monostable 5460. The second time gate 5401 is opened however, is because of a pulse outputed by the automatic monostable 5461; a pulse which was derived from the first intercept of the particle's image and delayed for a period slightly less than the time required to go from the beginning of the first intercept to the same position on the next horizontal line scan.

The action of automatic monostable 5462 is similar to that of automatic monostable 5461, except that automatic monostable 5462 acts on the trailing edge of each intercept, whereas automatic monostable 5461 acts on the leading edge of the intercept. It is the output of automatic monostable 5461 which serves to open the latch comprised of gates 5422 and 5423, thereby causing the input of gate 5401 to pass the next intercept. This latch is subsequently reset by automatic monostable 5462. Thus, it is evident that each intercept of the particle by camera 10 ultimately causes gate 5401 to permit the next intercept of that particle to pass into the SPM circuit 54. This next intercept, in turn, is delayed; its leading edge is delayed by monostable 5461 and its trailing edge is delayed by monostable 5462 to permit gate 5401 to open during the time when the subsequent intercept is expected. Hence, the pulses appearing at the output of gate 5402 correspond to the binary video signal of the selected particle.

Figure 10:
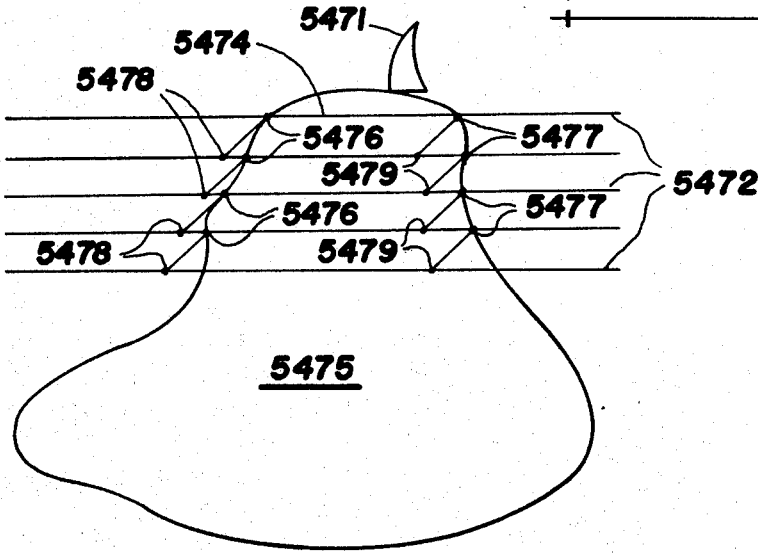
FIG. 10 is an enlarged view of an object selected for measurement showing the pattern indicating the location at which the particle selector is pointed and the points at which the delay periods of the automatic monostables used in the present system begin and end.

Having discussed the main signal paths in the SPM circuit 54, some details thereof can now be more meaningfully explained. When a pulse from variable monostable 5460 enters gate 5444 to subsequently pass to gate 5401, no action is taken until this pulse coincides with a pulse from the binary video signal. At this point, as previously discussed, the latch comprising gates 5402 and 5403 switches, causing a pulse to be passed on to automatic monostable 5461. The latch is then reset through the input to gate 5403 by the binary video signal when it reaches zero. There is, as a result, a negative going transition at the output of gate 5402 which is passed through gates 5412 and 5413 to monostable 5450. The output of this monostable remains negative for a period of approximately 0.35 microseconds. It is this negative-going pulse which is passed on to automatic monostable 5462. This pulse from monostable 5450 is also passed through the latch comprised of gates 5442 and 5443 which resets the latch, thereby insuring that the output of gate 5443 is down. This blocks any further pulses from variable monostable 5460 appearing at the output of gate 5445. Thus, only the first pulse from the variable monostable 5460 which coincides with a binary video pulse reaches the input of gate 5401. Subsequent pulses from the monostable, if there are any, are blocked off by gate 5444. The output, from gate 5444, of the SPM circuit 54 appears on the line connecting television amplifier 17 thereto and is the means by which the light pen indicating spot 5471 is generated to appear on the monitor. However, once the particle's image is intercepted by a horizontal scan line, the particle outline or halo also appears on the monitor when light pen 19 is correctly placed, as illustrated in FIG. 10.

Gates 5424 to 5430, inclusive, serve to indicate the time during which a particle is intercepted by producing at the output of gate 5430, a pulse which starts with the first intercept of the image and ends at the horizontal scan line following the last intercept of the image. The output of gate 5430 becomes positive as a result of the output of gate 5401 setting one of the inputs of gate 5430 negative. Gate 5429, in conjunction with gate 5430, forms a latch which causes the output of gate 5430 to remain positive after the initial negative input from gate 5401. Thus, the output of gate 5430 remains positive while the selected particle is being scanned.

For any intercept of the selected particle other than the last, the output of automatic monostable 5461 causes a negative-going pulse to be outputed by differentiator 5452. This causes the latch fromed by gates 5425 and 5427 to produce a positive pulse at the output of gate 5425. This sequence occurs immediately after monostable 5461 completes its 63.3 microsecond delay. When the output of gate 5401 goes negative, indicating that an intercept from the selected particle has been detected, the pulse is passed through gates 5424 and 5426 to reset the latch comprised by gates 5425 and 5427 in the condition it was in just prior to the occurrence of the output pulse from differentiator 5452. Thus, just before pulses are expected, the latch comprising gates 5425 and 5427 is set and then, a very short time thereafter, when the intercept anticipated by the output of monostable 5461 occurs, is reset. However, if this anticipated intercept does not occur, as is the case for the horizontal scan line following the last image intercept, the latch comprising gates 5425 and 5427 is reset by the positive-going pulse generated by automatic monostable at the conclusion of its delay. This resetting pulse passes through gate 5436 to differentiating network 5451 and then on through gates 5424 and 5426 to reset the latch formed by gates 5425 and 5427. Just before this latch is reset, the positive going transition from the output of monostable 5462 passes through gate 5428, whose other input will be positive because the latch comprising gates 5425 and 5427 has not had time to reset. Thus, the negative going pulse outputed by gate 5428, as a result of both of its inputs being momentarily positive, resets the latch formed by gates 5429 and 5430. This causes the output of gate 5430 to go negative, indicating that the time during which the scanning spot in the television camera 10 was scanning across lines which intercepted the selected particle's image has been concluded.

Gates 5416, 5417 and 5418 are employed to anticipate the edge of an image should it occur before the output of gate 5445 goes positive. If the system were dependent solely on the pulse from atuomatic monostable 5461, as previously discussed, then the leading edge of the particle's image would not be recognized until after the output of gate 5445 went positive which would cause portions of the particle to be ignored. However, by feeding the binary video signal into gate 5415 and on through gates 5416 and 5414 to set the latch comprising gates 5419 and 5420, the automatic monostable 5461 is actuated on the assumption that this intercept belongs to the selected particle before it has been confirmed by the system that this is so. Gates 5433 and 5434 perform essentially the same function with respect to automatic monostable 5462 as gates 5416, 5417 and 5418 perform with respect to automatic monostable 5461.

Having made this assumption, it is necessary for the system to confirm or deny it and to then act accordingly. If the binary video signal through gates 5417 and 5418 goes negative before the output of monostable 5461 goes positive, this means the intercept does not belong to the selected particle. Consequently, a period will occur when both inputs of gate 5417 are down, thereby producing a positive output into differentiator 5455, the output of which is passed, in turn, on to gate 5418 to reset the latch comprising gates 5419 and 5420. This causes the automatic monostable 5461 to be reset to zero. On the other hand, if the intercept on which automatic monostable 5461 has triggered does in fact belong to the image to be isolated, thereby confirming the assumption, then the latch formed by gates 5419 and 5420 is not reset until the 40 microsecond period after the negative transition at the input of automatic monostable 5461 has occurred. The monostable 5461 is designed so that a change in input at this time will not alter or affect completion of its full cycle. At the completion of the cycle, the positive transition at the output of monostable 5461 is passed through gate 5421 to the positive differentiator 5454, the output of which is connected to gate 5418 to reset the latch formed by gates 5419 and 5420. Thus, the SPM circuit 54 looks ahead beyond the time when an image intercept is expected to occur so that sudden and irregular changes in contour of a particle can be accurately accommodated.

It is worthwhile to note that there are a number of ways to achieve similar results. One such way, for example, is to make the period of the automatic monostables adjustable. Thus, if the positive-going transition at their outputs does not occur within the image, the period of the monostable involved is automatically adjusted so that the next output transition falls outside the image boundaries. In the preferred embodiment, the period of the automatic monostables is automatically adjusted. This adjustment is made during the vertical sync pulse intervals and automatically calibrates the monostables' delay period to equal slightly less than the period between horizontal sync pulses or 63.3 microseconds. The automatic calibration signals enter the monostables 5461 and 5462 through gates 5413 and 5447.

FIG. 10 illustrates a hypothetical selected particle 5475 crossed by a number of horizontal scan lines 5472. The light pen indicator spot 5471 located atop the displayed particle image shown where the light pen 19 has been pointed. Reference numeral 5476 indicates the start of automatic monostable 5461's delay period while reference numeral 5477 does the same for monostable 5462. Reference numeral 5478 and 5479, respectively, indicate the end of the 63.3 microsecond delay period for monostables 5461 and 5462.

Another function performed by the SPM circuit 54, if desired for a particular measurement, is filling in the holes and upward pointing indentations in a selected particle. This function is implemented by exploiting the fact that the latch comprising gates 5422 and 5423, which latch is switched by both automatic monostables 5461 and 5462, produces a signal which is similar to the binary video signal of the selected particle except that all holes and upward pointing indentations are removed. The isolated binary video signal of the selected particle is taken from the output of gate 5401 and used to trigger the latch comprised of gates 5404 and 5405. This latch is not reset until the binary video signal of the selected particle falls to zero and the latch comprising gates 5422 and 5423 is reset. Both conditions must occur before the latch formed by gates 5404 and 5405 is reset. That these conditions are satisfied is signaled by the output of gate 5407 going to zero whereupon the latch comprising gates 5404 and gate 5405 is reset. This yields a binary video signal via gate 5406 for the selected particle with holes and upward indentations removed.

Gates 5408, 5409, 5410 and 5411 are employed to select the particle signal desired. A switch (not shown) located on the front panel is set by the operator to provide an output from the SPM circuit 54 of either the complete binary video signal of the selected particle or the binary video signal with the holes and upward indentations removed. Which of the two signals is present on the output line 5480 of the SPM circuit 54, is determined by the condition of the "holes removed" line which runs to the front panel switch. Thus, for example, if the hole in particle 47 of FIG. 2 or the vertical indentations of particle 47 were to be ignored, the front panel switch would be set to the appropriate position. Conversely, the hole and vertical indentations of particle 47 would be taken into account by the system when the front panel switch is appropriately set to cause such a result.

III - THE LONGEST DIMENSION MODULE

The longest dimension module of FIG. 3 (hereinafter described as LDM) accepts and uses information provided to it by the SPM circuit 54 to determine the longest dimension in any direction within an image. The longest dimension of an image, and the particle to which it is related, can be defined as the maximum perpendicular distance between two parallel tangents to the image. An example of longest dimension and some explanation thereof will be found in the above discussion relating to FIG. 6.

Figure 11:
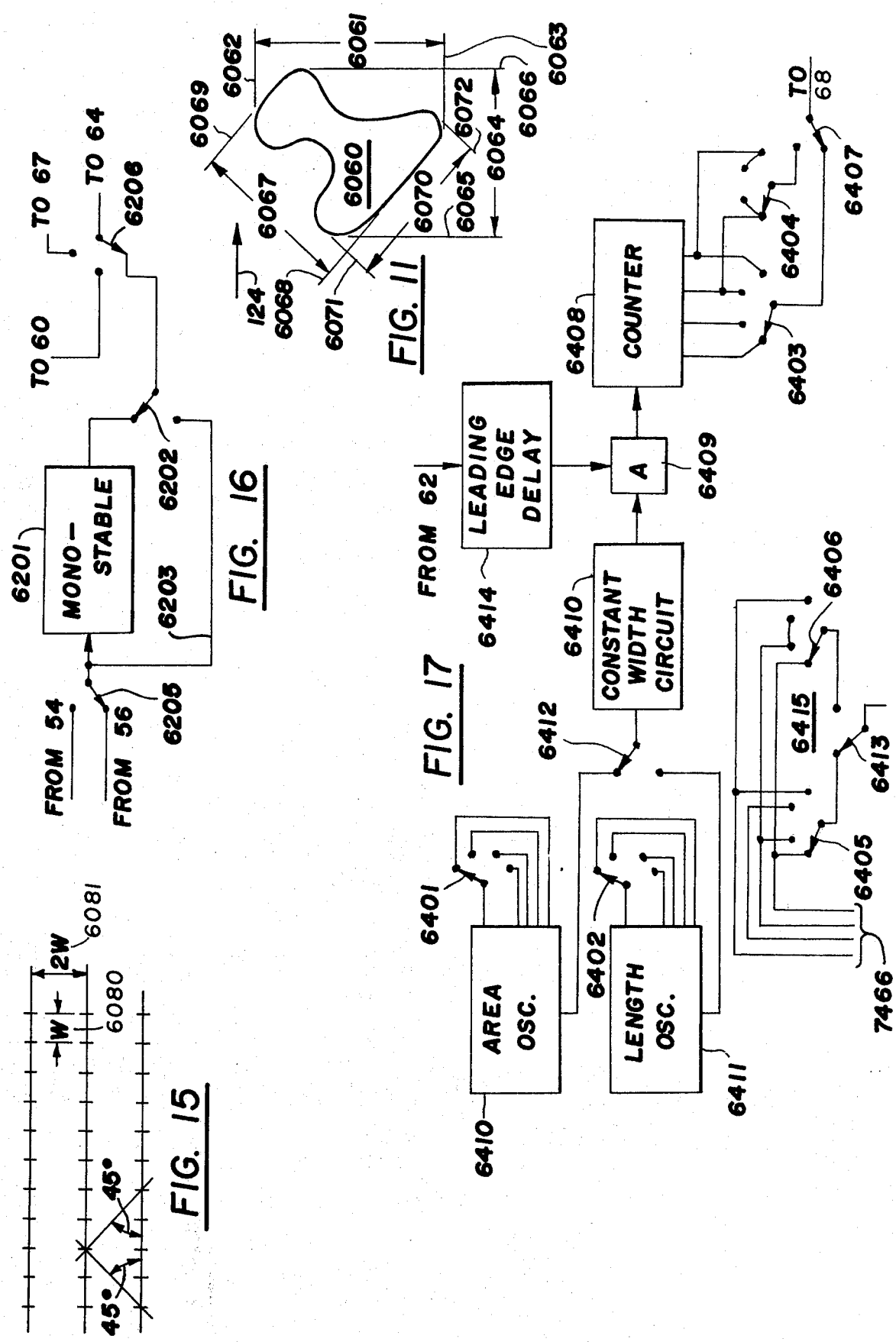
FIG. 11 depicts the four dimensions effectively measured by the longest dimension module shown in FIG. 3.

The determination of longest dimension is based on the fact that the longest of four projected particle lengths, measured in four directions in increments of 45°, is within a close approximation of the actual longest dimension of the particle. While the relation of the four measurement directions is fixed, their relation to the particle is completely arbitrary. Hence, rotation of the particle with respect to the measuring system will not materially affect the accuracy of the indicated longest dimension. This rule holds true for any particle regardless of shape or orientation. It has been mathematically determined that the approximated dimension varies no more than 3% from its actual value and is often closer. The rule might be better understood by reference to FIG. 11 where particle image 6060 has been lined in four directions to illustrate the rule. The first longest dimension 6061 is taken conveniently transversely to the direction of scan, as indicated by sagittal line 124, between parallel tangents 6062 and 6063. Longest dimension 6064 is taken perpendicularly between parallel tangent 6065 and 6066 and in the direction of scan. Similarly, longest dimension 6067 is taken perpendicularly between parallel tangents 6068. Likewise, 6069 and longest dimension 6070 is taken perpendicularly between parallel tangents 6071 and 6072. The choice of four measurements is arbitrary being a compromise between accuracy and the complexity of implementing and making a greater number of measurements. Thus, for example, six measurements spaced 30° apart could have been made in the determination of the longest of the longest dimensions.

Dimensions 6064, 6067 and 6070 are obtained over a measurement period of six field scans. Two fields each in this period are used to determine each of the longest dimensions. Dimension 6061 is determined during the first four fields of the LDM 60 measuring period, but by a different and independent method than the other three dimensions. It should be noted that although the time interval necessary to generate six fields of view has been chosen as the measuring period, any other convenient number of fields would yield satisfactory results. The description of the means employed to obtain these dimensions follows.

Figure 12:
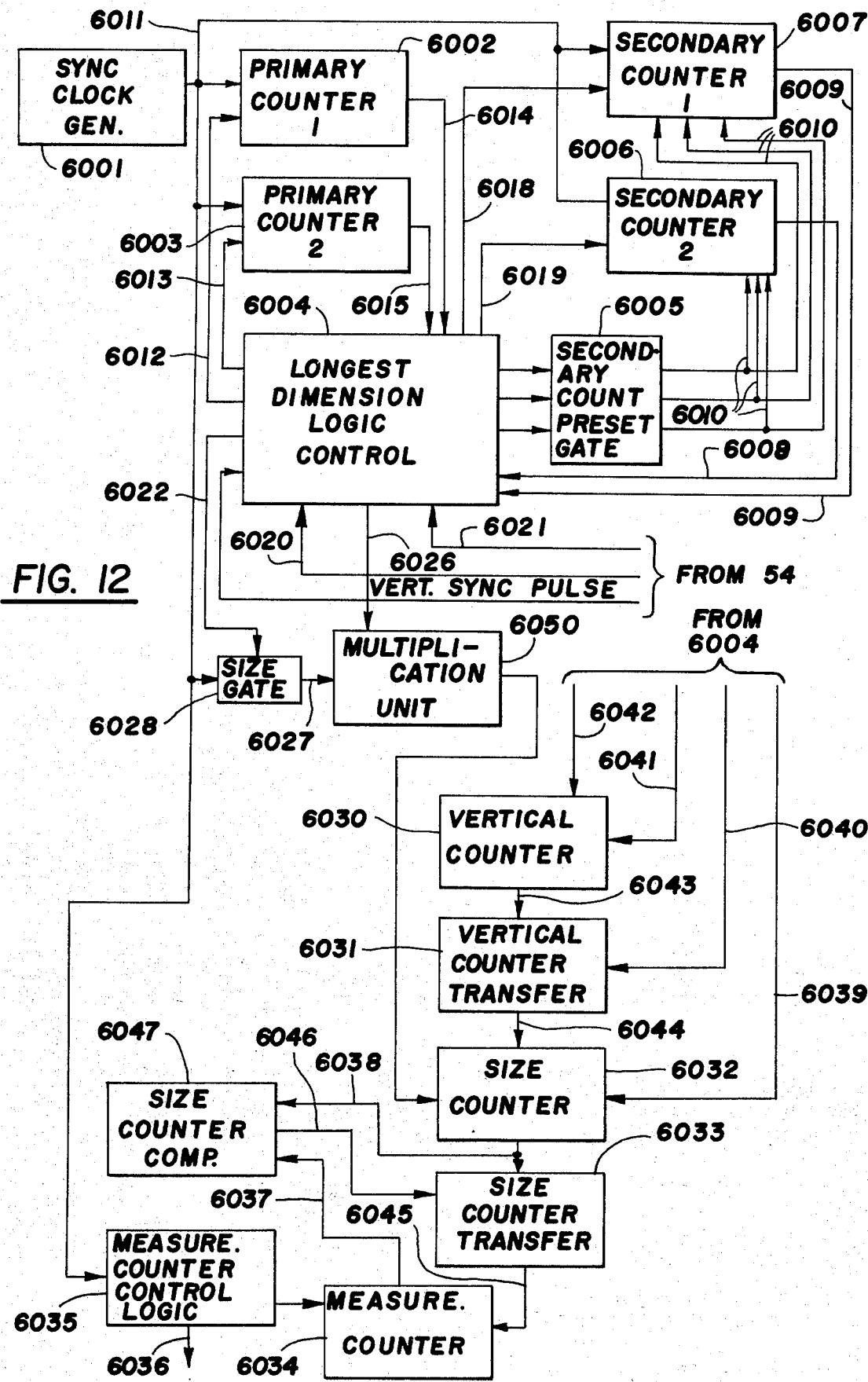
FIG. 12 is a block diagram of the longest dimension module shown in FIG. 3.

FIG. 12 shows a block diagram of the LDM 60. Synchronized clock 6001 generates a fixed number of equispaced clock pulses between horizontal sync pulses which are "locked" to the horizontal sync pulses. Thus, for each and every horizontal line scan, a constant number, 832 in the preferred embodiment, of equally spaced pulses is generated. It will be understood that any other convenient number of pulses could be employed depending upon the number of measurements made in order to determine the longest dimension. These pulses emerge from clock 6001 and are fed to the clock line 6011. Turning first to the determination of dimension 6064, it is noted that the binary video signal corresponding to the selected particle's image appears on line 6020 from selective particle measurement unit 54, one input to the LDM logic control 6004. In response to the leading edge of the first intercept of the selected image, LDM logic control 6004 actuates primary counter 6002 via line 6012. Primary counter 6002 counts, in the preferred embodiment, for 819 clock pulses after receiving its start signal from the LDM logic control 6004. On the 819th clock pulse, primary counter 6002 sends a finish signal down line 6014 to the LDM logic control 6004 and, in response thereto, control 6004 sends a secondary counter start signal down line 6018 to secondary counter 6007. The secondary counter 6007 thusly actuated, starts counting clock pulses from clock line 6011 until it has counted a total of 13 clock pulses. At this point, a finish count signal is sent down line 6009 to the LDM logic control 6004. The effect of this sequence is to generate a signal on the next horizontal scan line after the leading edge of the first intercept of the selected particle at the same vertical location along the horizontal scan line as where the leading edge of the first intercept of the selected particle occurred. The reason that the secondary counter 6007 finish count signal on line 6009 will occur at the same time, with respect to the last horizontal sync pulse, as the primary counter 6002 start signal, is that the total number of clock pulses counted between primary counter 6002 and secondary counter 6007 equals 832, which is the number of pulses the synchronized clock produces between one horizontal sync pulse and the next subsequent one, or between any point on one horizontal scan line and the corresponding point on the next horizontal scan line. Thus, the system has stored from one horizontal sync line to the next, the time of counting with respect to the horizontal sync pulse of the leading edge of the first intercept of the image of the selected particle. As soon as the primary counter 6002 finishes with its 819th count, it resets itself in readiness for the next primary counter 6002 start pulse down line 6012. The LDM logic control 6004 is designed to generate a primary counter 6002 start pulse at the time of occurrence of the secondary counter 6007 finishing pulse or at the time of occurrence of the leading edge of the image intercept on the next horizontal scan line, whichever occurs first.

Figure 13:
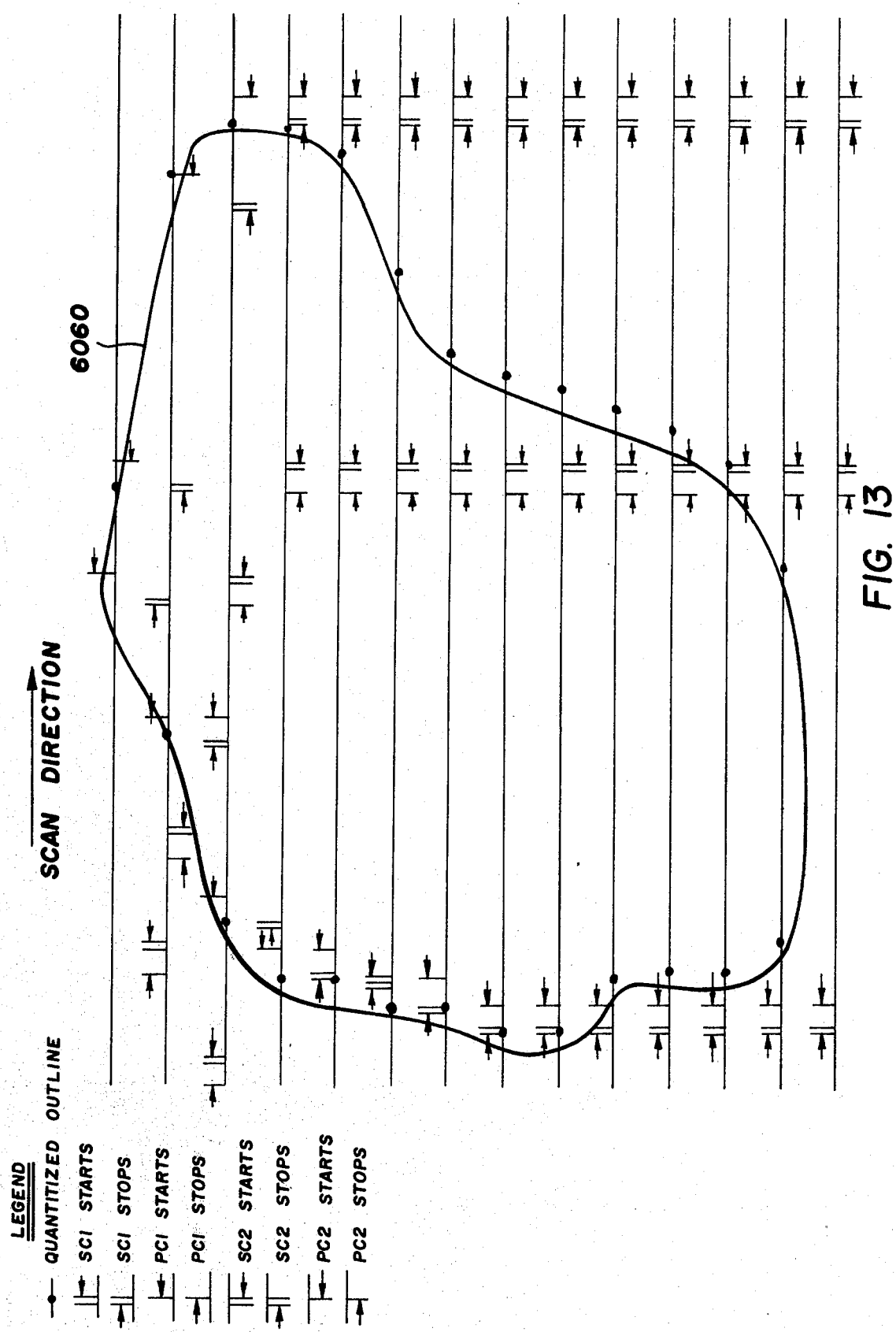
FIG. 13 is an enlarged view of a particle being measured for one of the dimensions used in determining its longest dimension.

This process is repeated for every intercept in the image of the selected particle and its effect is to start primary counter 6002 on the leading edge of the image as long as the slope of the image extends in the left-hand direction as viewed in FIG. 13. However, as soon as the slope of the leading edge of the image starts to extend back in the right-hand direction, as it does about two-thirds of the way down the left-hand boundary of particle 6060 in FIG. 13, then primary counter 6002 no longer starts at the leading edge of the image, but instead starts when secondary counter 6007 finishes. The net result of this procedure is that after the last intercept of the image has occurred, the secondary counter 6007 finish count signal coming down line 6009 will always occur at the position corresponding to the extreme left-hand point of the selected particle. As primary counter 6002 and secondary counter 6007 continue to count first one and then the other, this location is, in effect, stored until the selected image is again intercepted.

A similar sequence occurs on the trailing edge of the image's intercepts due to the action of primary counter 6003 and secondary counter 6006. At the clock pulse immediately after the trailing edge of the first intercept, the LDM logic control 6004 starts primary counter 6003 counting. This primary counter continues to count until it has reached a total of 832 clock pulses at which time it sends a primary counter 6003 finish count signal down line 6015 to the LDM logic control 6004, whereupon primary counter 6003 immediately resets itself. In response to this finish signal, the LDM logic control 6004 initiates secondary counter 6006 counting through secondary counter start line 6019. The secondary counter 6006 counts a total of 13 clock pulses and then produces a secondary counter 6006 finish signal down line 6008. On the second intercept of selected particle 6060, the LDM logic control 6004 starts primary counter 6003 at the time of occurrence of the secondary counter 6006 finishing pulse or at the time of occurrence of the trailing edge of the selected image of the second horizontal scan line, whichever occurs later. This causes the primary counter 6003 start signals to occur at the clock pulse after the trailing edge of the selected image intercept as long as the slope of the edge of the image continues to the right, but once the slope has reached its right-hand most point, primary counter 6002 will start at the clock pulse after secondary counter 6006 is finished. This will continue for subsequent intercepts so that the primary counter 6002 will always start at the same position with respect to the horizontal sync pulse, a position which corresponds to the position of the rightmost extreme portion of the selected image with respect to the horizontal sync pulse. Thus, in effect, the position of the rightmost extreme of the selected image is stored by the recirculating action of primary counter 6003 and secondary counter 6006. Thus, the net result after the last intercept of selected image has occurred is, that the interval between a pulse coming from secondary counter 6007 and a pulse coming from secondary counter 6006 on each intercept line corrresponds to the time for the scanning spot in the television system to cross in the line scan direction from a position corresponding to the leftmost extreme of the selected image to the rightmost extreme of the selected image. The duration between these two pulses, which equals the longest dimension 6064, is outputed by the LDM logic control 6004 down line 6022 to the sizing gate 6028.

The sequence of events necessary in order to make measurement of dimension 6070 follows. As previously discussed, the actual sequence of measurement is to assign two fields to the measurement of dimension 6067, two scanning fields to the measurement of dimension 6064 and two scanning fields to the measurement of dimension 6070, making a total of six fields, the measurements being made in that order. The primary difference between determining dimension 6064 and 6070 is in the number of clock pulses which the secondary counters 6006 and 6007 count before producing the secondary counter finish signal. In the case of dimension 6064, the preferred system embodiment counts a total of 13 clock pulses; however, in order to determine dimension 6070, only 11 clock pulses are counted. This, as will now be discussed, insures that the measurement of dimension 6070 will be made at 45° to the reference tangents used for determining dimension 6064. FIG. 15 illustrates three of the horizontal scan lines in the field of view. The total number of scan lines in the field of view is about 250. The number of clock pulses and the aspect ratio of the field is so chosen that the physical spacing 6080, designated W in FIG. 15, in the television scanning system between the time of occurrence along the scan lines of each clock pulse corresponds to twice the physical spacing 6081, designated 2W in FIG. 15, between the scan lines themselves. Thus, if the secondary counters were to count 2 counts less than they did for the determination of dimension 6064, the secondary counter sync pulse will finish at a position which is two counts to the left of where it finished when determining dimension 6064. These two counts form one side of a right isosceles triangle, the other side of which is the opening 2W between scan lines. Thus, the hypotenuse of the formed isosceles triangle extending between two adjacent scanning lines, intersecting the scanning lines at two points spaced apart a horizontal distance measuring 2W, forms a 45° angle with each respective scanning line. Consequently, a line 6082 drawn from finishing point 6083 to starting point 6084 in FIG. 14 makes an angle of 45° with the horizontal scan lines. As graphically illustrated in FIG. 14, primary counter 6002 starts at the clock pulse occurring at the leading edge of the first intercept of the particle. It counts, as previously noted, 819 clock pulses at which point secondary counter 6007 takes over and counts a total of 11 clock pulses, finishing at a point which is two clock pulses in front of the starting point on the previous line. Primary counter 6002 again starts and counts as before. The previously described sequence is continued, the sole change being in the count of the secondary counters 6006 and 6007. Note that once the image has reached its extreme or furthest point in the 45° or "half-past-ten" direction, the point at which the primary counter 6002 starts, moves away from the image and follows a line at 45° to the horizontal. A similar thing happens to the trailing edge, except in this case, the line formed by the starting locations of primary counter 6003 departs from the trailing edge of the image after it has reached its extreme point. Thus, in a similar manner as before, the time interval between the finishing pulses of secondary counter 6007 and secondary counter 6006 corresponds to the vertical projection of the distance between the extremes of the particle in the 45° direction. However, this vertical distance is obviously equal to 1.414 times the perpendicular direction between these two paths. Therefore, this result must be multiplied by 0.707 (1/1.414) to arrive at the value for dimension 6070. This multiplication is performed in multiplication unit 6050.

The multiplication unit 6050 works as follows. The sizing gate 6028 permits clock pulses to pass through to the multiplication unit whenever line 6022 is positive. The LDM control logic 6004 causes this line to be positive during the scan line after the last intercept of the particle for a period between the finish of secondary counter 6007 and the finish of secondary counter 6006. Consequently, during this period, a burst of clock pulses pass into multiplication unit 6050 from sizing gate 6028. During the measurement of dimensions 6067 and 6070, the multiplication unit 6050 removes two out of every seven pulses in the pulse string running into it, so that it effectively performs a multiplication in the present case of 5 over 7, which is, for the present system, sufficiently accurate to approximate the multiplication by 0.707. During the measurement of dimension 6064, the multiplication unit 6050 only multiplies by a factor of one.

In measuring dimension 6067, secondary counters 6006 and 6007 are preset for a count of 15. This insures that the finishing point of each secondary counter is two clock pulses to the right of the starting point of the associated primary counter, and, thus, the primary counter start positions describe a 45° angle with respect to the horizontal scan lines, after the appropriate extreme point of the image has been intercepted. The remainder of the sequence is essentially equivalent to that described in connection with the determination of dimension 6070.

In summary, dimension 6064 is measured when secondary counters 6006 and 6007 are preset to a count of 13, and, thus, the primary counter starting points fall in a vertical direction after the appropriate extremes of the particle have been intercepted. For dimension 6070, the secondary counters 6006 and 6007 count to a count of 11 and the starting points of the primary counters 6002 and 6003 fall in line perpendicular to dimension 6070 after the extremes thereof have been intercepted and detected. In the case of dimensions 6067 and 6070, the pulse train produced by sizing gate 6028 is generated by multiplying 5 over 7, in order to correct for the fact that the measurement made on dimension 6070 falls in the horizontal direction. As mentioned above, these three dimension determinations are made sequentially, each one being made twice; the first, for dimension 6067 is made once on each of the first two fields, the second for dimension 6064 on the second two fields; and the third for dimension 6070 once on each of the third pair of fields in the measurement cycle.

Dimension 6061, on the other hand, is made on the first four fields of the measurement cycle, simultaneously with the determination of dimensions 6067 and 6064. It is obtained by counting the number of line intercepts of an image. This task is performed by counting one less than the number of horizontal sync pulses for which the "on particle" signal from the SPM circuit 54 is on. Thus, the LDM logic control 6004 sends down line 6042, the vertical count input line, horizontal sync pulses during the four fields that the "on particle signal" is on. At the end of these four fields, the LDM logic control 6004 sends a vertical count transfer signal to transfer the contents of the vertical counter 6030 into the size counter 6032. The time of transfer is chosen so as not to clash with the input of dimensions 6064, 6067 and 6070 into size counter 6032 via size counter input line 6029. The vertical counter 6030 is reset to −1 counts by the vertical count reset line 6041. This transfer operation of information from vertical counter 6030 to size counter 6032 is performed by the vertical count transfer circuit 6031 under the control of the vertical count transfer line 6040.

The next section of the LDM 60 to be covered is that used to determine the maximum or longest of the four measurements made. During the procedures already discussed, each of the four dimension determination results is, at some time, fed into size counter 6032. In the case of results for dimensions 6064, 6067 and 6070, passage is via the multiplier unit 6050 and size count input line 6020. In the case of longest dimension 6061, the result signal arrives down the size counter preset line 6044. In either event, a count proportional to the dimension measured appears in the size counter 6032. Through the size counter contents line 6038, the size counter comparator 6047 compares the contents of the size counter 6032 with the contents of the measurement counter 6034 which are passed to the size counter comparator 6047 through the measurement counter contents line 6037. Whenever the size counter comparator 6047 detects that the count in the size counter 6032 is larger than the count in the measurement counter 6034, it initiates the size counter transfer circuit 6033 through the size counter transfer initiating line 6045. The size counter transfer circuit 6033 on command, resets the measurement counter 6034 to zero and then transfers the contents of size counter 6032 into the measurement counter 6034. Thus, whenever the count in size counter 6034 exceeds the count in the measurement counter 6032, the contents of the former are transferred to the latter. Consequently, at the end of the six frames of the measurement cycle, the contents of the measurement counter 6034 corresponds to the maximum of the four measured dimensions. In order to produce a pulse whose length is proportional to the contents of measurement counter 6034, a sequence is initiated at the end of the measurement cycle by which the measurement counter contents are counted from its present total down to zero under the control of the measurement counter countdown control logic 6035. This control logic counts down the measurement counter 6034 until it reaches zero using the count rate set by the synchronized clock 6001. This yields a pulse on the longest dimension measurement output line 6036 having a period equal to the time needed to count the contents of measurement counter 6034 down to zero. Thus, this period is proportional to the maximum longest dimension of the four measured.

It should be noted that the longest dimension 6061 could have been obtained using the same scheme as was employed in determining the other longest dimensions. However, to increase system response time in view of the six fields taken for the measurement period, it was more convenient to apportion the six frames between the three dimensions 6064, 6067 and 6070 and use a separate scheme to obtain the fourth longest dimension. Also, it should be appreciated that it is possible to produce the same results using a variety of digital and analog methods based on the same principles. The methods and apparatus adopted were found to be the fastest and most suitable for present requirements.

IV - ENTIRE FIELD MEASUREMENT

The entire field measurement block 56 (hereinafter EFM) included in FIG. 3 indicates that alternative measurements to those made by the SPM circuit 54 are possible. EFM 56 does not, in actuality, process the input binary video signal, but rather indicates a mode of measurement. It has been depicted in FIG. 3 solely to indicate the functional capability of the particle measuring system. In fact, the output signal from EFM 56, which is fed to the particle parameter selector 62, is identical to its input signal.

Two different measurements can be made with the system in the entire field measurement mode. The first is a measurement of the total area of all particle images in the field of view. The other is a measurement of the total projected length in the vertical direction of all the images. It will be appreciated that EFM 56 works functionally in conjunction with the particle parameter selector 62 to achieve the entire field measurement results.

V - THE PARTICLE PARAMETER SELECTOR

The particle parameter selector 62 (hereinafter designated as PPS) selects an appropriate input signal and processes it so that an output signal appropriate to the measurement result desired by the operator is passed on to the objective power compensation circuit 64. FIG. 16 depicts a simplified diagammatic representation of the circuitry employed in the PPS 62. The switches are, in fact, logic gates and perform a number of logical operations to determine, for example, whether a length or an area is being measured. Appropriate logic circuitry is also provided to select the proper signal to be sent to television monitor amplifier 17 to ultimately produce the previously noted image halo.

Using the signals generated by the selective particle measurement circuit 54 and the entire field measurement block 56, the PPS 62 can determine either the total area of the images represented by these signals or the total height of the images represented by these signals. The total height is measured by using monostable 6201. The binary video signal comes down from switch 6205, which selects whether the signal is to come from SPM 54 or EFM 56. In FIG. 16, switch 5605 is shown as connected to EFM 56. Monostable 6201 generates a short pulse whenever a positive going transition appears at its input. Thus, the total length of all pulses produced by monostable 6201 is proportional to the total number of leading edge intercepts of the particle images being scanned by the horizontal scanning lines. Since the scanning lines are equally spaced, this total length of pulses is proportional to the total height of the image represented by the signal coming in on line 6203. The alternative path of the binary video signal is straight through to function switch 6202, which selects whether area or height is being measured. The area of an image is proportional to the total length of all intercepts. This statement can be appreciated when it is realized that the horizontal scan lines are equally spaced and parallel and that by adding the total length of individual intercepts, the system is, in fact, performing a trapezoidal rule integration to determine the total area of that image. The final switch 6206 determines whether the longest dimension of an image is to be outputed by the system or whether one of the parameters selected by the combination of switches 6205 and 6202, or an oversized length display, which will be discussed later, is to be outputed. Consequently, regardless of the combination which is used, there appears at the output of PPS 62, a pulse train in which the total length of all pulses is proportional to the desired parameter. This pulse train is then passed on to the objective power compensation circuit 64 of FIG. 3.

VI - THE OBJECTIVE POWER COMPENSATION CIRCUIT

The function of the objective power compensation circuit 64 (hereinafter described as OPC) is to compensate for the effects of magnification by the microscope 12 on the size parameters of the particle being measured. In the present system, the optical system employed is a microscope having a number of objectives of various magnifications which can be selected by the operator. This, compensation by the OPC circuit 64 ensures that the readout of the system will be in the correct units; for example, micrometers for length, square micrometers for area. Obviously, when a count of particles is sought, the microscope 12 objectives are of no concern. Consequently, the OPC circuit or an equivalent thereof is not required when particle count alone is desired.

Another function performed by the OPC circuit 64 is to generate a train of pulses, the number of which is proportional to the total length of pulses received. This train of pulses is then sent to the size distribution logic module 66 and the sizing readout counter 68. FIG. 17 shows a simplified block diagram of the OPC circuit 64.

Two oscillators 6410 and 6411, the former associated with area measurement and the latter with length measurement, have switched frequencies which correspond to each of the magnification powers available in microscope 12. Switches 6401 through 6406 are ganged so that they all switch together from and to the same functional position. The position of these switches corresponds to the magnification power being used at a particular time. An objective power detection system is used to detect which objective is in use. It pinpoints the position of the switches and indicates a warning to the operator whenever the position of the switches 6401 through 6406 do not correspond with the objective in use. Switches 6407, 6412 and 6413 which are also ganged together, are under the control of logic associated with the PPS 62. These switches which are, in fact, logic networks, are switched by the PPS 62 to be in the area position when an area is being measured, and in the length position when a length is being measured. The area oscillator 6410 has its switched frequencies calibrated so that the instrument will read out in the correct units for whichever objective is being used. Similarly, the length oscillator 6411 has its switched frequencies calibrated to units of length measurements. Each oscillator produces a pulse train having the same bit rate as the oscillator frequency. This pulse train is fed to switch 6412 where the appropriate oscillator output is selected. The pulse train then goes into a constant pulse width circuit 6410, the purpose of which is to produce output pulses whose width is constant regardless of the frequency of the incoming signal, but whose bit rate is identical to that of the incoming signal. In performing this task, the constant pulse width circuit 6410 removes a second order effect which would otherwise contribute inaccuracies to the measurement, should the oscillator output pulses have a width proportional to the period of the oscillation signal being passed on to gate 6409. Operating in conjunction with the constant pulse width circuit 6410, is the leading edge delay 6414 which delays the leading edge of pulses coming into gate 6409 by a period equal to the width of the pulses generated by the constant pulse width circuit 6410. These two units working in conjunction with gate 6409, hold the number of pulses passed to counter 6408 from gate 6409 proportional to the on-time of the pulses coming from PPS 62. The action of gate 6409 is simply to permit pulses to pass from the constant pulse width circuit 6410 to counter 6408 when its input from the leading edge delay 6414 is up. Thus, going into counter 6408, in a given period of time, is a number of pulses equal to the product of the selected oscillator frequency and the total length of the signal coming in from the PPS 62. Counter 6408 consists of a string of binaries or divide-by-two counters (not shown), each one having its output brought to the appropriate position on switches 6403 and 6404. These switches are connected to provide an additional scaling factor which, in conjunction with the oscillator frequency selected, contributes to the calibration of the system. Under such a scheme, the oscillator frequency to be selected need only be switched over to a 2:1 range, while greater discrepancies over a 16:1 range are being taken up by counter 6408 and its associated switches 6403 and 6404. The particular switch used determines whether length or area is to be measured and, therefore, an additional switching function at circuit 6407 is necessary to select the appropriate one of the two switches, 6403 and 6404.

Switches 6405, 6406 and 6413 form a decimal point selection system, generally indicated by reference numeral 6415. The counter 6408, in conjunction with the area and length oscillators 6410 and 6411, permits a range of calibration of 16:1. A final 10,000:1 range is provided by the decimal point switching system 6415. Switch 6405, having the appropriate connections, is assigned to area and switch 6406 is assigned to length. Switch 6413 determines which of the two switches is appropriate for any particular measurement. Thus, there appears at the output of the OPC circuit 64, which is passed on to the sizing counter 68 and the size distribution logic 66, a string of pulses whose number is equal to the measurement in micrometers or square micrometers times some decade multiplying factor, as determined by the decimal point switching system 6415.

VII - SIZE DISTRIBUTION LOGIC AND MECHANICAL COUNTERS

The size distribution logic 66 and the mechanical counters 70, identified in the function block diagram of FIG. 3 as two separate blocks, are physically combined in the preferred embodiment in one module called the size distribution module (hereinafter described as SDM). This module sorts the complete range of measurement results into appropriate sub-ranges, each of which is assigned to a mechanical counter 70. The sub-range results are thereupon displayed by the appropriate counter 70 so that a variety of density histograms and oversize histograms can be obtained.

Figure 18:
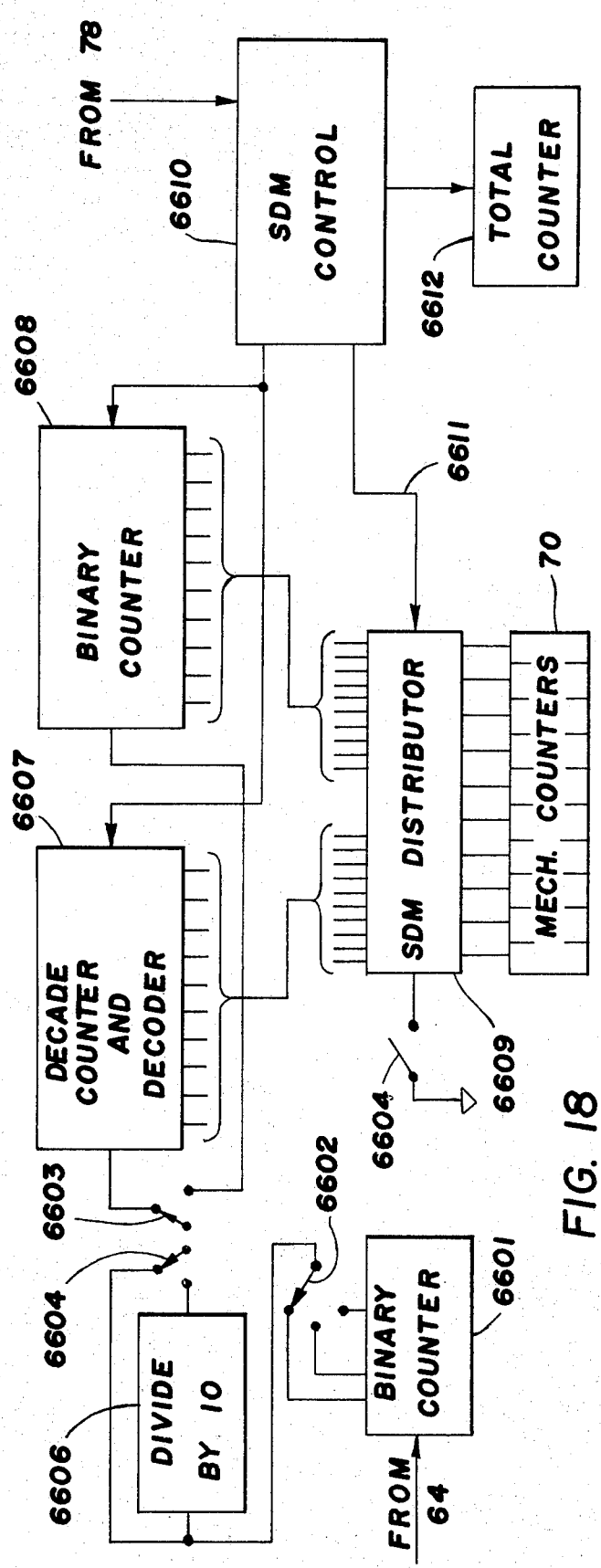
FIG. 18 is a block diagram of the size distribution logic module shown in FIG. 3.

One application of the SDM is in the selective particle measurement mode wherein the particle images are measured individually. The SDM takes each measurement result and sorts it into its appropriate sub-range so that one count is added to the particular counter assigned to the sub-range of the measurement result. The assignment of size sub-ranges to the mechanical counters 70 permits considerable flexibility in choosing the type of distribution required. For any particular magnification, a total of 24 different size range assignments are possible. In the preferred embodiment, the size sub-range assignment is performed by means of a thumbwheel (not shown) which is connected to a drum (not shown). This drum runs along the front of the control center 16, directly below the row of ten mechanical counters. The drum is marked to indicate below each individual counter, the size sub-range assigned thereto. The markings on the drum are distributed over a total of 12 strips (not shown), each strip affixed longitudinally to the drum and consisting of ten size sub-ranges, each of which falls in line below the appropriate counter. By turning the drum, any one of the twelve strips can be viewed with the size sub-ranges assigned to each counter displayed therebelow for taking readings. Also connected to the drum is a switch 6602 as best seen in FIG. 18 which performs the appropriate interconnections for each of the 12 size sub-ranges. In addition, there is a range expansion switch 6604 mounted on the front of control center 16 which permits the size ranges to be multiplied by a factor of ten, thereby giving a total combination of 24 size sub-ranges. The 24 size ranges can be assigned into four main groups as follows: oversize distribution with a 2:1 spacing between adjacent size ranges; oversize or distribution with a linear relationship between size ranges; density distribution with a 2:1 spacing between size ranges; and density distribution with a linear spacing relationship between size ranges. These four groups in turn are divided up into three possible positions, each position providing size sub-ranges which are twice the magnitude of the preceding set.

FIG. 18 shows a block diagram of size distribution logic 66 and mechanical counters 70. The train of pulses comes in from the OPC circuit 64 to a binary counter 6601 comprising two binaries. Switch 6602, which is associated with the drum switching mechanism, selects the output of the binary consistent with the drum position. The signal is then passed along to a divide-by-ten counter 6606, which is switched in by the range expansion switch 6604. From here the signal goes on to switch 6603 which is also associated with the drum. This switch determines whether a linear or logarithmic size range is to be employed. If the switch is in the linear mode, then the signal goes into a decade counter and decoder 6607. Otherwise, the signal goes into a binary counter 6608 comprising ten binaries. The output of the binary counter 6608 is at the ten output terminals of the binaries comprising it and these are connected to the SDM distribution logic 6609. The function of the SDM distribution logic in the cumulative mode, which is selected by switch 6604, is to take the ten inputs of binary counter 6608 and cause the appropriate mechanical counters 70 to count. Depending upon the binary number in the binary counter 6608, some of these inputs will be in the one or "up" state and others in the zero or "down" state. The SDM distribution logic 6609, therefore, determines the position of the most significant one of the "up" inputs and then arranges that the mechanical counter 70 corresponding to this position receives a count. For example, if the most significant one occurs in the 6th bit from the left-hand end, then the sixth mechanical counter from the left-hand end is triggered, along with five other mechanical counters to the left of it; that is, counters 1 to 5. The SDM distribution logic 6609 performs a similar function on the output of the decade counter to decoder 6607 when it is switched into operation by switch 6603. Alternatively, in the density position, the function of the SDM distribution logic 6608 in the logarithmic size range mode is to take the output of the binary counter 6608 and determines the position of the most significant bit therein and then to activate the mechanical counter corresponding to the position of that bit. It is quite possible that other bits of lesser significance than the most significant bit will also be in the one or "up" state. Consequently, the SDM distribution logic 6609 must insure that the counters corresponding to these lesser significant bits in the "one" state are not triggered. An example of a circuit for performing the two operations is illustrated in FIG. 18.

The ability of the SDM distribution logic 6609 to detect only the most significant bit is useful because it allows a simplification of the decade counter and decoder 6607, in which it is now possible to use a very simple decoding system which permits the erroneous lesser significant bits from the decoder 6607 to pass to the SDM distribution logic 6609. The timing sequencing is under the control of the SDM control 6610 which determines the reset times of the decade counter 6607 and binary counter 6608. It also controls a sampling system (now shown) in the SDM distribution logic 6609 which samples the states of the ten outputs of the logic at the end of the measurement cycle and then stores the sample for a period which is sufficiently long to permit the mechanical counters 70 to operate. An eleventh mechanical counter, termed the total counter 6612 counts the total number of measurement cycles and, therefore, the total number of particle images measured. This counter is under the direct control of the SDM control 6610.

In order that the size sub-ranges assigned to the counters 70 be displayed directly in the correct units, that is, in micrometers or square micrometers, an array of lights (not shown) indicating a decade multiplication factor, as well as a group of lights (not shown) indicating the units of measurement, are provided with the SDM module. When the expansion mode is switched in, the lights indicating the location of the decimal point are shifted one position to the right, so that the correct units are still displayed.

It will be understood that many modifications of the numerical display apparatus could be conveniently employed in place of the mechanical counters 70 without departing from the spirit and scope of the present invention.

VIII - THE PARTICLE SELECTOR AND THE PARTICLE MEASUREMENT INITIATOR

As previously noted, the particle selector 80, at the direction of the operator, serves to identify the particular image to be measured, when the system is placed in its selective particle measurement mode. As noted in connection with the discussion of FIG. 3, a light pen 19 is preferably employed as the image selector 80. The light pen 19, however, is not used in its usual classical role as a "writing" implement. Instead of "writing" on the face of a cathode-ray-tube, the light pen 19 serves to detect the scanning beam of monitor 14 as it scans across the screen. Appropriate circuitry, to be described in this portion of the specification, generates and transmits a pulse in response to the direction of the scanning beam. Thus, one function of the light pen 19 is to detect the scanning beam or spot of the cathode-ray tube by placing the light pen on the face of monitor 14.

The light pen 19 also serves as the particle measurement initiator 76 when the system is placed in its selective particle measurement mode. Appropriate circuitry, to be described in this portion of the specification with, generates and transmits a pulse whenever the light pen 19 is pressed against the face of the monitor 14. The operator, once he has selected the image to be measured, merely presses the light pen against the face of the monitor 14, thus, activating an internal miniature switch 200 to initiate measurement of the selected image.

Figure 19:
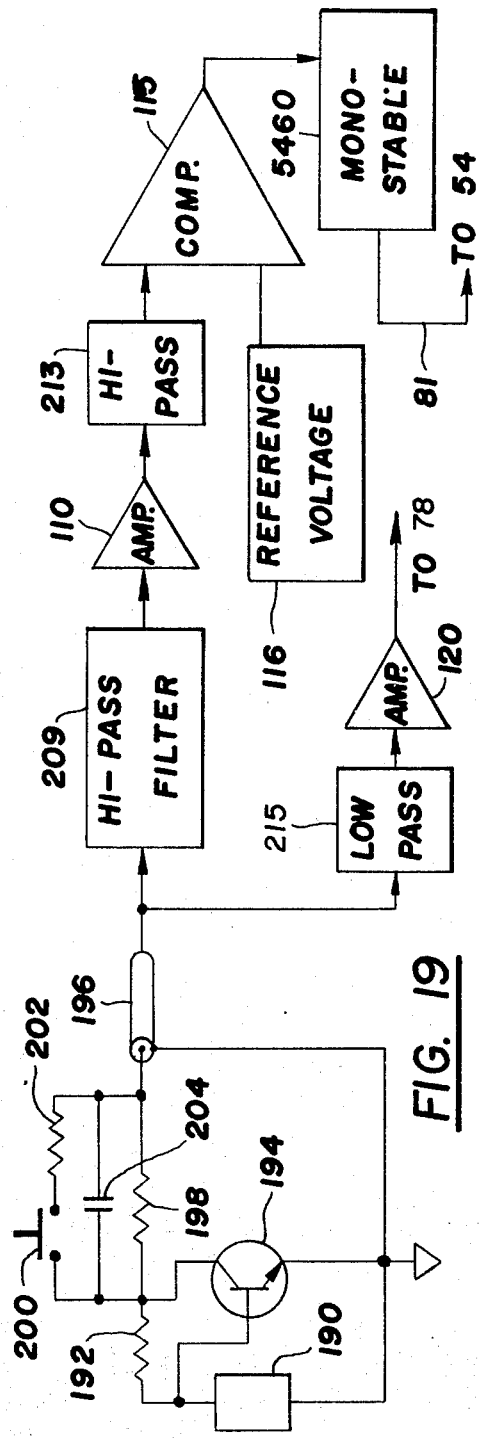
FIG. 19 is a combined block and schematic diagram of the particle selector and particle measurement initiator shown in FIG. 3.

The light pen 19 described herein, as shown in FIG. 19, employs a photodetector 190 which has a relatively large angle of detection as a radiation sensor. When the light pen 19 is placed on the face of monitor 14 and the spot on the cathode-ray tube passes beneath the light sensor, current is drawn therethrough. Most of this current flows through feed-back resistor 192 connected between the collector and base of transistor 194. This generates a positive-going voltage pulse at the collector of transistor 194. This relatively short duration pulse is passed through a coaxial cable 196 and subsequently amplified to a level compatible with the logic circuitry employed throughout the system.

Series resistors 198 has a voltage developed thereacross by a D.C. current sent down coaxial cable 196 to the light pen amplifier circuitry. When a push button switch 200, which is physically mounted in the light pen, a is closed, a resistor 202 is placed in parallel with series resistor 198. The values of resistor 198 and of resistor 202 are chosen to approach one another so that the actuation of push button 200 drastically changes the effective resistance across the parallel resistance network. When push button switch 200 is closed, the voltage developed across the resistance network drops in direct proportion to the decrease in resistance. Capacitor 204, connected in parallel across the parallel combination of resistors 198 and 202, limits the rate of fall of the voltage across the resistors to produce a relatively slow transition. This relatively slow transition produced by resistors 198 and 202 and capacitor 204 is readily distinguishable from the fast pulses generated by the combination of photodetector 190 and transistor 194.

When either of the generated pulse signals reach the light pen amplifying circuitry, they are separated to pass eventually to different outputs. The relatively short duration or high frequency signal developed by photodetector 190 is passed through high-pass filter 209 before appearing on the input of amplifier 110. High-pass filter 209 will block the longer duration or low fequency pulses which result from actuation of button 200. It also assists in removing unwanted noise from the signal. After being amplified, the high frequency signal is passed through another high-pass filter 213 which is used to make certain that the low frequency pulses are blocked. After passing through highpass filter 213, the high frequency signal is inputed to a comparator 115. A source of reference voltage 116 is connected to the other input of comparator 115. The comparator 115 provides an output only when the high frequency signal input exceeds the level determined by reference voltage 116. The output of comparator 115 is fed to monostable 5460 and then to SPM circuit 54.

The relatively long duration or low frequency signal initiated by the depression of push button switch 200 is fed to low pass filter 215 to remove or block the high frequency signal initiated by the photodetector 190. After passing through the low pass filter 215, the low frequency signal is amplified by amplifier 120. Amplifier 120, and comparator 115 as well, raise the level of their respective input signals to a level compatible with the logic devices used throughout the system. The amplified low frequency signal is then outputed to the measurement timing module 78 thereby initiating measurement in response to an operator command.

The photodetector 190 is selected to have a rise time of 0.2 microseconds. Typically, the photodetector may be a FPM 100 or FPO 100, these two photodetectors being electrically identical. However, the FPO directs radiation at a larger angle than does the FPM. As illustrated in FIG. 19, transistor 194 is connected as a shunt feedback element to reduce the input impedance of the circuitry as seen by the light pen 19 to approximately 50 ohms. Since the light pen 19 operates in a high noise environment as a result of the large voltage pulses generated by the television monitor 14, the low input impedance offered by the light pen circuitry yields significant benefits in minimizing the effect of this noise. By incorporating circuitry for generating both the pulses within the light pen, appreciable space savings are effected.

IX - THE ENTIRE FIELD COUNT LOGIC CIRCUIT

Figure 20:
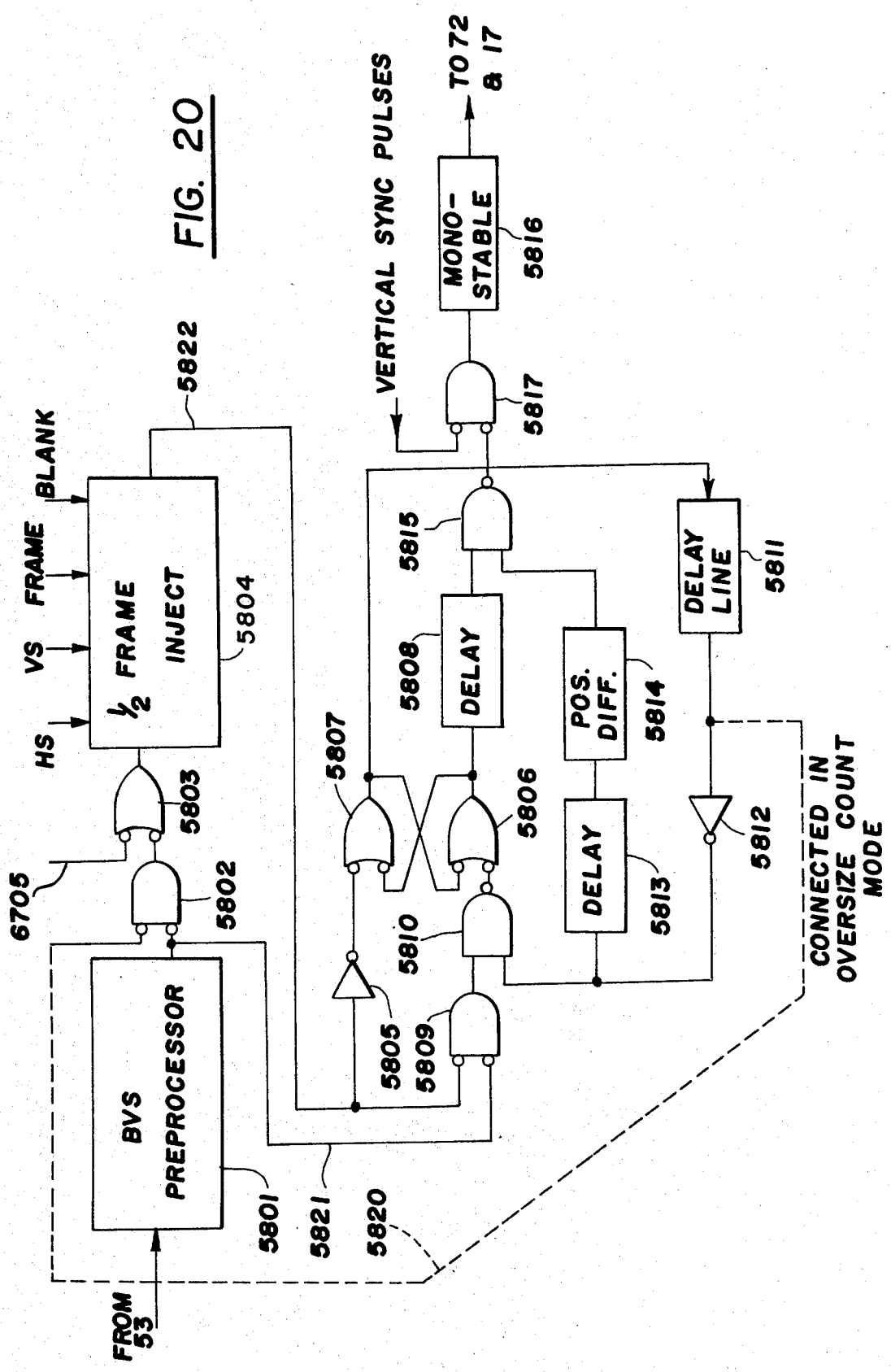
FIG. 20 is a combined block and logic diagram of the entire field count circuit shown in FIG. 3.
Figure 21:
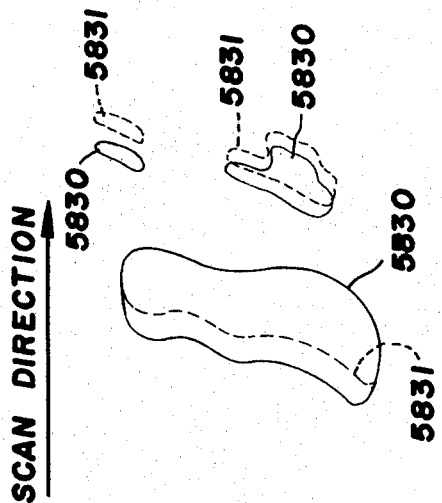
FIG. 21 is an enlarged view of some particles showing the effect of the binary video signal preprocessor shown in FIG. 20.

The function of the entire field count logic circuit 58 (hereinafter described as EFC) is to produce one pulse for every image in the field of view from input data consisting primarily of the binary video signal from the threshold circuit 53. The system and apparatus about to be described does this and will correctly count particle images of any shape, provided no two images lie inside one another. As shown in FIG. 20, the binary video signal comes in from the threshold circuit module 53 to binary video signal preprocessor 5801. The primary purpose of the binary video signal preprocessor 5801 is to enable images to be closer together than would otherwise be permitted by the count logic to be described later. Briefly, the problem arises because the count logic steps a short distance outside each image in order to track the image accurately. If another image were to have portions of its boundaries lying within the small area defined by the distance that the count logic steps outside of the boundaries of the particle image being counted, the count logic would interpret this other image as being a portion of the image it was counting. However, the problem is overcome by narrowing the portions of the image which are wider in the line scan direction than a certain predetermined amount. This procedure is illustrated in FIG. 21. The solid line 5830 shows the actual outline of the image. The broken line 5831 shows the boundary to which the leading edge is indented. When the width of the particle image is compatible with the distance of indentation, the trailing edge of the particle image is also shifted to the right. The distance of indentation is relatively small; in the preferred embodiment it is typically about 1/330th of the width of the field of view.

Binary video signal preprocessor 5801 as illustrated in FIG. 20, is followed by two gates, 5802 and 5803, which have no effect in the count mode of operation, but which in the oversize count mode inject appropriate signals into the main signal path. The signal is then fed out to the one-half frame inject block 5804. The function of this block is to compensate for the error in counting which will result from images intersecting the border of the counting field. The counting field 5840, as will be discussed in the portion of the specification dealing with readout control block 74, is slightly smaller than the field of view 5841 as illustrated in FIG.

Figure 22:
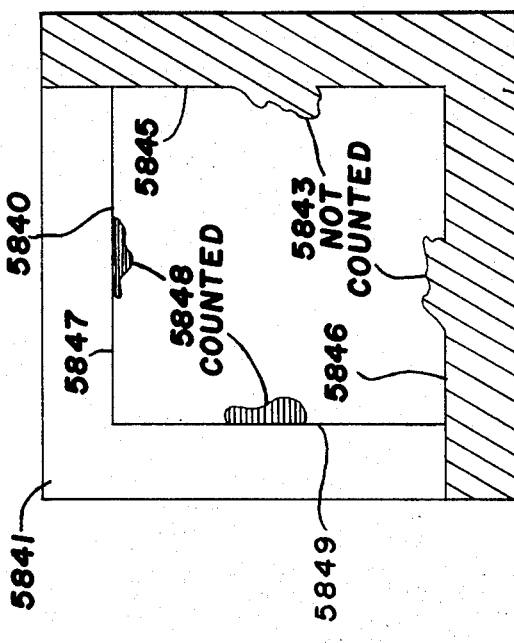
FIG. 22 is an illustration of the effect of the one-half frame inject circuit shown in FIG. 20.

22. Its boundaries are defined by a frame which is electronically generated. The edges of the frame fall inside the field of view 5841 by about 5% of the picture width. Statistical analysis shows that if every particle which intercepts the edge of the frame were to be counted, a biased estimate of the number of particles may result. Since only a small fraction of the particles counted will intercept the border, the error is reasonably small. Nevertheless, to be consistent with the overall accuracy of the system, it is felt that this error should be compensated for. Further statistical analysis has indicated that if the particle images intercepting only two of the adjacent boundaries of the frame are counted, then the result will become unbiased. Thus, a system has been developed which permits only those particles which intercept two adjacent boundaries of the frame to be counted as was hereinbefore explained for FIG. 2. The basic principle of implementing this system is best illustrated in FIG. 22. The shaded areas 5842 and 5848 correspond to the areas at which the output 5822 of the one-half frame inject circuits 5804 of FIG. 20 is positive. By making the output of line 5822 positive only when an image is encountered or when the two boundaries 5845 and 5846 of the frame are encountered, the images 5843 intercepting these two boundaries are seen by the count logic to blend in with the boundaries, and, thus, all images intersecting the boundaries and the boundaries themselves are counted as one. However, this one count occurs during the vertical sync pulse and, by inhibiting the output of the count logic during the vertical sync pulse, this count is erased. Consequently, all images intercepting the two boundaries 5845 and 5846 are not counted, whereas the images 5848 intercepting the remaining two boundaries 5847 and 5849 are counted. Inputs to the one-half frame inject 5804 block include the horizontal sync signal, the vertical sync signal, the electronically generated frame signal, and the blanking signal. The modified binary video signal then passes from the one-half frame inject block 5804 to the actual count logic comprising elements 5805 through 5816 inclusively.

Figure 23:
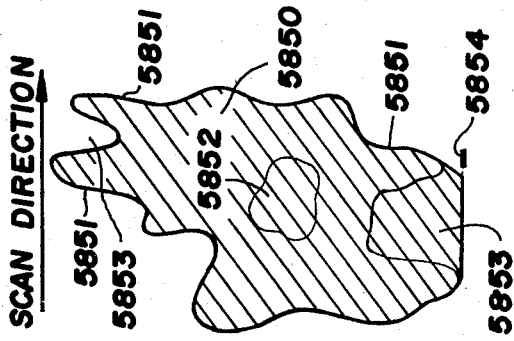
FIG. 23 is an enlarged view of a particle schematically illustrating the ability of the system to ignore irregularities when counting objects.

As is schematically illustrated in FIG. 20, the signal comes in to inverter 5805 from the one-half frame inject logic 5804 and switches the latch formed by gates 5806 and 5807 to that a positive going transition is passed on to the delay line 5811. The output of 5807 remains positive until signal from the one-half frame inject logic 5804 goes negative at the trailing edge of the image intercept. At this point a negative going signal is passed from gate 5810 to 5806, causing the latch to be reset. This, the pulse which pass on to delay line 5811, are identical to the pulses corresponding to the first intercept of the image. The delay line 5811 has a delay which is slightly less than the time for one horizontal line scan. In the described system, the difference is 0.15 microseconds, making the overall delay time approximately 63.35 microseconds. When the signal comes out of delay line 5811, it is inverted in gate 5812 and passed on to gate 5810. This signal insures that the latch comprising gates 5806 and 5807 does not reset, after having being set by the leading edge of the intercept on the second line of the image, until the signal from delay line 5811 indicates that the intercept has finished. The end result is that the signal out of the latch formed by gates 5806 and 5807 is "up" for the entire width of any image. An example of this is depicted in FIG. 23 where the shaded area of a particle 5850 corresponds to the portions of the image for which the output of gate 5807 is positive. The graphically illustrates that the count logic tracks all the way down any image and is not misled by the image having arms 5851, hole 5852, or indentations 5853.

The end of the image is detected as follows. On the horizontal line scan immediately after the line containing the last intercept of the image, the stored signal in the delay line 5811 emerges therefrom at a time very close to the position of the last intercept of the image. The trailing edge of the pulse from delay line 5811 passes through a short delay 5813 circuit, typically having about 0.2 microseconds delay, and on to differentiating network 5814 which produces a positive-going pulse at the trailing transition of the stored pulse. This positive-going pulse is passed on to gate 5815. The other input to gate 5815 comes from the output of gate 5806 through delay 5808, which has a longer delay than the delay of line 5813, typically about 0.3 microseconds. Normally, during the scans which intercept the image, the output of the gate 5806 is "down" during the time spent scanning the shaded area shown in FIG. 23. As the output of gate 5806 goes positive, either at the end of the pulse from the delay line of at the trailing edge of the image, whichever is the latter, the output of delay 5808 will not have had time to pass on to gate 5815 the pulse resulting from the positivegoing transition of the latch formed by gates 5806 of 5807 being reset. Of course, no pulse occurs at the output of gate 5815. However, if there has been no intercept, as occurs in the horizontal scan line after the last line intercepting the image, then the latch comprising gates 5806 and 5807 has not been reset and, therefore, a positive signal remains at the output of gate 5806. Consequently, the output of delay line 5808 is positive when the positive-going pulse from differentiator 5814 arrives. Thus, on this last intercept, a pulse is generated at the output of gate 5815 which passes through gate 5817 to monostable 5816, which monostable lengthens the pulse in a well-known manner. The output of monostable 5816 is then fed to the entire field counter 72 which totals up the number of count pulses or images intercepted. The output of monostable 5816 is also fed to the television monitor amplifier 17, whic is used to generate a short count mark 5854 adjacent to the image of a particle to show that it has been counted as shown in FIG. 23.

X - THE OVERSIZE COUNT MODULE

The function of the oversize count module 67 (hereinafter described as the OCM) is to provide, in conjunction with EFC 58, a count of the number of images having maximum chords in the scanning direction larger than a preset size. The OCM 67 also provides a readout of the present maximum chord size. The module to be described performs these functions for images of any shape.

Figure 25:
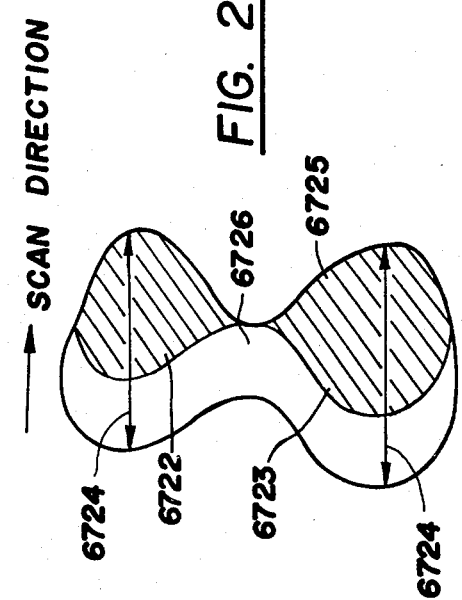
FIG. 25 is an enlarged view of a particle schematically illustrating the error resulting when a fixed increment is removed from every particle intercept regardless of its actual width to obtain an oversize determination.
Figure 24:
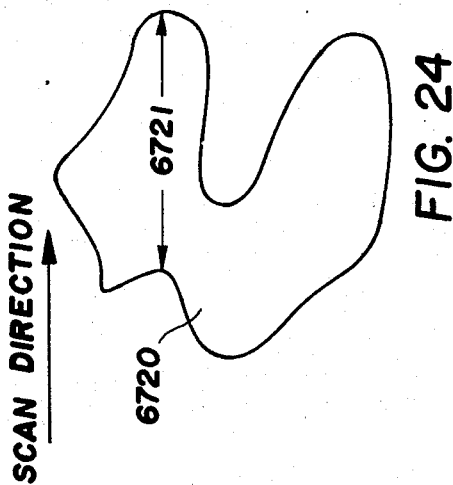
FIG. 24 is an enlarged view of a particle illustrating the position of a maximum chord drawn therein.

FIG. 24 shows a particle 6720 having the maximum chord dimension 6721 referred to drawn illustrated therein. The standard method of achieving this measurement is to simply eliminate a fixed increment from each intercept of the particle image and to obtain, if any of the intercepts are larger than the increment eliminated, an equivalent image of the section larger than the increment removed. These equivalent images which, of course, only appear as pulse sequences, are then counted. The difficulty with this approach is that if the image has a waist area 6726 of any sort, as illustrated in FIG. 25, there will be two areas 6722 and 6723 formed when the length eliminated exceeds the width of the waist area and erroneous counts will result. Thus, a count of two images, instead of one, will be obtained from the image 6725 since the eventual waist 6726 of the image joining the two larger sections 6722 and 6723 will, for some magnitudes of increments, be removed. The module to be described is according to the principles of the present invention and overcomes this objection.

Referring now to FIG. 26, wherein the OCM 67 is diagramatically illustrated, the binary video signal from the threshold circuit 53 enters the sample inject block 6702 and passes on to an adjustable timer 6703. This timer is adjustable from zero time to a time longer than the longest intercept expected. It produces an output pulse only if any pulse, including an intercept pulse, fed into it is longer than its preset period. The output pulse occurs at a time after the beginning of the input pulse which is equal to the preset time. Its output pulse is passed on to the sample select block 6704, and if the pulse on which it was timing corresponds to an intercept, than the intercept accepted line 6705 produces a short pulse, that intercept being longer than the preset time of timer 6703. This pulse appears at the input of gate 5803, as illustrated in FIG. 20 where it is fed into the main signal path of the count logic circuit. It should be noted that when connected in this mode, the binary video signal cannot pass the binary video signal preprocessor 5801 through gate 5802 and on to the one-half frame inject circuit 5804 until delay line 5811 produces a signal corresponding to the position of an intercept which belongs to the image associated with the intercept endeavoring to pass from the binary video signal preprocessor 5801. Consequently, the binary video signal will only pass from the preprocessor 5801 during the times when there is a positive signal from the output of the delay line 5811, which is fed through line 5820, shown as a dashed line in FIG. 20. Thus, the only way in which the count of an image can be initiated is by a pulse at the input to gate 5803 from the sample select block 6704, shown in FIG. 26. It is at this point that the count of an image is initiated in the oversize count mode. The sequence of events when mesuring oversize particles is as follows. Once the first short pulse is passed from the sample select block 6704 down line 6705, through gate 5803 and on into the count logic, there will appear on the subsequent line of scan, a pulse corresponding to the one which originally entered from the sample select block 6704. Since the position of this pulse is slightly ahead of the position on the previous line scan of the pulse from the sample select block 6704, a pulse enters through line 5820 into gate 5802, slightly preceding the next pulse from the sample select block 6704 down line 6705. The net result is that these pulses are timed to overlap and the resulting overlap is broader than the initial preprocessor 5801 pulse generated by the preprocessor 5801 of FIG. 20. This pulse continues to broaden until it corresponds to the width of the signal coming from the preprocessor 5801 after which it remains in correspondence with the preprocessor 5801 output.

The mechanism by which the pulse broadens so that it finally includes the whole image has already been explained. There is, however, one other aspect of OCM 67 operation to be explained. Having started at the trailing edge of the image, the pulse circulating in the count logic system always has its end point corresponding to the trailing edge of the image. In FIG. 27, the manner in which this aspect of operation affects the width of the pulse circulating in the count logic system is schematically illustrated. Initially, the first output pulse arising from an intercept pulse occurs when the image reaches a width, the scan time of which is greater than the time set by adjustable timer 6703. From this, as has been discussed, the leading edge of the intercept develops a longer pulse as successive line scans occur and moves out forward of this first accepted intercept pulse until it reaches the boundary of the image. FIG. 27 also illustrates how the trailing edge of this pulse moves back, following the boundary of the image through a signal developed in line 5821. The operation of this portion of OCM 67 is as follows: once the latch comprising gates 5806 and 5807 has been set, it cannot be rest until line 5821 is done. This, of course, cannot occur until the trailing edge of the image has been passed and, thus, once having been set, the latch comprising gates 5806 and 5807 must remain set until the trailing edge of the image occurs. In the normal count operation, which has already been discussed, line 5821 has no effect, as it is already duplicated by the signal path running through gates 5802, 5803 and the one-half frame inject circuit 5804 to the input of gate 5809.

One further point to be noted about OCM 67 is that once the triggering signal on line 6705, arising from sample select 6704, occurs for the first time, it operates independently of the sample select signal so that if the sample select signal should cease to occur, as it will if the image narrows down to a width which corresponds to a time less than the time to which the adjustable timer is set, the remaining circuitry continues to track the image. For example, in FIG. 28, where the sample select signal firstly occurs in the upper portion 6740 of image 6741 to initiate the tracking process and then although the image becomes narrower than the adjustable timer period, the count logic, in conjunction with the OCM 67, continues to track the image right to its end whether or not the sample select signal again appears. Finally, the count pulse 5854 appearing at the line after the last intercept of the image 6741, indicates to the operator that this particle image has been counted by OCM 67.

The means by which the width or preset maximum chord corresponding to the time delay set by adjustable timer 6703 is read out by the control center 16 will now be discussed. An instantaneous readout in the correct units, which in the preferred embodiment are micrometers, of the width of the image which would just be accepted by the setting of adjustable timer 6703 is required. Other convenient units of linear measure could easily be adopted. The sample and readout control 6701 controls the sequence of events which culminate in a display of the length required. It should be mentioned that, for reasons which will be discussed later, the length of a pulse running into PPS 62 which represents a length measurement is chosen, in the preferred embodiment, to be twelve times the period which the television scanning system would take to pass over an equivalent length. It will be recalled that the number of fields in a measurement cycle is six. It will also be recalled that the OPC circuit 64 generates a train of pulses, the number of which are proportional to the total width of the pulses fed thereto. In the preferred embodiment, the number of pulses generated by the OPC circuit is doubled in order to reduce statistical bias and improve accuracy. In other words, the appropriate oscillator in the OPC circuit 64 is gated on for a period of time which is twice that required for the television camera 10 to scan across the length of intercept being measured. Consequently, the multiplication factor twelve noted above is fixed by the selection of the number of fields in a measurement cycle and the multiple of the number of pulses generated by the appropriate oscillator in the OPC circuit 64, being the product thereof.

At the beginning of the vertical sync pulse, the sample readout control 6701 sends to the sample inject circuit 6702, twelve pulses whose periods are all greater than the maximum period of the adjustable timer 6703. The adjustable timer 6703 sequentially accepts these pulses and produces a pulse whose period is equal to the difference between the time delay and the width of the pulses. The sample select circuit 6704 then compares the width of the pulses fed into the adjustable timer 6703 with those emerging and produces a pulse equal to the difference, a pulse which is thus equal to the period of the adjustable timer. This difference pulse is then fed into the PPS 62 and on to the OPC circuit 64 to produce the required readout. As this event occurs twelve times in the preferred embodiment, the total length of these twelve pulses is equal to the length of the pulse required for correct scaling of the readout measured. The process of sampling the length of the adjustable timer 6703 and passing it onto the PPS 62, the OPC circuit 64 and finally the sizing readout counter 68, occurs once every field or 60 times a second. Thus, as the adjustable timer period is changed by the operator, he sees on the readout an apparently instantaneous change in the length to which the adjustable timer is set and he sees this length being read out in the physical units of the image he is measuring.

XI - THE AVERAGING MODULE

The functioning of the averaging module 69 is to perform the division of the total area or total projected length by the number of particles or images encountered in the field. The resultant quotient corresponds to the average particle area or average particle projected length, a result which is of considerable importance in many fields of particle and image measurement.

Figure 29:
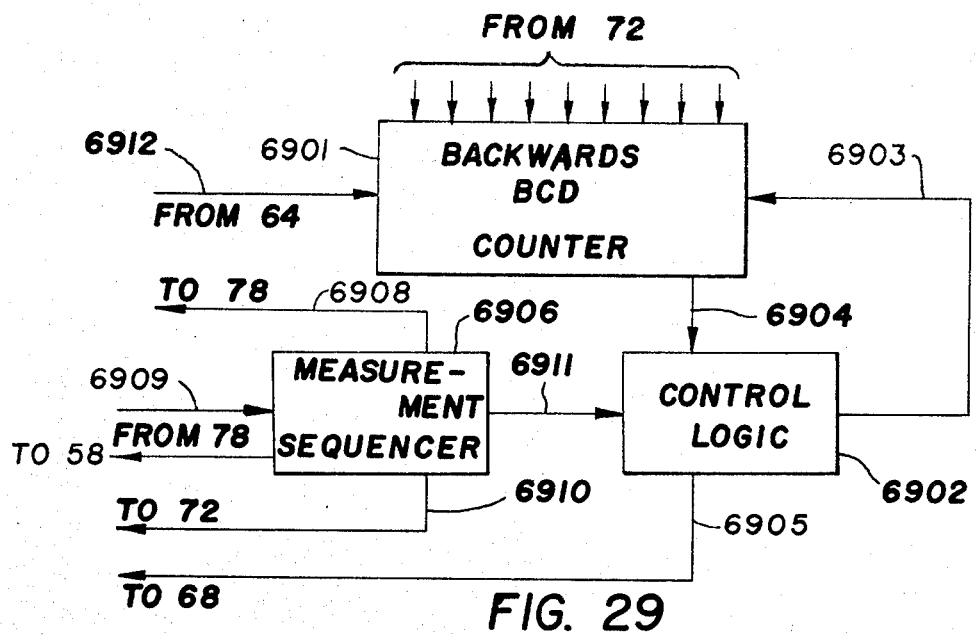
FIG. 29 is a block diagram of the averaging module shown in FIG. 3.

The averaging cycle consists of two measurement cycles. This is the only function in the described system which uses two measurement cycles, all other measuring functions require only one measurement cycle. During the first measurement cycle, the total particle or image count is determined, as previously discussed, and stored in the EFC readout counter 72. During the second measurement cycle, the division of the total area by the number of particles determined in the previous measurement cycle is performed. The implementation of these two measurement cycles and the switching of the appropriate pulse signals between one measurement cycle and another is under the control of the measurement sequencer 6906, shown in FIG. 29. Because of the large number of interconnections between this element and other parts of the system, made obvious by this disclosure, it has been shown for simplicity in FIGS. 29 with only its major connections illustrated.

After having selected average size as the parameter to be measured, by appropriately setting a front panel mounted switch (not shown), the operator pushes the measure initiate button associated with the particle measurement initiator 76. As a result, the measurement sequencer 6906 receives a pulse from the measurement timing circuit 78 through the connection line 6906. At this point, the measurement sequence of 6906 takes control and sends appropriate signals to the entire field count module 58 so that during the first measurement cycle, the number of particles in the field of view is counted and then stored in the entire field count readout counter 72. At the end of the first measurement cycle, the measurement sequencer 6906 sends a pulse to the EFC readout counter 72 through line 6910 which causes the counter 72 to hold the number of particles counted in the first measurement cycle. The measurement sequence of 6906 then sends a signal down line 6908 to the measurement timing circuit 78 which calls for the commencement of the second measurement cycle. The measurement sequence is also arranged so that during the same measurement cycle, pulses are received from the objective power compensation circuit 64 which are fed into the backwards BCD counter 6901 through line 6912. A further output from the measurement sequencer 6904 through line 6911 to the control logic 6902 initiates the division operation. The signal coming up line 6912 consists of a burst of pulses. The total number of pulses coming up this line during the second measurement cycle is proportional to the total area or total projected length, depending on which measurement is to be averaged, and these pulses are passed onto the backwards BCD counter 6901. During the time these pulses appear on line 6912, the actual division process takes place.

The division process, which occurs during the second measurement cycle, consists of the following operations. At the beginning of the second measurement cycle, the count stored in the entire field count readout counter 72 is passed into the backwards BCD counter 6901, thereby presetting the counter to a count equal to the number of particles or images counted in the first measurement cycle. The pulses from the objective power compensation circuit 64 appear on line 6912 and cause the backwards BCD counter 6901 to start counting towards zero. When the backwards BCD counter 6901 has reached a number which is near zero, sense line 6904 sends a signal to the control logic 6902 which then initiates a sequence of events which results in the backwards BCD counter again being preset to the total number of particles measured in the first measurement cycle. The operation is implemented through a pulse to the preset line 6903 and also by gating off the pulses from the objective power compensation circuit 64 during this transfer operation. The number in the backwards counter 6901 at which the sense line 6904 is energized, depends on the number of pulses which pass down line 6912 during the transfer cycle. In the present system, when the backwards BCD counter 6901 reaches the count of four, the sense line 6905 6904 connected to control logic 6902 is energized. The transfer operation uses the pulse coming down line 6912 as clock pulses. The period of these pulses determines the timing sequence of events which go to make up the transfer cycle which is caused to take the period corresponding to the time for the next four pulses from the objective power compensation circuit 64 in order to complete its cycle. At the time when the transfer cycle occurs, a pulse is produced on line 6905. Thus, the number of pulses appearing on line 6905 is equal to the number of pulses arriving up line 6912, divided by the number in the entire field count readout counter. In the preferred embodiment, the range of numbers appearing as the division, that is, the number of particles counted, is limited from 4 to 1,000 but this can be modified to any suitable range by merely using faster logic or counters with a larger capacity.

XII - THE MEASUREMENT TIMING CIRCUIT

The function of the measurement timing circuit 78 is to start and to control the measurement cycle. The measurement cycle is initiated by the particle measurement initiator 76 and, once initiated, stores this input until the beginning of the next field scan whereupon a total of six field scans containing a selected particle are counted, at which point the measurement cycle is completed. As diagrammatically illustrated in FIG. 39, the initiate measurement signal from the particle measurement initiator 76 is fed to the measurement initiate logic circuitry 7801. This logic circuitry stores the initiate measurement signal until the beginning of the next field scan. At that time, its output line 7803 carries the initiate measurement signal to the readout counter gating and inhibit logic 7802. If the succeeding six field scans are fields containing a selected particle, the EPC and sizing readout counters 72 and 68 are gated on by an appropriate signal on line 7804. However, if the selected particle is temporarily lost, because, for example, the light pen has slipped during the measurement cycle or for any other reason, the inhibit logic will cause the readout counters 68 and 72 to be gated off. As soon as the selected particle is again detected within any succeeding field scan the inhibit logic ceases to operate thereby gating on the readout counters 68 and 72 again. Thus, once initiated, the system immediately completes a measurement cycle over the next succeeding six field scans containing the selected particle or waits, if necessary, until six such scans have been detected to complete the measurement cycle.

The measurement timing cycle can also be initiated by the averaging module 69 which initiates the second cycle in the average measurement sequence. The output of the measurement timing system is a pulse lasting for the entire measurement cycle. This pulse is used to reset, operate and otherwise control sizing readout counter 68 and entire field readout counter 72. The operation of these counters and their relation to the system is discussed in another portion of the specification.

XIII - THE READOUT CONTROL

Figure 30:
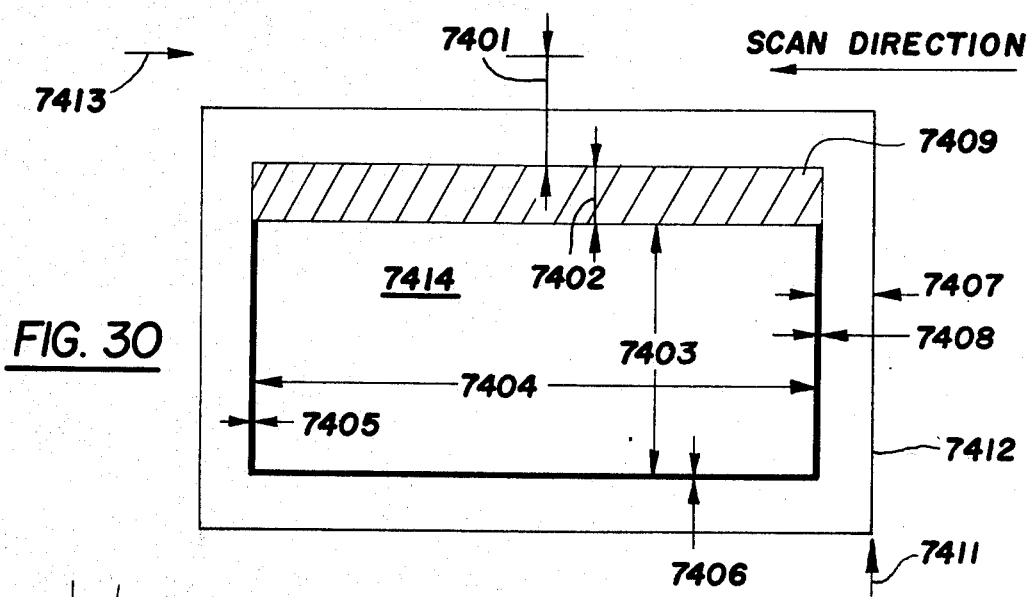
FIG. 30 is an enlarged view of a frame and character space superimposed over the field of view.

One of the functions of the readout control 74 is to generate a frame around the region over which the measurement is performed. The left, right, and lower boundaries of the frame are quite narrow, however, the top boundary of the frame is wide enough to provide a dark background for the characters in the readout display to be seen. The frame is displaced on all four sides by a distance of approximately 5% of the picture height inside the edge of the field of view and in the preferred embodiment is not adjustable. Other refinements could include an adjustable frame. FIG. 30 shows the frame and its relationship to the field of view.

Figure 32:
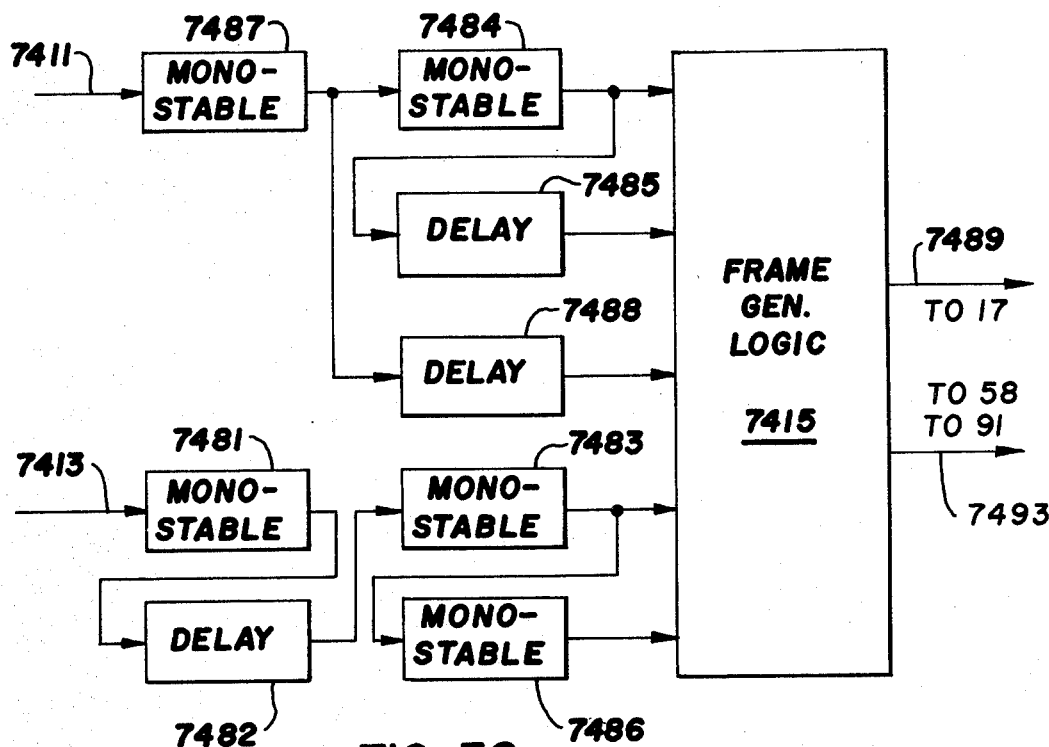
FIG. 32 is a block diagram of the frame generating circuitry.

The frame is generated by a series of monostable delays and a system of logic, as shown in block diagram form in FIG. 32. The frame is referenced to two lines which run around the edge of the field of view. One is the line 7413 which the scanning spot sweeps out at the time of occurrence of the beginning of the vertical sync pulse and the other is the line 7411 which the scanning spot sweeps out at the time of occurrence of the beginning of the horizontal sync pulse. These times are used as the reference times of the delay system which then generates the frame pattern and a blanking signal. The blanking signal is used by the threshold circuit 53 to blank out those portions of the binary video signal in the threshold circuit 53 which lie outside the frame. The dimension lines shown in FIG. 30 indicate the manner in which the various edges of the frame are referenced to the time of occurrence of the vertical and horizontal sync pulses. Thus, dimension line 7401 marks out the distance from the beginning of the vertical sync pulse to the top edge of the dark area 7409 which forms the background for the characters. This distance is determined by the delay of monostable 7481 which, in turn, triggers another delay 7482 to mark out the height 7402 of the dark area forming the background for the characters in the dark area 7409. This, in turn, triggers still another delay circuit in 7483, which determines the height 7403 of the region 7414 over which the measurement is performed. Finally, a short delay ciruit in monostable 7486, determines the width of the lower edge 7406 of the frame. Likewise, a system of monostable delays is used from the right hand edge of the frame 7412 which occurs at the end of the horizontal sync pulse 7411. A short delay 7487 determines the distance 7407 from the right hand edge of the frame. This, in turn, triggers a very short delay circuit 7488 to determine the width of the frame 7408 and also triggers a longer delay circuit in monostable 7484 to determine the width 7407 of the region 7414 over which the measurement is performed. Finally, a short delay circuit 7485 is triggered which determines the width 7405 of the left hand edge of the frame. The output of these two delay systems are then passed on to a frame generator logic system 7415 which combines them to produce a signal corresponding to the frame on line 7489 and also a signal termed on line blank 7493 corresponding to the scanning spot being inside the region 7414 over which the measurement is performed. Both signals on lines 7489 and 7493 are inputs to the one-half frame inject 5804 illustrated at FIG. 20. In addition, the signal on line 7493 is fed into the black and white logic 91, as hereinbefore mentioned with respect to FIG. 4.

Figure 31:
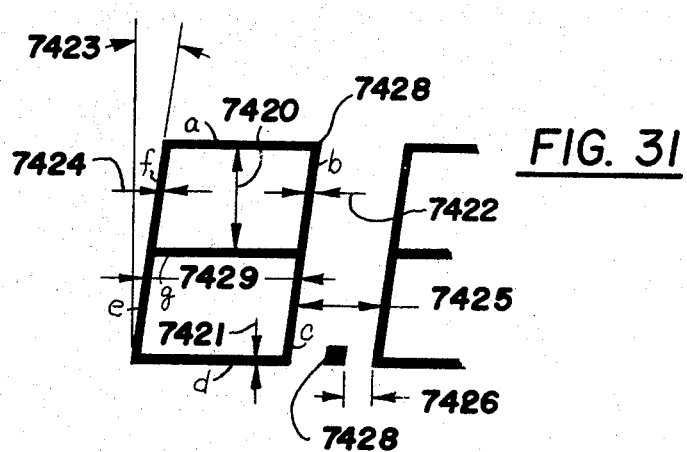
FIG. 31 is an illustration of a character and its segments which is generated to display the measurement results on the monitor.

The characters in the dark area 7409 used in the digital readout comprise numbers or digits, letters or symbols and a decimal point. These elements are used in the display to indicate the magnitude and nature in the appropriate units of the measurements made by the present system and also the number of particle images counted by the system. In the preferred embodiment, the characters are formed from and based upon a seven segment format; however, other formats, such as an eleven segment format, could have also been used. This seven segment format is shown in FIG. 31 and all the characters displayed in the readout system are generated by excluding certain segments from this format.

Figure 33:
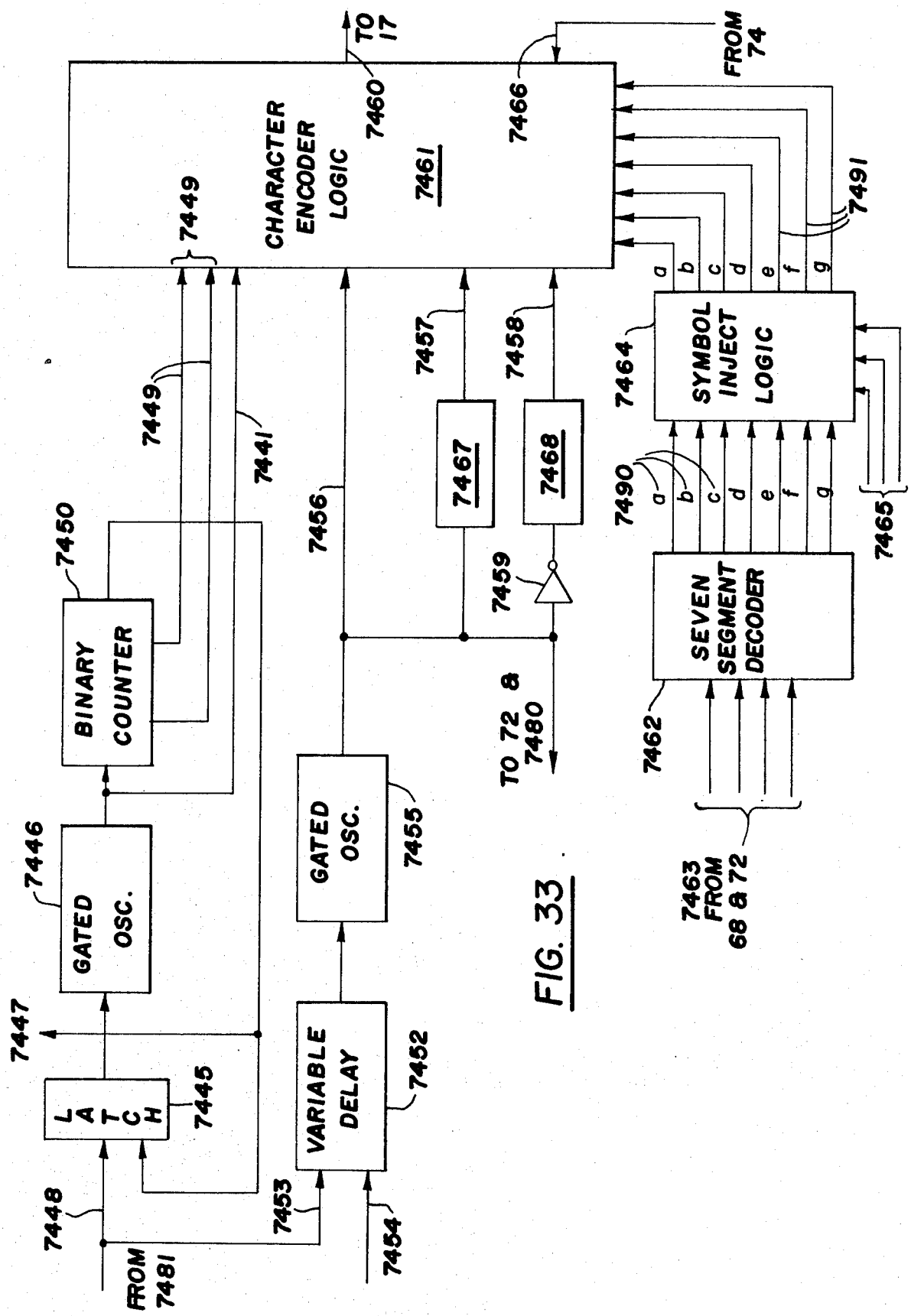
FIG. 33 is a block diagram of the character generating circuitry.

FIG. 33 shows a simplified block diagram of the system used to generate this basic format. The overriding constraint in developing this system is that each element of the format must be brought out to the output of the character generation system at the instant at which the scanning spot in the television camera 10 is located on the segment. Thus, the whole system is synchronized to the scanning system of the television camera 10 and all signals must be manipulated so that the output 7460 from the character encoder logic 7461 sequences the various elements of the display in the correct order. Elements 7445 through 7459, inclusively, are used to generate some 20 character formats across the dark area 7409 forming the background for the characters. These blocks can be further divided into the group 7445 through 7451, inclusively, which generate the horizontal segments of the characters, and 7452 through 7459, inclusively, which generate the vertical segments of the character.

These horizontal segments of the characters are essentially three equally spaced bars stretching the whole width of the dark area 7409. The character generation system is started by a signal from the first delay monostable 7481 in the vertical segment of the frame generating circuit; that is, the delay which generates dimension 7401. At that point, a signal comes in on line 7448 which sets the latch 7445. This latch turns on gated oscillator 7446 which sends pulses to the binary counter 7450. When the binary counter 7450 has received three pulses, it sends a signal to the latch 7445 which resets it, thereby turning the gated oscillator 7446 off. Oscillator 7446 is an astable multivibrator which has the property that the "on" time and the "off" time of the pulse it generates can be determined by the value of components used. The "on" time of the gated oscillator is used to define the width 7421 in FIG. 31 of the horizontal segments. The "off" time of gated oscillator 7446 is used to determine the spacing 7420 between the horizontal segments, which are inherently equally spaced. The gated oscillator 7446 also exhibits a short delay from the time of occurrence of the gating pulse to the beginning of the first on pulse and thereby assures that the top horizontal segment falls slightly lower than the top edge of the dark area 7409. The output of the gated oscillator 7446 is passed through line 7441 to the character encoder logic 7461 and also to the binary counter 7450. Binary counter 7450 passes to the character encoder logic 7461 via lines 7449, information which represents the binary number of the horizontal segment presently being scanned. The vertical segments of the seven signal format are also generated using a gated oscillator. The horizontal sync pulse comes in line 7454 to a variable delay 7452. For horizontal sync pulses occurring toward the top of the character, the delay is very short, but for horizontal sync pulses that occur further down the character, the delay is longer. In order to determine how far down the character a particular horizontal sync pulse occurs, the variable delay 7452 uses, as a reference, the pulse on line 7448, which occurs at the top of the dark area 7409. Thus, the effect of this delay is to generate the slope on the seven segment format. The slope is illustrated by dimension 7423 which is the difference or horizontal offset between the delay at the top of the character and the delay at the bottom of the character. When the variable delay 7452 generates a signal as the result of a horizontal sync pulse coming in on line 7454, this signal is passed on to the gated oscillator 7455. This oscillator 7455 is also an astable multivibrator and produces an "on" time equal to the period of the time the scanning spot is on the character, as shown by dimension 7429 in FIG. 31, and an "off" time equal to the period that the scanning spot is between characters, an indicated by dimension 7425. The segments themselves are generated by blocks 7467 and 7468. Block 7467 takes the positive going edge of the output of oscillator 7455 and generates a short pulse. The period of this pulse defines the dimension 7422 or width of the character's right-hand vertical segments, as shown in FIG. 31. This signal is then passed down line 7457 to the character encoder logic 7461. Similarly, block 7468 takes the output from oscillator 7455, after it has been inverted by gate 7459, and generates a pulse on the positive going edge of the signal fed into it. The period of this pulse defines the width 7424 of the left hand vertical segments and is passed onto the character and encoder logic 7461 by line 7458.

In the preferred embodiment, the height of the seven segment format is approximately 14 scan lines. Thus, the scanning spot in the television system intercepts each character location 14 times a frame. Every time a character location is intercepted, the character encoder 7461 must send signals appropriate to the character to be displayed and the position of the scanning spot within the character. In order to achieve this, both the sizing readout counter 68 and the entire field count readout counter 72 are connected to the readout control module 74 through a set of four common lines 7463. These lines 7463 indicate, using binary coded decimal coding or BCD, the next digit to be displayed. To be more specific, after each measurement is made, each of the readout counters 68 and 72 stores the numbers corresponding to the magnitude of the measurement. Then, on demand from the readout counter 74, the BCD signal corresponding to each of the digits is fed into the four BCD lines 7463 which run into the character generation system. Thus, as the scanning spot scans across the dark area 7409, the readout counters 68 and 72 on command send to the character generation system, the BCD equivalent of the digit which the scanning spot is on at any instant. As soon as it receives the digit, the character generation system passes it into the seven segment decoder 7462 which produces on its seven outgoing lines 7490, signals indicating which of the segments are to be displayed in the present digit. The segments seven outgoing lines are labeled *a*, *b*, *c*, *d*, *e*, *f*, and *g* in FIG. 33 and these correspond to lines 7490 similarly labeled at the output of the seven segment decoder 7462. These lines pass into the symbol inject logic 7464. This logic injects into its outgoing lines 7491, when the scanning spot is on a symbol, the segments which correspond to the symbol to be presently displayed as called for by lines 7465. The outputs from the seven segment decoder 7462 pass directly through the symbol inject logic 7464 and onto its output lines. The output of the symbol inject logic 7464 is passed to the character encoder logic 7461. As the character encoder logic 7461 is rather involved, a typical encoding scheme for just one of the seven segments is shown in FIG. 35. The segment shown is segment *a*, the top horizontal segment illustrated in FIG. 31. A signal corresponding to the occurrence of segment *a* should occur when the scanning spot is on a character in which segment *a* is to be displayed and when it is on or scanning across the portion of the character corresponding to the position of the segment *a*. In FIG. 35, gate 7475 produces a positive-going output when all these conditions are satisfied. Incoming line 7456 indicates when the scanning spot is on a character location; lines 7449, which indicate the inverted binary number of the horizontal segment, are connected to inverters 7476 and 7477 so that these lines are both up when on the top horizontal segment. Line 7451 which is up when the scanning spot is scanning along a line which is on the horizontal segment *a* is also fed into gate 7475. Finally, the line 7474 indicating when the system is on a character which requires segment *a* is fed into gate 7475. When all these inputs are up, the conditions that segment *a* should, at this instant, be displayed on monitor 14 are satisfied. Having satisfied these conditions, the signal is passed through gate 7478 to the output 7460 of the character encoder logic 7461 which, in turn, is fed on to the television monitor amplifier 17 so that the scanning spot produces a bright line as it scans over the location of segment *a*. Similar appropriate logic is used for the other segments so that the complete character is displayed. The outputs of the logic for the other segments are all connected in at gate 7478. Also fed into the gate 7478 is a signal to indicate when the decimal point occurs.

The character readout display format used in the preferred embodiment merely indicates the display format which has been found most suitable for this particular instrument. However, the principles associated with this sort of readout and their solutions can be applied to a wide variety of display formats. The dark area 7409, shown in FIG. 34, forming the background of the characters is approximately 21 character spaces long. On it two registers are displayed, the measurement register on the left and the count register on the right. The count register 7434 comprises four active digits 7433, a blank 7431 and a count symbol 7430, the letter *P*. When the entire field count module 58 is not in operation, the space taken by the count register is just seen as a blank. However, when the count register is in operation the *P* appears together with one or more digits. For example, if the count is 66 particles then only the last two right-hand digits 66 appear together with the count symbol, the two most significant digits 7432 appearing as blank spaces. However, with a readout for a greater number of particles such as 124, only the most significant digit appears as a blank. By blanking out the non-significant digits, the operator finds reading the display more convenient and less fatiguing.

The measurement register 7442 comprises five active digits 7440, two dummy zeros 7437, a blank space 7436 and a symbol 7435 which can be either an *A* or an *L* to indicate, respectively, whether area or length is being measured. This symbol indicates whether the units of the measurement are in micrometers or square micrometers. Obviously, the system can be adapted to read out any other convenient units of measurement.

The decimal point can take any of four locations 7438. The location of the decimal point is automatically set when the switch associated with the objective power compensation circuit 64 is adjusted to correspond with the objectives in use on the microscope 12. If the decimal point falls to the right of the active digits, then one or both of the dummy zeros will light, depending upon the decimal point's location. In other words, all positions to the left of the decimal point 7438 will light, the dummy zeros included. In the size measurement display, the three most significant characters 7439 are blanked out when not significant. In order to accommodate the widest range of measurement possible, it is necessary to employ the total of seven characters as active, plus the four possible positions of the moving decimal point to give a minimum reading of 0.1 and a maximum reading of 9,999,900.

The objective power compensation circuit 64 sends signals to the sizing readout counter 68 indicating which of the four decimal point locations are applicable. The sizing readout counter then counts from the right most decimal point location towards the left until it reaches the position indicated by the objective power compensation circuit 64. At this point it energizes the decimal point signal line 7466 in FIG. 33. The decimal points in the preferred embodiment are made up of a portion of the lowest horizontal line in the seven segment format.

XIV - THE READOUT COUNTERS

The sizing readout counter 68 and the entire field readout counter 72 are essentially similar. The sizing readout counter 68 is the more complex as it has to accommodate the additional dummy zeros 7437, the decimal points and also be able to change readout symbols. Therefore, this discussion is directed to the sizing readout counter 68 only. From it the similar operation of the entire field count readout counter 72 can be easily understood.

Figure 36:
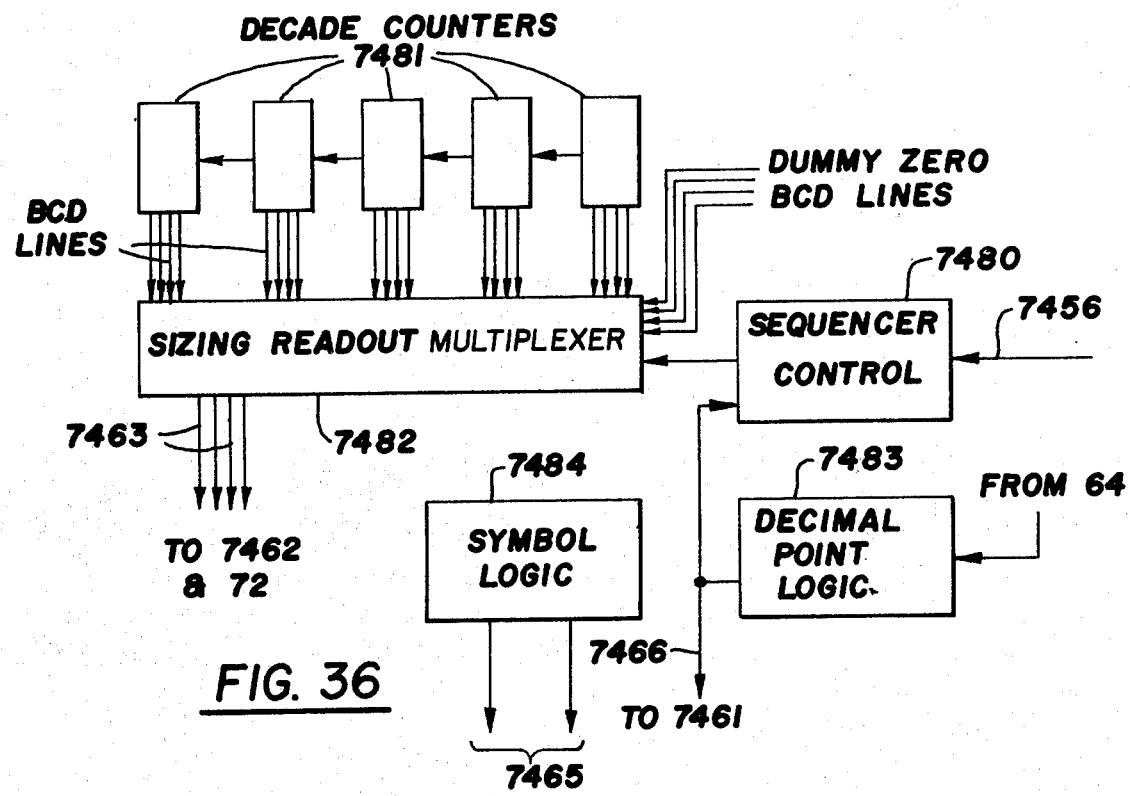
FIG. 36 is a block diagram of the sizing readout counter shown in FIG. 3.

FIG. 36 illustrates that the sizing readout counter consists of five decade counters 7481, each leading to four BCD lines which are connected to the sizing readout multiplexer 7482. Multiplexer 7482 is controlled by the control sequencer 7480 which has as its primary input at line 7456 the output of gated oscillator 7455, shown in FIG. 33. The sequencer control 7480 counts along from the beginning of the readout and causes the multiplexer 7482 to access the appropriate digits to the outgoing BCD lines 7463 which run to the 7 segment decoder 7462 in the character generation system. The sequencer control 7480 also introduces the dummy zeros 7437 to the multiplexer 7482 if it determines the decimal points lie outside the five active digits 7440. The decimal point logic 7483 takes as its input, the decimal point indicating lines which are generated in the objective power compensation circuit 64. As previously discussed, this logic assigns the decimal point signal so that the decimal point falls between the appropriate character spaces. Finally, the symbol logic 7484 generates a signal calling for the appropriate symbol to appear, depending on whether area or length is the parameter being measured.

XV - THE TELEVISION MONITOR AMPLIFIER

Figure 37:
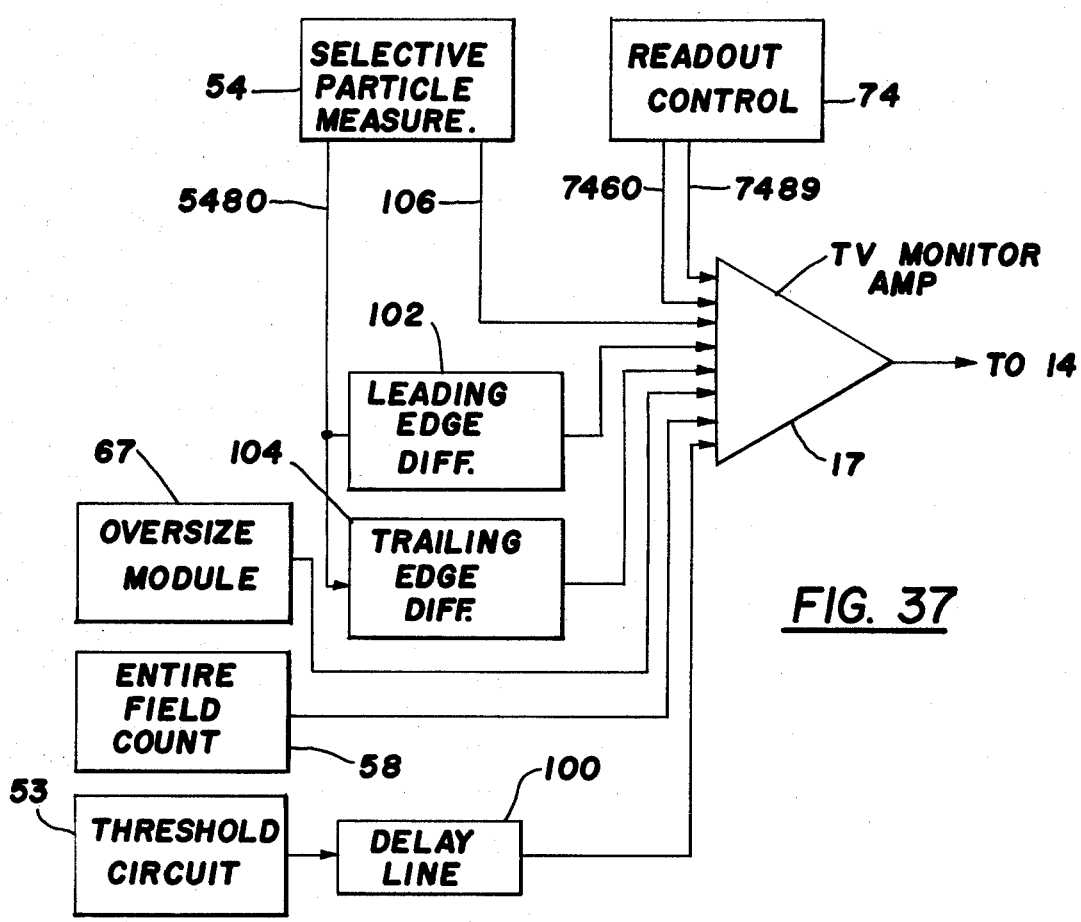
FIG. 37 is a block diagram of the television monitor amplifier shown in FIG. 3 and the various inputs thereto.

One function of the television monitor amplifier circuit 17 as best seen in FIG. 37, is to amplify the output of the delayed video signal received from the threshold circuit 53, which signal is also delayed by a delay line 100 so that the outline or halo around the particles occur at the correct position with respect to the particle images shown on television monitor 14. It also introduces into the monitor 14 for display thereby, a variety of signals generated by the system. A block diagram illustrating the television monitor amplifier 17 and its associated inputs is set forth in FIG. 37.

Both the character generation signal and the frame generation signal are fed to the television monitor amplifier 17 by lines 7460 and 7489, respectively. As previously discussed, their introduction into the amplifier 17 at the appropriate time causes the darkened frame and readout display to be artificially superimposed on the displayed video image of the field of view.

Also introduced into amplifier 17 via line 106 for eventual display on monitor 14 is a signal corresponding to the light pen indicator spot 5471. By introducing this signal, which is developed in the SPM circuit 54, into the amplifier 17 at the appropriate time, the operator is immediately able to see on the monitor screen a pattern indicative of the point at which the light pen 19 is being pointed. It will be recalled that when light pen 19 is pointed at the monitor 14, the outline of the selected particle is brightened. This is accomplished by differentiating the leading and trailing edges of the binary video signal of the selected particle. Two differentiating circuits, 102 and 104 respectively, are employed for this purpose. The relatively short pulses, which generally correspond to boundary intercepts, generated by the differentiating networks are then fed into the television amplifier monitor 17. Thus, in addition to the light pen indicator spot 5471, the operator is able to immediately view the outline or "halo" of the selected particle when the light pen 19 is pointed at a particular particle in the field of view. In every case, the display associated with the selected particle is directly related to the measurement being made. For example, if a measurement of area including holes is being made, then the entire image area is outlined. On the other hand, if the measurement is of area excluding holes, then only the area being measured is outlined. In addition, when a length measurement is being made only one side of the image is outlined. This result is achieved by feeding a narrow pulse into the leading edge differentiator 102 and the trailing edge differentiator 104, whenever the PPS 62 is switched to have the system perform a length measurement. Thus, the operator is given another visual check on system performance.

Also fed into television monitor amplifier 17 is a signal from the oversize module 67. This signal causes those portions of all images shown on the monitor 14, which satisfy the requirement that their width is greater than the predetermined size, to be brightened. The television monitor amplifier 17 additionally receives a signal from the EFC circuit 58 which causes a small mark, is to be positioned immediately adjacent each image which has been recognized as such and counted by the system.

Finally, the delayed video signal from threshold circuit 53 is introduced to the television monitor amplifier 17 after being delayed first by delay line 100. Delay line 100 serves to further delay the video signal so that there will be correct registration between the images shown on monitor 14 and the signals appearing on the other inputs of the television monitor amplifier 17. The delay line 100 has a typical delay time of 150 nanoseconds which is dictated, of course, by the choice of electronic and logic components in the system and their relative speed.

XVI - AN ALTERNATIVE EMBODIMENT

An alternative embodiment of the present invention is illustrated in FIG. 38. A photograph 200 is placed under a transparent strip 202 on which is outlined the area (not shown) to be scanned. A television camera 10 or other suitable scanning device is positioned to scan the designated area. The monitor 14 displays an image of the field of view in generally the same manner as previously described. A half-silvered mirror 204 is positioned between the operator's viewing position 206 and the transparent strip 202 so that the virtual image of the monitor 14 lies in the plane of photograph 200.

In this embodiment, the particle selector 80 comprises a marking pin 208 activated by a solenoid 210. The operator, by depressing or stepping on a foot switch (not shown) or other conventional switching means, energizes the solenoid 210 causing pin 208 to travel upward and mark the photograph 200. At the same time, the outline of the selected particle or image appears to brighten thereby visually identifying the selected particle or image. It will be appreciated that many variations of the alternative embodiment are possible. Consequently, the apparatus can be arranged so that no outline of the selected particle is generated or no mark made on the photograph 200.

In operation, the operator moves the photograph about beneath the television camera so that certain areas of it can be scanned. In response to the operation of the foot switch by the operator, the system measures the desired image parameter and, if desired, generates a brightened outline of the selected particle or image and/or marks the photograph 200 at an appropriate position to show that the selected particle has been measured. By moving the photograph about, all of the images or particles shown therein can be measured. The movement of the photograph can, if desired, be automated to improve accuracy and minimize operator involvement. The results of the measurement can be outputed to a group of mechanical counters, to a graphical plotting device or to any other appropriate visual display apparatus.

XVII - SUMMARY

It will be understood and appreciated that many modifications and changes could be made to either the preferred or alternative embodiments described herein and that many methods of implementation thereof are possible. For example, the logic and electronic apparatus described, both generally and specifically, could be implemented in a great number of ways without any alteration of system or subsystem functions or performance. Consequently, while the invention has been described by means of specific examples, and in two specific embodiments, it is not to be solely limited thereto, for obvious modifications will occur to those skilled in the art without departing from the spirit and scope of the invention.

I claim:

1. An analysis system for determining a value representative of a parameter of a selected feature in a field of view by dissociating from a video signal generated from the field of view that portion of the video signal representative of the selected feature, comprising:
   video means for imaging and line scanning in a predetermined line scan format along lines traversing a plurality of features in the field of view and for generating a video signal representative of line scan intercepts with the features, from which the value of at least one parameter of the scanned features can be derived;
   means to generate a position signal defining a position within the field of view of at least a single point to identify the selected feature;
   means responsive to the position signal and the video signal for generating a first signal by comparing a signal generated from one line of scan as a function of the position signal, with a signal generated from a subsequent line of scan as a function of the position signal, including gating means responsive to the video signal and the first signal for generating a dissociated signal representative of the intercepts of the selected feature; and
   means for determining the value of the parameter as a function of the dissociated signal.

2. The analysis system as defined in claim 1, further including display means for visually displaying the representation of the features as a function of the video means to permit observation of the scanned features and wherein the means to generate a position signal to identify the selected feature cooperates with said display to permit observation of a visual identification of the selected feature.

3. The analysis system as defined in claim 2, wherein the means to generate a position signal cooperative with the display is a light pen.

4. The analysis system as defined in claim 1, further including detection means for converting the video signal to a binary video signal having defined transitions corresponding substantially with intercepts of the feature being scanned.

5. In an analysis system for processing feature information useable in determining values representative of parameters of features within a field of view wherein there is provided video means for generating line scanning intercept signals by scanning a plurality of features in a predetermined line scan format over the field of view to produce in response to the line scanning signals an information signal having characteristics relating to at least one parameter of said features, an improvement for producing a value of a parameter of a selected feature, wherein the improvement comprises:
 first processing means for generating an identification signal as a function of the video means to identify the selected feature by defining the position of one or more points within the field of view;
 second processing means receiving line intercept signals for generating a first signal in response to an occurrence of a predetermined relationship between the intercepts on different scan lines; and
 means responsive to the information signal, the identification signal and the first signal for producing a parameter signal representative of the value of a parameter of only the selected feature.

6. The analysis system as defined in claim 5, further including display means for displaying an image on a screen as a function of the video means to visually produce thereon a picture representation of all of the scanned features in the field of view.

7. The analysis system as defined in claim 6, wherein the first processing means for generating an identification signal as a function of the video means to define the position of one or more points within the field of view to select a feature is a light pen.

8. The analysis system as defined in claim 5, further including:
 display means for displaying an image on a screen as a function of the video means to visually produce thereon a picture representation of all of the scanned features in the field of view; and
 means cooperative with said display means to identify the image representation of the selected feature with a displayed pattern.

9. The analysis system as defined in claim 5, further including display means for displaying an image on a screen as a function of the video means to visually produce thereon a picture representation of the scanned features in the field of view and wherein the first processing means for generating an identification signal as a function of the video means includes a light detection unit generating a response signal in response to light from a manually defined coordinate position of the display for providing as a function of the response signal a visual indication of the selected feature on said display means.

10. A method of determining a parameter value of a selected feature in a field of view independent of the coordinate location of the selected feature by processing a separable portion of a video signal which video signal is representative of a plurality of features in the field of view, comprising the steps of:
 scanning the features in the field of view;
 generating during the scanning of the features a video signal having at least one characteristic from which there can be derived at least one parameter value of the scanned features which is dependent upon video signal characteristics generated during scan intercepts of the features;
 providing on a display an image of the features in the field view;
 defining a position within the field of view, in cooperation with said display, to identify a selected feature during one scan of the features in the field of view;
 generating a position signal relating to the position within the field of view for identifying the selected feature;
 separating that portion of the video signal corresponding to a plurality of scanned intercepts of the selected feature as a function of a predetermined time relationship to the position signal to generate a selected feature signal; and
 processing the selected feature signal to determine a parameter value of the selected feature dependent upon a video signal characteristic generated during scan intercepts of the selected feature which parameter value is thereby independent of the coordinate location of the selected feature in the field of view.

11. The method as defined in claim 10, wherein the objects in the field of view are scanned in a predetermined line scan format.

12. The method as defined in claim 10, wherein the step of separating that portion of the video signal corresponding to a plurality of scanned intercepts of the selected feature includes the step of generating a first signal as a function of a predetermined time relationship between the position signal and the signal corresponding to a plurality of scanned intercepts of the selected feature.

13. The method as defined in claim 12, further comprising the step of comparing the first signal generated in response to scanned intercepts on a given line of scan with a signal corresponding to scanned intercepts on another line of scan for the selected feature.

14. The method as defined in claim 10, further including the step of converting the video signal to a binary video signal having defined transitions corresponding substantially with each feature intercept occurring during the step of scanning.

15. An apparatus for isolating signals for selected feature analysis corresponding to at least one selected feature represented in a field of scan having a plurality of features, comprising:
 scanning means for scanning at a predetermined rate the field of scan and generating a video signal including a plurality of successive intercept signals for each of the features;
 display means for displaying an image on a screen as a function of the video means to visually produce a picture representation of all of the scanned features;
 means for manual manipulation to delineate on or near the screen at least one but not all of the scanned features in the field; and means responsive to such delineation to isolate only the intercept signals of the delineated feature or features, including logic means for determining an alignment between a signal from one scan line and a signal from another scan line to generate an enabling signal to isolate only the intercept signals of the delineated feature or features.

16. The apparatus as defined in claim 15, further including parameter means for determining as a function of the isolated intercept signals of the delineated feature or features a parameter value representative of the dimensional property of the selected feature or features.

17. The apparatus as defined in claim 15, wherein the means for manual manipulation to delineate on or near the screen at least one but not all of the scanned features in the field is a light pen.

18. The apparatus as defined in claim 15, wherein the scanning means scans in a predetermined line scan format.

19. The apparatus as defined in claim 15, further including means for combining the video signal with the intercept signals of the delineated feature or features to form a modified video signal.

20. The apparatus as defined in claim 19, further including means for the display means to receive the modified video signal to generate a modified picture representation of the features scanned by the video means.

21. A system for generating dimensional parameter data relating to a selected feature in a field of features scanned along predetermined scan lines, comprising:
   video means for line scanning at a predetermined rate in a predetermined scan line format along lines traversing a plurality of features in the field of features to produce intercept signals, including an intercept signal arising from intercepts of the features on a given scan line;
   means for producing a first signal from a line of scan in response to a selection of one of the features by an operator of the system;
   logic means responsive to the first signal for generating for the given line of scan an isolated object signal related to a part of the selected feature and unrelated to other features in the field as a function of said intercept signal by determining alignment between signals occurring on different lines of scan intercepting the selected feature and generated in response to the first signal; and
   parameter means for determining as a function of the isolated feature signal and other similarly generated isolated feature signals relating to other parts of the selected feature a parameter value representative of a dimensional property of the selected feature.

22. A system for generating size parameter data relating to a selected feature in a field of features by line scanning, comprising:
   video means for line scanning at a predetermined rate in a predetermined scan line format a plurality of features in the field of features to produce video signals representing the intercepts of the features on scan lines;
   means for producing a first signal from one of the lines of scan in response to a selection of one of the features by an operator of the system;
   logic means to generate, as a function of the first signal for the one line of scan, an isolated feature signal related to a portion of the selected feature and unrelated to other features in the field of features by determining the occurrence of a predetermined time relationship between signals generated in response to the first signal on successive lines of scan; and
   parameter means for determining as a function of the isolated feature signal and other similarly generated isolated feature signals relating to other portions of the selected feature a parameter having a value representative of a size property of the selected feature.

* * * * *

UNITED STATES PATENT AND TRADEMARK OFFICE
CERTIFICATE OF CORRECTION

PATENT NO. : 4,015,108
DATED : March 29, 1977
INVENTOR(S) : Roger R. Morton

It is certified that error appears in the above-identified patent and that said Letters Patent are hereby corrected as shown below:

Col. 18, line 67, change "he" to --the--.
Col. 20, line 10, change "such" to --each--.
        line 32, after "monostable" insert --5461--.
        line 32, change "FIG. 76" to --FIG. 7b--.
Col. 23, line 68, after "particle" insert --binary--.
Col. 24, line 18, after "module" insert --60--.

Col. 26, line 40, change "is" to --has--.
Col. 29, line 26, change "6034" to --6032--.
        line 27, change "6032" to --6034--.
Col. 30, line 21, change "diagammatic" to --diagrammatic--.
Col. 33, line 64, change "to" to --and--.
        line 67, change "6608" to --6609--.
Col. 34, line 1, change "determines" to --determine--.
Col. 35, line 2, after "with" insert --reference to Figure 19--
        line 22, change "resistors" to --resistor--.
        line 26, delete "a" (second occurrence).
Col. 37, line 36, change "inject 5804 block" to --inject block 5804--.
        line 45, change "to" to --so--.
        line 51, change "This" to --Thus--.
        line 51, change "pulse" to --pulses--.
Col. 38, line 1, change "The" to --This--.
        line 11, change "delay 5813 circuit" to --delay circuit 5813--.
        line 18, before "line" insert --delay--.
        line 23, change "of" (second occurrence) to --or--.
        line 24, change "latter" to --later--.
        line 27, change "of" (second occurrence) to --and--.
        line 43, change "whic" to --which--.
        line 58, delete "drawn".

UNITED STATES PATENT AND TRADEMARK OFFICE
CERTIFICATE OF CORRECTION

PATENT NO. : 4,015,108
DATED : March 29, 1977
INVENTOR(S) : Roger R. Morton

It is certified that error appears in the above-identified patent and that said Letters Patent are hereby corrected as shown below:

Col. 42, line 54, delete "6905".
Col. 43, line 21, change "EPC" to --EFC--.
Col. 44, line 17, before "7483" insert --monostable--.
        line 24, before "7487" insert --circuit in monostable--.
        line 29, change "7407" to --7404--.
Col. 45, line 62, change "an" to --as--.

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*